(12) United States Patent
Taguchi et al.

(10) Patent No.: US 8,747,498 B2
(45) Date of Patent: Jun. 10, 2014

(54) HYDROGEN GENERATOR AND FUEL CELL SYSTEM COMPRISING THE SAME

(75) Inventors: Kiyoshi Taguchi, Osaka (JP); Takanori Shimada, Shiga (JP); Yoshikazu Tanaka, Shiga (JP); Yoshio Tamura, Hyogo (JP); Shigeki Yasuda, Osaka (JP)

(73) Assignee: Panasonic Corporation, Osaka (JP)

( * ) Notice: Subject to any disclaimer, the term of this patent is extended or adjusted under 35 U.S.C. 154(b) by 447 days.

(21) Appl. No.: 13/128,503

(22) PCT Filed: Nov. 20, 2009

(86) PCT No.: PCT/JP2009/006290
§ 371 (c)(1),
(2), (4) Date: May 10, 2011

(87) PCT Pub. No.: WO2010/058602
PCT Pub. Date: May 27, 2010

(65) Prior Publication Data
US 2011/0212375 A1   Sep. 1, 2011

(30) Foreign Application Priority Data

Nov. 20, 2008 (JP) ................................. 2008-296969
Feb. 2, 2009 (JP) ................................. 2009-021338

(51) Int. Cl.
*B01J 7/00* (2006.01)

(52) U.S. Cl.
USPC ............ 48/61; 48/197 R; 48/127.9; 48/127.1; 48/198.1; 48/76; 422/105; 422/109; 422/110; 422/111; 429/428; 429/425; 429/443; 429/408; 429/25; 429/430; 429/431; 429/423; 429/19; 429/17; 429/24; 429/34; 423/648.1

(58) Field of Classification Search
USPC ............... 48/61, 127.9, 127.1, 197 R, 198.1; 423/648.1; 429/428, 425, 430, 431, 429/423, 443, 408, 17, 19, 24, 25, 34; 422/105, 109, 110, 111
See application file for complete search history.

(56) References Cited

U.S. PATENT DOCUMENTS

| 4,741,978 A | 5/1988 | Takabayashi |
| 7,052,790 B2 | 5/2006 | Nakamura et al. |

(Continued)

FOREIGN PATENT DOCUMENTS

| CN | 1409428 A | 4/2003 |
| JP | 2002-352839 A | 12/2002 |

(Continued)

OTHER PUBLICATIONS

Japanese Office Action for JP 2009-091105 dated Jul. 16, 2013, 5 pages.

(Continued)

*Primary Examiner* — Kaity V. Handal
(74) *Attorney, Agent, or Firm* — McDermott Will & Emery LLP

(57) ABSTRACT

A hydrogen generator of the present invention includes a reformer (16) for generating a hydrogen-containing gas through a reforming reaction using a raw material; a combustor (102a) for heating the reformer (16); a combustion air supplier (117) for supplying combustion air to the combustor (102a); and an abnormality detector (110a) for detecting an abnormality; and a controller (110) configured to control the combustion air supplier (117) such that the reformer (16) is cooled with a higher rate in an abnormal shut-down process executed after the abnormality detector (110a) detects the abnormality, than in a normal shut-down process.

22 Claims, 24 Drawing Sheets

(56) References Cited

U.S. PATENT DOCUMENTS

| | | | |
|---|---|---|---|
| 7,687,035 B2 * | 3/2010 | Terada et al. | 422/105 |
| 2002/0159928 A1 * | 10/2002 | Naka et al. | 422/188 |
| 2003/0068540 A1 | 4/2003 | Ueda et al. | |
| 2003/0162065 A1 | 8/2003 | Miyauchi et al. | |
| 2004/0058230 A1 | 3/2004 | Hsu | |
| 2004/0131540 A1 * | 7/2004 | Fujii et al. | 423/650 |
| 2004/0229097 A1 * | 11/2004 | Hirakata et al. | 429/24 |
| 2005/0129997 A1 | 6/2005 | Maenishi et al. | |
| 2005/0132649 A1 | 6/2005 | Tamura et al. | |
| 2005/0175870 A1 | 8/2005 | Hagan et al. | |
| 2005/0202294 A1 | 9/2005 | Gallagher et al. | |
| 2005/0244765 A1 * | 11/2005 | Okada et al. | 431/12 |
| 2006/0005557 A1 | 1/2006 | Takano et al. | |
| 2006/0216562 A1 | 9/2006 | Edlund et al. | |
| 2006/0246325 A1 | 11/2006 | Miyauchi et al. | |
| 2007/0101647 A1 * | 5/2007 | Miyauchi et al. | 48/198.7 |
| 2007/0148063 A1 | 6/2007 | Terada et al. | |
| 2008/0026271 A1 * | 1/2008 | Ueda et al. | 429/23 |
| 2008/0081231 A1 * | 4/2008 | Kurita et al. | 429/17 |
| 2008/0160361 A1 | 7/2008 | Ohara et al. | |
| 2008/0166284 A1 | 7/2008 | Son et al. | |
| 2009/0087701 A1 | 4/2009 | Kuwaba | |
| 2009/0092883 A1 | 4/2009 | Ozeki et al. | |
| 2009/0176138 A1 | 7/2009 | Miyauchi et al. | |
| 2009/0181271 A1 | 7/2009 | Yasuda et al. | |
| 2009/0317678 A1 | 12/2009 | Bono | |
| 2010/0047636 A1 | 2/2010 | Tamura et al. | |
| 2010/0062294 A1 | 3/2010 | Tamura | |
| 2010/0092814 A1 * | 4/2010 | Dutta et al. | 429/13 |
| 2010/0285377 A1 * | 11/2010 | Tamura et al. | 429/423 |
| 2010/0291451 A1 * | 11/2010 | Tamura et al. | 429/429 |
| 2011/0014528 A1 * | 1/2011 | Kani et al. | 429/408 |
| 2011/0223099 A1 * | 9/2011 | Nakamura et al. | 423/648.1 |

FOREIGN PATENT DOCUMENTS

| | | |
|---|---|---|
| JP | 2002-367646 A | 12/2002 |
| JP | 2003-002605 A | 1/2003 |
| JP | 2004-006217 A | 1/2004 |
| JP | 2004-247084 A | 9/2004 |
| JP | 2004-296102 A | 10/2004 |
| JP | 2005-041709 A | 2/2005 |
| JP | 2005-251603 A | 9/2005 |
| JP | 2005-259663 A | 9/2005 |
| JP | 2007-103035 A | 4/2007 |
| JP | 2007-132612 A | 5/2007 |
| JP | 2007-141787 A | 6/2007 |
| JP | 2007-169116 A | 7/2007 |
| JP | 2007-254251 A | 10/2007 |
| JP | 2008-152999 A | 7/2008 |
| JP | 2008-266118 A | 11/2008 |
| JP | 2009-004346 | 1/2009 |
| JP | 2009-224115 * | 10/2009 |
| JP | 2012-256606 A | 12/2012 |
| WO | WO-2006/088077 A1 | 8/2006 |
| WO | 2007/145321 A1 | 12/2007 |
| WO | WO-2007/142278 A1 | 12/2007 |
| WO | WO-2008/035776 A1 | 3/2008 |
| WO | 2008/126686 A1 | 10/2008 |
| WO | 2010/058604 A1 | 5/2010 |

OTHER PUBLICATIONS

Extended European Search Report issued in European Patent Application No. 09827383.2 mailed Nov. 26, 2012.

Chinese Office Action, and partial English translation thereof, issued in Chinese Patent Application No. 200980102593.X dated Jul. 30, 2012.

Chinese Office Action issued in corresponding Chinese Application No. 200980146102.1, dated Sep. 4, 2013, with English translation.

Japanese Office Action issued in Japanese Patent Application No. 2012-177075 mailed Dec. 17, 2013.

* cited by examiner

| FIRST ABNORMALITY | BURNER MISFIRE ABNORMALITY | |
|---|---|---|
| SECOND ABNORMALITY | ABNORMALITIES OF COMPONENTS | TEMPERATURE DETECTOR FAILURE |
| | | CO SENSOR FAILURE |
| | | COMBUSTION AIR SUPPLIER FAILURE |
| | GAS LEAKAGE ABNORMALITY | — |
| | DETECTED TEMPERATURE ABNORMALITY | — |

Fig. 4

| | | |
|---|---|---|
| FIRST ABNORMALITY | COOLING WATER TEMPERATURE ABNORMALITY | |
| | FIRST PUMP ABNORMALITY | |
| SECOND ABNORMALITY | COMPONENT FAILURE | COOLING WATER TANK WATER LEVEL DETECTOR FAILURE |
| | | CONDENSED WATER TANK WATER LEVEL DETECTOR FAILURE |
| | | FLOW RATE DETECTOR FAILURE |
| | | TEMPERATURE DETECTOR FAILURE |
| | | VOLTAGE TRANSFORMER FAILURE |
| | | VENTILATION FAN FAILURE |
| | GAS LEAKAGE ABNORMALITY | FUEL GAS PASSAGE PRESSURE ABNORMALITY |
| | | OXIDIZING GAS PASSAGE PRESSURE ABNORMALITY |
| | | COMBUSTIBLE GAS CONCENTRATION ABNORMALITY |
| | CONTROLLER TEMPERATURE INCREASE ABNORMALITY | — |

HYDROGEN GENERATOR AND FUEL CELL SYSTEM COMPRISING THE SAME

RELATED APPLICATIONS

This application is the U.S. National Phase under 35 U.S.C. §371 of International Application No. PCT/JP2009/006290, filed on Nov. 20, 2009, which in turn claims the benefit of Japanese Application No. 2008-296969, filed on Nov. 20, 2008 and Japanese Application No. 2009-021338, filed on Feb. 2, 2009, the disclosures of which Applications are incorporated by reference herein.

TECHNICAL FIELD

The present invention relates to a hydrogen generator and a fuel cell system comprising the same. Particularly, the present invention relates to a hydrogen generator and a fuel cell system which are configured to perform a shut-down process when an abnormality of the hydrogen generator is detected.

BACKGROUND ART

Conventionally, fuel cell systems which enable high-efficient and small-scale power generation have been developed as distributed power generation systems which implement high energy utilization efficiency because it is easy to construct a system for utilizing heat energy generated in power generation. In the fuel cell systems, a fuel gas (hydrogen gas) and an oxidizing gas are supplied from outside to a fuel cell, the fuel cell carries out power generation through an electrochemical reaction using the fuel gas and the oxidizing gas, heat generated through the reaction is recovered and stored as hot water in a hot water storage tank, and the hot water is effectively used to supply heat to outside object.

In the fuel cell systems, supply equipment of the hydrogen gas used in power generation is not built as a general infrastructure. Therefore, typically, together with the fuel cell, there is provided a hydrogen generator in which a reformer performs a steam reforming reaction of a raw material supplied from the existing infrastructure, such as a city gas, or LPG, to generate a reformed gas containing hydrogen, and a shift converter and a purifier sufficiently reduce carbon monoxide contained in the reformed gas, to generate a fuel gas.

A hydrogen generator is disclosed, in which in the shut-down process of the hydrogen generator, the hydrogen generator is sealed, and air is supplied with a greater amount than that during an operation of the fuel cell, from a burner blower for supplying combustion air to a burner for heating a reforming catalyst to forcibly cool the reforming catalyst quickly (see patent literature 1).

CITATION LISTS

Patent Literature

Patent document 1: Japanese Laid-Open Patent Application Publication No. Hei. 2-132770
Patent document 2: Japanese Laid-Open Patent Application Publication No. 2005-162580

SUMMARY OF THE INVENTION

Technical Problem

When the hydrogen generator shut-downs abnormally, maintenance operation is in some cases required thereafter. In that case, it is necessary to lower the temperature quickly to a temperature at which maintenance operator will not get burnt, etc. However, a cooling operation during the shut-down process in the fuel cell system disclosed in the above Patent literature 1 does not meet this requirement.

The present invention has been developed in view of the above circumstances, and an object of the present invention is to provide a hydrogen generator which carries out a cooling operation according to a status in a case where the shut-down process is performed, and a fuel cell system including the hydrogen generator.

Solution to Problem

To solve the problem associated with the prior art, a hydrogen generator of the present invention comprises a reformer for generating a hydrogen-containing gas through a reforming reaction using a raw material; a combustor for heating the reformer; a combustion air supplier for supplying combustion air to the combustor; and an abnormality detector for detecting abnormality; and a controller configured to control the combustion air supplier such that the reformer is cooled with a higher rate in an abnormal shut-down process executed after the abnormality detector detects the abnormality, than in a normal shut-down process.

In this configuration, when an abnormality occurs during the operation, the hydrogen generator is cooled with a higher rate than in the normal shut-down process. Therefore, the temperature of the hydrogen generator is lowered at a higher pace, and shifting to maintenance operation is facilitated.

In the hydrogen generator of the present invention, the controller may be configured to control at least one of an operation time and an operation amount of the combustion air supplier such that the reformer is cooled with a higher rate in the abnormal shut-down process than in the normal shut-down process.

In the hydrogen generator of the present invention, the controller may be configured to permit the hydrogen generator to start an operation under a higher-temperature condition of the reformer, in the normal shut-down process than in the abnormal shut-down process.

In the hydrogen generator of the present invention, the controller may be configured to forcibly cause an operation amount of the combustion air supplier to be larger than an operation amount of the combustion air supplier during a rated operation of the hydrogen generator, in the abnormal shut-down process.

The hydrogen generator of the present invention may further comprise a replacement gas supplier for supplying a replacement gas to the reformer; and the controller may be configured to control the replacement gas supplier to start a purge operation of the reformer using the replacement gas at an earlier time, in the abnormal shut-down process than in the normal shut-down process.

The hydrogen generator of the present invention may further comprise a gas supplier for supplying a gas to the reformer; and the hydrogen generator may be configured to execute a pressure compensation operation for supplying the gas to the reformer using the gas supplier to compensate a pressure decrease in an interior of the reformer sealed after the hydrogen generator stops a hydrogen generation operation; and the controller may be configured to control the gas supplier such that a frequency with which the pressure compensation operation occurs is higher (the number of rimes of the pressure compensation operation in a given period is larger), in the abnormal shut-down process than in the normal shut-down process.

The hydrogen generator of the present invention may further comprise a heat exchanger for recovering heat from a combustion exhaust gas exhausted from the combustor; a heat medium path through which a heat medium which receives the heat recovered from the combustion exhaust gas in the heat exchanger flows; and a flow control device for flowing the heat medium in the heat medium path; and the controller may be configured to operate the flow control device in a cooling step for cooling the reformer in which the combustion air supplier is operated in a state where a combustion operation of the combustor is in a stopped state, in the abnormal shut-down process.

In the hydrogen generator of the present invention, the controller may be configured to control the combustion air supplier such that the reformer is cooled with a higher rate than in the normal shut-down process, when the abnormality detector detects a component failure or a gas leakage abnormality.

In the hydrogen generator of the present invention, the controller may be configured to control the combustion air supplier such that the reformer is cooled with a higher rate, in an abnormal shut-down process executed after the abnormality detector detects a second abnormality which requires maintenance, than in an abnormal shut-down process executed after the abnormality detector detects a first abnormality which does not require the maintenance.

In this configuration, the cooling operation is executed appropriately according to the content of the abnormality, shifting to maintenance operation is facilitated, and the hydrogen generator can start-up easily.

In the hydrogen generator of the present invention, the controller may be configured to permit the hydrogen generator to start an operation under a higher-temperature condition of the reformer, in the abnormal shut-down process executed after the abnormality detector detects the first abnormality, than in the abnormal shut-down process executed after the abnormality detector detects the second abnormality.

The hydrogen generator of the present invention may further comprise: a replacement gas supplier for supplying a replacement gas to the reformer; wherein the controller may be configured to control the replacement gas supplier to start a purge operation of the reformer using the replacement gas at an earlier time, in the abnormal shut-down process executed after the abnormality detector detects the second abnormality, than in the abnormal shut-down process executed after the abnormality detector detects the first abnormality.

The hydrogen generator of the present invention, may further comprise a gas supplier for supplying a gas to the reformer; and the hydrogen generator may be configured to execute a pressure compensation operation for supplying the gas to the reformer using the gas supplier to compensate a pressure decrease in an interior of the reformer sealed after the hydrogen generator stops a hydrogen generation operation; and the controller may be configured to control the gas supplier so that a frequency with which the pressure compensation operation occurs is higher (the number of rimes of the pressure compensation operation in a given period is larger), in the abnormal shut-down process executed after the abnormality detector detects the second abnormality, than in the abnormal shut-down process executed after the abnormality detector detects the first abnormality.

The hydrogen generator of the present invention may further comprise a heat exchanger for recovering heat from a combustion exhaust gas exhausted from the combustor; a heat medium path through which a heat medium which receives heat recovered from the combustion exhaust gas in the heat exchanger flows; and a flow control device for flowing the heat medium in the heat medium path; and the controller may be configured to operate the flow control device in a cooling step for cooling the reformer in which the combustion air supplier is operated in a state where a combustion operation of the combustor is in a stopped state, in the abnormal shut-down process executed after the second abnormality is detected.

In the hydrogen generator of the present invention, the first abnormality may be a misfire abnormality in at least one of a start-up stop process and a shut-down process.

In the hydrogen generator of the present invention, the second abnormality may be at least one of a component failure and a gas leakage abnormality.

A fuel cell system of the present invention, comprises the above hydrogen generator; and a fuel cell for generating electric power using the hydrogen-containing gas supplied from the hydrogen generator.

In this configuration, when an abnormality occurs during the operation, the hydrogen generator is cooled with a higher rate than in the normal shut-down process. Therefore, the temperature of the hydrogen generator is lowered at a higher pace, and shifting to maintenance operation is facilitated.

The fuel cell system of the present invention may further comprise a first heat medium path through which a first heat medium for cooling the fuel cell flows; and a first flow control device for controlling a flow rate of the first heat medium flowing in the first heat medium path; and the controller may be configured to control the combustion air supplier such that the reformer is cooled with a higher rate in an abnormal shut-down process executed after the abnormality detector detects an abnormality associated with the hydrogen generator than in the normal shut-down process and to control the first flow control device such that the fuel cell is cooled with a rate substantially equal to a rate with which the fuel cell is cooled in the normal shut-down process, in the abnormal shut-down process executed when the abnormality detector detects the abnormality associated with the hydrogen generator.

In this configuration, as compared to a case where the reformer and the fuel cell are cooled with a higher rate in the abnormal shut-down process than in the normal shut-down process, shifting to maintenance operation of the hydrogen generator is facilitated with a reduced energy consumption amount.

In the fuel cell system of the present invention, the controller may be configured to control the combustion air supplier such that the reformer is cooled with a higher rate in an abnormal shut-down process executed after the abnormality detector detects a second abnormality which requires maintenance and is associated with the hydrogen generator, than in an abnormal shut-down process executed after the abnormality detector detects a first abnormality which does not require the maintenance, and control the combustion air supplier such that the fuel cell is cooled with a rate substantially equal to a rate with which the fuel cell is cooled in the normal shut-down process or an abnormal shut-down process executed after the abnormality detector detects the first abnormality, in the abnormal shut-down process executed after the abnormality detector detects the second abnormality which requires the maintenance and is associated with the hydrogen generator.

In this configuration, the cooling operation is executed appropriately according to the content of the abnormality, shifting to maintenance operation is facilitated, and the hydrogen generator and hence the fuel cell system can start-up easily.

The fuel cell system of the present invention may further comprise a first heat medium path through which a first heat medium for cooling the fuel cell flows; and a first flow control device for controlling a flow rate of the first heat medium flowing in the first heat medium path; and the controller may be configured to control the first flow control device such that the fuel cell is cooled with a higher rate than in the normal shut-down process and control the combustion air supplier such that the reformer is cooled with a rate substantially equal to a rate with which the reformer is cooled in the normal shut-down process, when the abnormality detector detects an abnormality which is associated with the fuel cell and is other than the abnormality associated with the hydrogen generator.

In this configuration, as compared to a case where the reformer and the fuel cell are cooled with a higher rate in the abnormal shut-down process than in the normal shut-down process, shifting to maintenance operation of the fuel cell or a component associated with the fuel cell other than the hydrogen generator is facilitated with a reduced energy consumption amount.

In the fuel cell system of the present invention, the controller may be configured to control the first flow control device such that the fuel cell is cooled with a higher rate in an abnormal shut-down process executed after the abnormality detector detects a second abnormality which requires maintenance, is associated with the fuel cell and is other than the abnormality associated with the hydrogen generator, than in the abnormal shut-down process executed after the abnormality detector detects the first abnormality which does not require the maintenance, and to control the combustion air supplier such that the reformer is cooled with a rate substantially equal to a rate with which the reformer is cooled in the normal shut-down process or in the abnormal shut-down process executed after the abnormality detector detects the first abnormality, in the abnormal shut-down process executed after the abnormality detector detects the second abnormality which requires the maintenance, is associated with the fuel cell and is other than the abnormality associated with the hydrogen generator.

In this configuration, the cooling operation is executed appropriately according to the content of the abnormality, shifting to maintenance operation is facilitated, and the fuel cell system can start-up easily.

The above and further objects, features, and advantages of the present invention will more fully be apparent from the following detailed description with accompanying drawings.

Advantageous Effects of the Invention

In accordance with the hydrogen generator of the present invention, the hydrogen generator is cooled with a higher rate when an abnormality occurs during an operation than in a normal shut-down process. Therefore, the temperature of the hydrogen generator is lowered at a higher pace, and shifting to a maintenance operation is facilitated.

BRIEF DESCRIPTION OF THE DRAWINGS

FIG. 4 is a table showing examples of abnormality of the present invention.

FIG. 20 is a table showing examples of abnormality which is followed by the shut-down operation of the fuel cell system of the present invention.

DESCRIPTION OF EMBODIMENTS

Figure 1:
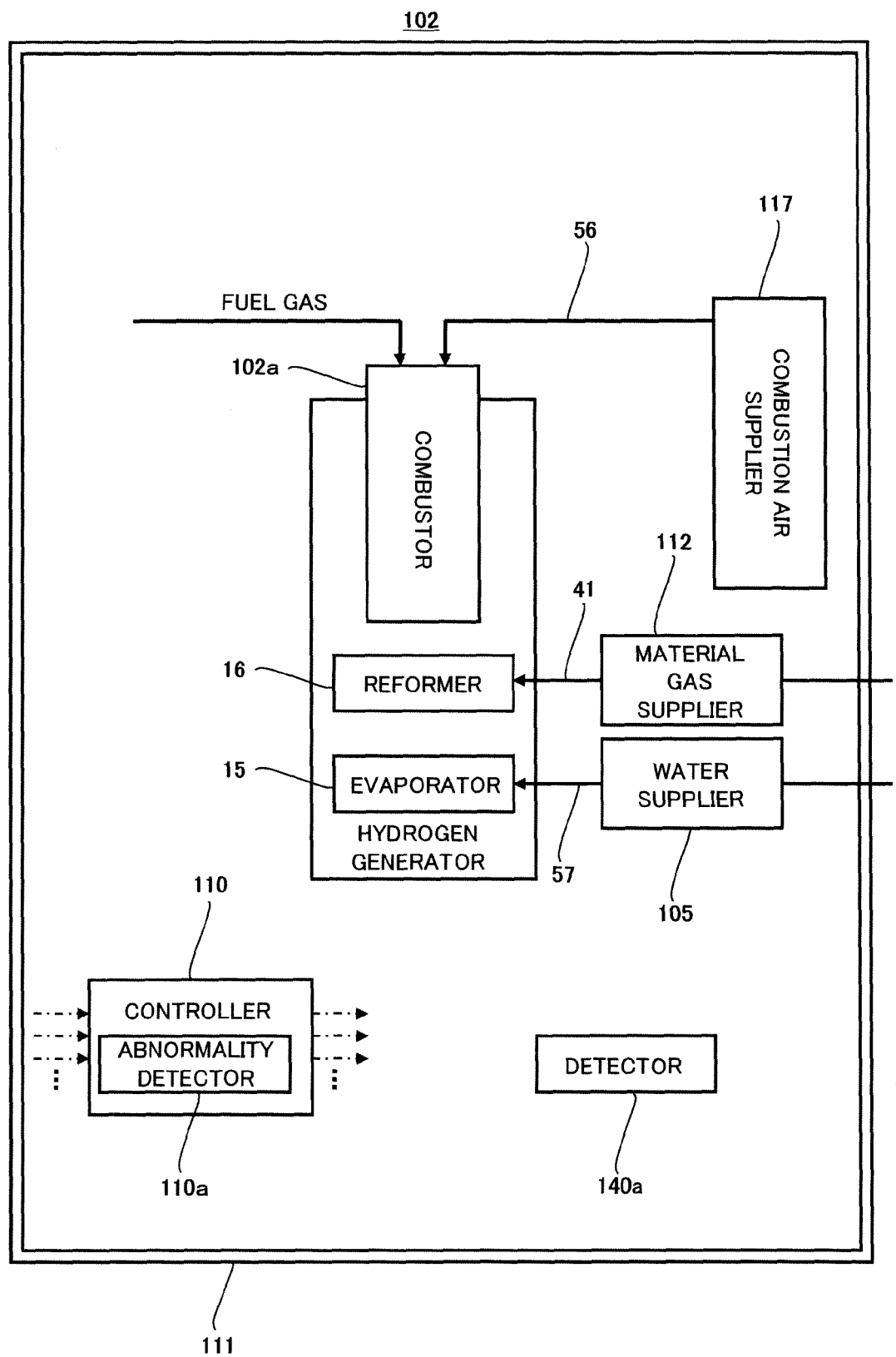
FIG. 1 is a view showing a schematic configuration of a hydrogen generator according to Embodiment 1 of the present invention.

Hereinafter, preferred embodiments of the present invention will be described with reference to the drawings.

Throughout the drawings, the same or corresponding constituents and components are designated by the same reference characters and will not be described repetitively. Also, throughout the drawings, only the constituents and components required to explain the present invention are extracted and illustrated, and other constituents and components are omitted. Furthermore, the present invention is not limited to the embodiments described below.

Embodiment 1

[Configuration of Hydrogen Generator]

FIG. 1 is a view showing a schematic configuration of a hydrogen generator according to Embodiment 1 of the present invention.

As shown in FIG. 1, a hydrogen generator 102 according to Embodiment 1 of the present invention includes a reformer 16 configured to generate a hydrogen-containing gas through a reforming reaction using a raw material, a combustor 102a configured to heat the reformer 16, and a combustion air supplier 117 configured to supply combustion air to the combustor 102a, an abnormality detector 110a for detecting an abnormality, and a controller 110 configured to control the combustion air supplier 117 so that the reformer 16 is cooled with a higher rate than in the normal shut-down process, in an abnormal shut-down process carried out when the abnormality detector 110a detects the abnormality.

In this configuration, in a case where an abnormality occurs in the hydrogen generator 100, the reformer 16 and hence the hydrogen generator 102, are cooled with a higher rate than in the normal shut-down process. Therefore, the temperature of the hydrogen generator 102 is lowered at a higher pace, and shifting to a maintenance operation is facilitated.

As used herein, the normal shut-down process refers to a shut-down process which is different from a shut-down process (abnormal shut-down process) performed when the abnormality detector detects an abnormality. For example, the normal shut-down process refers to a shut-down process which is performed when it is not necessary to consume hydrogen in a hydrogen consuming device which consumes hydrogen generated in the hydrogen generator 102. Also, the normal shut-down process refers to a shut-down process which is performed when the hydrogen consuming device is a hydrogen tank and hydrogen stored in the hydrogen tank becomes a fuel level during an operation for supplying hydrogen. Also, the normal shut-down process refers to a shut-down process which is performed when the hydrogen consuming device is a fuel cell and a power demand of a power load decreases to a value which is not more than a predetermined threshold at which the power generation operation is unnecessary, or a shut-down process or the like which is performed at a preset shut-down time.

As the combustion air supplier 117, for example, a blower or a fan such as a sirocco fan may be used. Combustion air is supplied from the combustion air supplier 117 to the combustor 102a via a combustion air supply path 56.

The detector 140a is a sensor which is configured to detect a physical amount relating to a state of the hydrogen generator, and includes for example, a temperature detector of the reformer 16, an ignition detector of the combustor 102a, an air flow meter of the air supplied from the combustion air supplier 117, a rotation number detector of the combustion air supplier 117, a material gas flow meter of the material gas supplied from the material gas supplier 112, a combustible gas sensor in a housing of the hydrogen generator 102, etc.

The abnormality determiner 110a constitutes an abnormality detector of the present invention, and is configured to determine abnormalities based on detected values of the detectors 140a. For the failure of the detectors, among the abnormalities of the hydrogen generator, the abnormality determiner 110a operates as an abnormality detector, while for abnormalities different from the failure of the detectors, the abnormality determiner 110a and a detector for outputting a detected value used to determine whether or not there is an abnormality, operate as the abnormality detector.

The material gas supplier 112 is a device for controlling a flow rate of the material gas supplied to the hydrogen generator 102, and is constituted by a combination of a booster pump and a flow control valve, or consists of the flow control valve.

The water supplier 105 is a device for controlling a flow rate of reforming water supplied to an evaporator 15, and is constituted by, for example, pump.

In the hydrogen generator of this embodiment, the controller 110 is configured to control at least one of an operation time and an operation amount of the combustion air supplier 117 so that the reformer 116 is cooled with a higher rate in the abnormal shut-down process than in the normal shut-down process.

Embodiment 2

A hydrogen generator according to Embodiment 2 of the present invention is an example in which the controller is configured to control at least one of an operation time and an operation amount of the combustion air supplier so that the reformer is cooled with a higher rate in the abnormal shut-down process than in the normal shut-down process.

[Configuration of Hydrogen Generator]

Figure 2:
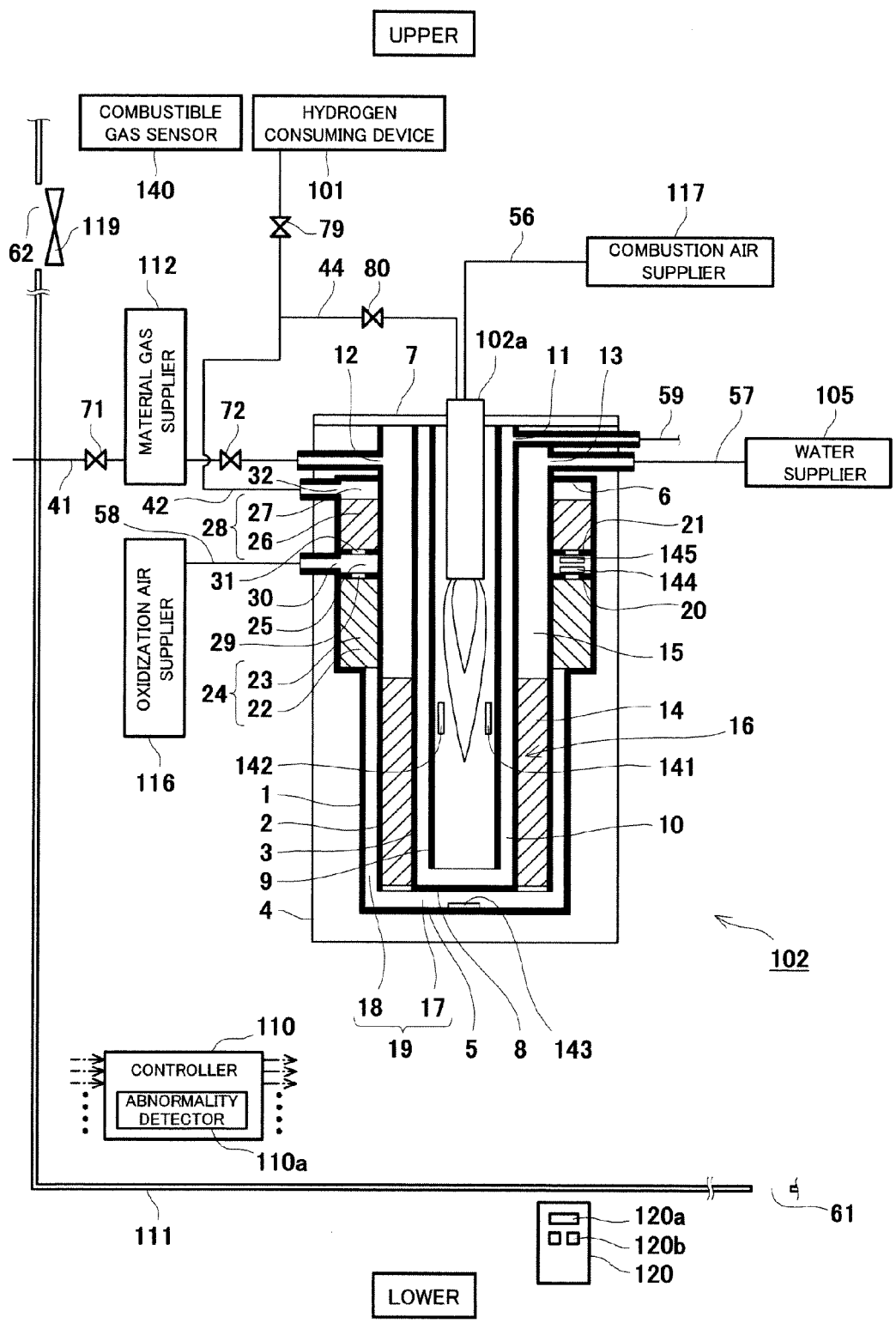
FIG. 2 is a view showing a schematic configuration of a hydrogen generator according to Embodiment 2 of the present invention.

FIG. 2 is a view showing a schematic configuration of a hydrogen generator according to Embodiment 2 of the present invention. In FIG. 2, upper and lower sides of the hydrogen generator are upper and lower sides in FIG. 2, and a part of the hydrogen generator is omitted.

As shown in FIG. 2, the hydrogen generator 102 according to Embodiment 2 of the present invention includes the combustion air supplier 117, the material gas supplier (raw material supplier) 112, the water supplier 105, an oxidizing air supplier 116, the controller 110, the abnormality determiner 110a, a remote control device 120, a package 111 formed by a housing, and detectors 140 to 145. A user operates the remote control device 120 to start and shut-down the operation of the hydrogen generator 102. In the interior of the package 111, components of the hydrogen generator 102, or the like, are accommodated. The abnormality determiner 110 constitutes the abnormality detector of the present invention and is configured to determine the abnormalities based on detected values of the detectors 140 to 145.

The hydrogen generator 102 is, in this embodiment, cylindrical, and includes a container 1, an outer tube 2 and an inner tube 3 which have a common center axis. The container 1 is formed by a stepped cylinder, having a large-diameter portion at an upper portion and a small-diameter portion which is smaller in diameter than the larger-diameter portion at a lower portion. A lower end of the container 1 is closed by a bottom plate 5, and an upper end thereof is coupled to the outer tube 2 via an annular plate member 6. Outside the container 1, a heat-insulating member 4 covers the container 1.

An upper end of the outer tube 2 and an upper end of the inner tube 3 are closed by a lid member 7. On the other hand, a lower end of the outer tube 2 is open and a lower end of the inner tube 3 is closed by an inner tube bottom plate 8. Inside the inner tube 3, a cylindrical radiation tube 9 is provided.

An upper end of the radiation tube 9 is closed by the lid member 7, and a lower end thereof is open. A tubular space formed between the radiation tube 9 and the inner tube 3 forms a combustion gas passage 10. In the vicinity of the downstream end (upper portion of the inner tube 3) of the combustion exhaust passage 10, a combustion exhaust gas outlet 11 is provided. The upstream end of the combustion gas path 59 is coupled to the combustion exhaust gas outlet 11, and the downstream end thereof opens outside the package 11.

Inside the radiation tube 9, the burner (combustor) 102a extends downward to penetrate the lid member 7. Inside the radiation tube 9, an ignition detector 141 and a CO sensor 142 are provided. The ignition detector 141 detects whether or not ignition has occurred in the burner 102a and outputs a detection signal to the controller 110. The CO sensor 142 detects a concentration of carbon monoxide contained in the combustion exhaust gas from the burner 102a and outputs a detection signal to the controller 110. In this embodiment, as the ignition detector 141, a frame rod is used, and as the CP detector 142, a CO concentration sensor is used.

The downstream end of the combustion air supply path 56 is coupled to the burner 102a, and the upstream end thereof is coupled to the combustion air supplier 117. As the combustion air supplier 117, for example, a blower or a fan such as a sirocco fan may be used.

The material gas is introduced from the material gas supplier 112 to a material gas supply port 12, flows through the interior of the hydrogen generator 102, and is supplied to the burner 102a as a combustion fuel to the burner 102a through a bypass path 44 that bypasses the hydrogen consuming device 101. Thereby, the burner 102a combusts the combustion fuel supplied from the material gas supplier 112 with the combustion air supplied from the combustion air supplier 117, to generate the combustion exhaust gas. The generated combustion exhaust gas flows out through a tip end (lower end) of the radiation tube 9, contacts a bottom wall of the inner tube bottom plate 8, and then flows upward and is supplied to the combustion exhaust gas path 59 through the combustion exhaust gas passage 10. Then, the combustion exhaust gas is exhausted outside the hydrogen generator 102 (to be specific, package 111) through the combustion exhaust gas path 59.

At an upper portion of the outer tube 2, the material gas supply port 12 is provided. The downstream end of the material gas supply path 41 is coupled to the material gas supply port 12. As the material gas, a city gas containing methane as a major component is used. The upstream end of the material gas supply path 41 is coupled to a pipe (not shown) of the city gas. A first on-off valve 71, the material gas supplier 112 and a second on-off valve 72 are arranged from its upstream side on the material gas supply path 41. The first on-off valve 71 and the second on-off valve 72 are configured to permit/inhibit passage of the material gas flowing through the material gas supply path 41, and may be, for example, an electromagnetic valve. The material gas supply path 112 is a device for controlling the flow rate of the material gas supplied to the hydrogen generator 102, and is constituted by, for example, a combination of a booster pump and a flow control valve, or consists of the flow control valve.

At an upper portion of the outer tube 2, a water supply port 13 is provided. The downstream end of a reforming water supply path 57 is coupled to the water supply port 13. The water supplier 105 is coupled to the upstream end of the reforming water supply path 57. The water supplier 105 supplies reforming water to the reforming water supply path 57 and controls the flow rate of the reforming water flowing through the reforming water supply path 57.

A reforming catalyst accommodating space is formed at a lower portion of the tubular space between the outer tube 2 and the inner tube 3. A reforming catalyst layer 14 filled with reforming catalyst is formed in the reforming catalyst accommodating space. Above the reforming catalyst accommodating space, an evaporator 15 is formed to preheat the material gas and the reforming water. The reformer 16 is formed by the reforming catalyst accommodating space and the reforming catalyst layer 14. In the reformer 16, the evaporator 15 preheats the material gas (methane) supplied from the material gas supplier 112 and the reforming water supplied from the water supplier 105, by utilizing heat transferred from the combustion exhaust gas generated in the burner 102a, and the reforming catalyst layer 14 causes the steam reforming reaction to occur using the material gas and reforming water preheated, thereby generating the hydrogen-containing gas containing hydrogen.

A space is formed between the bottom plate 5 and the inner tube bottom plate 8 and forms a buffer space 17. At a center portion of the bottom plate 5 in the buffer space 17, a temperature detector 143 is provided.

The temperature detector 143 is configured to detect the temperature of the hydrogen-containing gas which has flowed through the reformer 16 and output the detected temperature to the controller 110 as the temperature of the reformer 16. Although in this embodiment, the temperature detector 143 is provided below the downstream end of the reformer 16 and is configured to detect the temperature of the hydrogen-containing gas which has flowed through the reformer 16, the present invention is not limited to this. The temperature detector 143 may be provided inside the reforming catalyst layer 14 of the reformer 16 and detect the temperature of the hydrogen-containing gas flowing through the reforming catalyst layer 14 of the reformer 16.

A tubular space 18 is formed between the container 1 and the outer tube 2 and is connected to the buffer space 17. A hydrogen-containing gas passage 19 is constituted by the space 18 and the buffer space 17. Thus, a hydrogen-containing gas which has flowed through the reformer 16 outflows to the buffer space 17 through the downstream end of the reforming catalyst layer 14, contacts the bottom wall of the bottom plate 5, is inverted and then flows through the hydrogen-containing gas passage 19.

A pair of separating plates 20 and 21 are provided in the tubular space between the large-diameter portion of the container 1 and the outer tube 2 above the hydrogen-containing gas passage 19 such that the separating plates 20 and 21 are axially spaced a predetermined distance apart from each other. The pair of separating plates 20 and 21 separate the tubular space into a shift catalyst accommodating space 22, an air mixing section 25 and an oxidization catalyst accommodating space 26.

A shift catalyst layer 23 filled with a shift catalyst is formed inside the shift catalyst accommodating space 22. A shift converter 24 is composed of the shift catalyst accommodating space 22 and the shift catalyst layer 23. The separating plate 20 is provided with a plurality of through-holes 29 for providing communication between the shift converter 24 and the air mixing section 25. The through-holes 29 constitute an outlet 29 of the shift converter 24. Thereby, the hydrogen-containing gas which has flowed through the hydrogen-containing gas passage 19 flows into the shift converter 24. While the hydrogen-containing gas is flowing through the shift catalyst layer 23, a shift reaction occurs between carbon monoxide in the hydrogen-containing gas and water to generate carbon dioxide and hydrogen, thereby reducing carbon monoxide. The hydrogen-containing gas, carbon monoxide of which has been reduced, outflows into the air mixing section 25 through the outlet 29 of the shift converter 24.

The container 1 forming the air mixing section 25 is provided with an air supply inlet 30 through which air for oxidization reaction of carbon monoxide is supplied. The downstream end of the oxidization air supply path 58 is connected to the air supply inlet 30, while the upstream end thereof is connected to the oxidization air supplier 16. In this configuration, the hydrogen-containing gas which has outflowed through the outlet 29 of the shift converter 24 into the air mixing section 25 is mixed with the air supplied from the oxidization air supplier 116.

A temperature detector 144 is provided in the air mixing section 25 in a location above the outlet 29 of the shift converter 24. The temperature detector 144 is configured to detect the temperature of the hydrogen-containing gas which has flowed through the shift converter 24 and output the detected temperature to the controller 110 as the temperature of the shift converter 24. Although in this embodiment, the temperature detector 144 is provided above the outlet 29 of the shift converter 24 to detect the temperature of the hydrogen-containing gas which has flowed through the shift converter 24, the present invention is not limited to this. The temperature detector 144 may be provided inside the shift catalyst layer 23 of the shift converter 24 to detect the temperature of the hydrogen-containing gas flowing through the shift catalyst layer 23 of the shift converter 24.

An oxidization catalyst layer 27 filled with the oxidization catalyst is formed inside the oxidization catalyst accommodating space 26. A purifier 28 is composed of the oxidization catalyst accommodating space 26 and the oxidization catalyst layer 27. The separating plate 21 is provided with a plurality of through-holes 31 for providing communication between the air mixing section 25 and the purifier 28. The through-holes 31 constitute an inlet 31 of the purifier 28. A temperature detector 145 is provided in the air mixing section 25 in a location below the inlet 31 of the purifier 28. The temperature detector 145 detects the temperature of a mixture gas of the hydrogen-containing gas and air flowing into the purifier 28 and output the detected temperature to the controller 110 as the temperature of the purifier 28. Although in this embodiment, the temperature detector 145 is provided below the inlet 31 of the purifier 28 and is configured to detect the temperature of the fuel gas before flowing through the purifier 28, the present invention is not limited to this. The temperature detector 145 may be provided inside the oxidization catalyst layer 27 of the purifier 28 and may be configured to detect the temperature of the fuel gas flowing through the oxidization catalyst layer 27 of the purifier 28.

A fuel gas outlet 32 is provided at the upper portion of the container 1 forming the oxidization catalyst accommodating space 26. The upstream end of the fuel gas supply path 42 is connected to the fuel gas outlet 32, while the downstream end thereof is connected to the hydrogen consuming device (e.g., fuel cell) 101. A fuel gas valve 79 is provided in a location of the fuel gas supply path 42. The upstream end of the bypass path 44 is coupled to the upstream end of the fuel gas supply path 42. The downstream end of the bypass path 44 is coupled to the burner 102a. A bypass valve 80 is provided in the bypass path 44.

Thereby, the hydrogen-containing gas which has been mixed with air in the air mixing section 25 flows into the purifier 28 through the through-holes 31 (inlet 31 of the purifier 28) of the separating plate 21, carbon monoxide in the hydrogen-containing gas reacts with oxygen in air while the hydrogen-containing gas is flowing through the oxidization catalyst layer 27, to generate the fuel gas, and a carbon monoxide of which has been reduced to several ppm. The generated fuel gas flows to the fuel gas supply path 42 through the fuel gas outlet 32 and is supplied to the hydrogen generator 102.

Although the hydrogen generator 102 of Embodiment 2 is provided with the shift converter 24 and the purifier 28, the shift converter 24 and the purifier 28 may be omitted if it is not necessary to further reduce carbon monoxide contained in the hydrogen-containing gas generated in the reformer 16. For example, if the hydrogen consuming device 101 is a device (e.g., solid oxide fuel cell) which is poisoned less easily by carbon monoxide, the above configuration may be used.

The package 111 is provided with an air inlet 61 and an air outlet 62 at suitable locations. The air inlet 61 and the air outlet 62 are desirably distant from each other as far as possible so that outside air flows through the inside of the entire package 111. The air outlet 62 is preferably provided at the upper portion of the package 11 where a combustible gas tends to be stagnant. A ventilation fan 119 is provided in the vicinity of the air outlet 62. As the ventilation fan 119, a fan such as a sirocco fan may be used.

Thus, outside air is suctioned through the air inlet 61 by the ventilation fan 119 and the suctioned outside air is exhausted through the air outlet 62.

Within the package 111 of the fuel cell system 100, a combustible gas sensor 140 is provided. The combustible gas sensor 140 is configured to detect a leakage (concentration) of the combustible gas (e.g., material gas or hydrogen gas) within the package 111 and output the detected combustible gas concentration to the controller 110. In this Embodiment, the combustible gas sensor 140 is provided at the upper portion of the package 111 where the combustible gas tends to be stagnant, and in the vicinity of the ventilation fan 119.

Within the package 111, the controller 110 is provided. The controller 110 is constituted by a computer such as a microcomputer, and includes a calculation section constituted by a CPU, a memory section constituted by a memory or the like, a communication section, and a timer section having a calendar function (not shown). The calculation section is configured to read out a predetermined control program stored in the memory section and execute the program to control the hydrogen generator 102. The calculation section is configured to process data stored in the memory section and data input from the operation input section. Particularly, the calculation section also serves as the abnormality determiner 110a configured to determine whether or not abnormality which is followed by the shut-down of the hydrogen generator 102 has occurred, based on an abnormality determination program which is read out from the memory section and data (physical amounts) received from the detectors 140 to 145 as inputs. If the abnormality determiner 110a determines that the abnormality has occurred, an abnormal shut-down process of the hydrogen generator 102 is executed as described later.

As used herein, the term "controller" encompasses not only a single controller but also a controller group in which a plurality of controllers cooperate to control the hydrogen generator 102. Therefore, the controller 110 need not be constituted by a single controller but may be a plurality of controllers which are distributed and are configured to cooperate with each other to control the hydrogen generator 102.

Although the controller 110 determines whether or not the detected values received from the detectors 140 to 145 as inputs are abnormal, the present invention is not limited to this. The detectors 140 to 145 may include calculators such as microcomputers to determine whether or not there is an abnormality based on the detected physical amounts.

The remote control device 120 includes a control section (not shown) constituted by a microcomputer, a communication section (not shown), a display section 120a and a key operation section 120b. The control section controls the communication section, and others. In the remote control device 120, the communication section receives a control signal and the control section processes the control signal and transmits it to the display section 120a. An operation signal is input with the key operation section 120b of the remote control device 120 and is sent to the controller 110 via the control section and the communication section of the remote control device 120 and is received in the communication section of the controller 110. Hereinafter, for easier explanation, it is assumed that signals are sent between the controller 110 and the remote control device 120 without communication between communication sections of the controller 110 and the remote control device 120 and processing in the control section in the remote control device 120.

[Operation of Hydrogen Generator]

Subsequently, a start-up process (start-up operation) of the hydrogen generator 102 according to Embodiment 2 will be described with reference to FIG. 1. Upon the user operating the remote control device 120, the controller 110 starts controlling of the hydrogen generator 102, to carry out the following operation.

First of all, the first on-off valve 71 and the second on-off valve 72 open, and the material gas supplier 112 operates. Thus, the material gas is introduced into the burner 102a through the hydrogen generator 102 and the bypass path 44. Combustion air is supplied from the combustion air supplier 117 to the burner 102a via the combustion air supply path 56. The burner 102a combusts the supplied material gas by the combustion air to generate a combustion exhaust gas. In this case, the ignition detector 141 detects whether or not ignition has occurred in the burner 102a and outputs the detected signal to the controller 110. The CO sensor 142 detects a concentration of carbon monoxide contained in the combustion exhaust gas from the burner 102a and outputs the detected concentration of carbon monoxide to the controller 110.

The combustion exhaust gas flows out through the tip end (lower end) of the radiation tube 9 at the burner 102a, contacts the bottom wall of the inner tube bottom plate 8, and flows upward and is supplied to the combustion exhaust gas path 59 through the combustion exhaust gas passage 10. The combustion exhaust gas supplied to the combustion exhaust gas path 59 is exhausted to outside the hydrogen generator 102 (to be specific package 111) through the combustion exhaust gas path 59. In this case, the reformer 16, the shift converter 24 and the purifier 28 in the hydrogen generator 102 are heated by heat transferred from the combustion exhaust gas.

When the controller 110 determines that the temperature of the evaporator 15 reaches a temperature (e.g., 120 degrees C.) at which the evaporator 15 can evaporate the water, based on the temperature detected by the temperature detector 143, the controller 110 opens the second on-off valve 72, and starts the operation of the water supplier 105. As a result, the material gas is supplied from the material gas supplier 112 to the evaporator 15 in the reformer 16 of the hydrogen generator 102 through the material gas supply path 41, and the reforming water is supplied from the water supplier 105 through the reforming water supply path 57. The preheating section heats the supplied water to generate the steam. The steam reforming reaction proceeds between the steam and the material gas proceeds while the steam and the material gas are flowing through the reforming catalyst layer 14, thereby generating the hydrogen-containing gas containing hydrogen.

Then, the hydrogen-containing gas generated in the reformer 16 flows out through the downstream end of the reforming catalyst layer 14 and flows through the hydrogen-containing gas passage 19. Then, the hydrogen-containing gas flows into the shift converter 24, and carbon monoxide is reduced through a shift reaction between carbon monoxide in the hydrogen-containing gas and the water while flowing through a shift catalyst layer 23. The hydrogen-containing gas, carbon monoxide of which has been reduced, flows out into the air mixing section 25 though the outlet 29 of the shift converter 24. At this time, the temperature detector 144 detects the temperature of the hydrogen-containing gas that has flowed out through the outlet 29 of the shift converter 24, and outputs the detected temperature to the controller 110.

Then, the hydrogen-containing gas that has flowed into the air mixing section 25 though the outlet 29 of the shift converter 24 is mixed with the air supplied from the oxidizing air supplier 116. Then, the hydrogen-containing gas that has been mixed with the air in the air mixing section 25 flows into the purifier 28 through the inlet 31 of the purifier 28. At this time, the temperature detector 145 detects the temperature of the mixture gas of the hydrogen-containing gas and the air that flows into the purifier 28, and outputs the detected temperature to the controller 110.

Then, while the mixture gas of the hydrogen-containing gas and the air that has flowed into the purifier 28 is flowing through the oxidization catalyst layer 27, carbon monoxide in the hydrogen-containing gas reacts with oxygen in air, to generate the fuel gas, a carbon monoxide of which has been reduced to several ppm. The generated fuel gas is supplied to the fuel gas supply path 42 through the fuel gas outlet 32.

When the temperature detector 143 attached to the reformer 102 in the hydrogen generator 102, the temperature detector 144 attached to the shift converter 24 in the hydrogen generator 102, and the temperature detector 145 attached to the purifier 28 in the hydrogen generator 102 detect predetermined temperatures (e.g., the temperature of the reformer 16 is 600~650 degrees C., the temperature of the shift converter 24 is 200~250 degrees C., and the temperature of the purifier 28 is 130~170 degrees C.), the controller 110 determines that carbon monoxide has been removed sufficiently from the fuel gas, and terminates the start-up process of the fuel cell system 100.

Next, the power generation process (power generation operation) of the fuel cell system 100 of Embodiment 1 will be described.

Initially, when the temperature detected by the temperature detector 143 attached to the reformer 16 in the hydrogen generator 102, the temperature detected by the temperature detector 144 attached to the shift converter 24 in the hydrogen generator 102, and the temperature detected by the temperature detector 145 attached to the purifier 28 in the hydrogen generator 102 reach the associated predetermined temperatures, the controller 110 opens the fuel gas valve 79 and supplies the fuel gas from the hydrogen generator 102 to the hydrogen consuming device 101. During a period when carbon monoxide has not been reduced from the fuel gas sufficiently yet, the fuel gas valve 79 is closed, and the fuel gas generated in the hydrogen generator 102 is not supplied to the hydrogen consuming device 101 but is supplied to the burner 102a through the bypass path 44. During a period when the gas generated in the hydrogen generator 102 is not supplied to the hydrogen consuming device 101 but is supplied to the burner 102a through the bypass path 44, the bypass valve 80 is opened under control of the controller 110. When carbon monoxide has been reduced from the fuel gas sufficiently and the fuel gas is supplied to the hydrogen-containing device 101, the controller 110 opens the fuel gas valve 79 and opens the bypass valve 80. As a result, the fuel gas is introduced into the burner 102a through the bypass path 44 and is combusted therein. Thus, the temperature of the hydrogen generator 102 is maintained at a suitable temperature to generate the hydrogen-containing gas of a high quality and with a low carbon monoxide concentration.

Next, the normal shut-down process (shut-down operation) of the hydrogen generator 102 according to Embodiment 2 will be described. As used herein, the normal shut-down process refers to a shut-down process which is different from a shut-down process (abnormal shut-down process) performed when the abnormality detector detects an abnormality, during the operation of the hydrogen generator 102. For example, the normal shut-down process refers to a shut-down process which is performed when it is not necessary to consume hydrogen in a hydrogen consuming device. Also, the normal shut-down process refers to a shut-down process which is performed when the hydrogen consuming device is a hydrogen tank and hydrogen stored in the hydrogen tank becomes a fuel level during an operation of the hydrogen generator 102. Also, the normal shut-down process refers to a shut-down process which is performed when the hydrogen consuming device is a fuel cell and a power demand of a power load decreases to a value which is not more than a predetermined threshold at which the power generation operation is unnecessary, or a shut-down process or the like which is performed at a preset shut-down time.

In the present invention, the shut-down process (shut-down operation) is defined as an operation performed from when the controller 110 outputs a shut-down signal until the hydrogen generator 102 has completed the shut-down process. After the hydrogen generator 102 completes the shut-down process, the controller 110 is operating and the components other than the controller 110 are in a stopped state. If a start-up request is generated, the controller 110 outputs a start-up command, and the hydrogen generator 102 quickly shifts to a stand-by mode in which the hydrogen generator 102 can start the start-up process.

Figure 3:
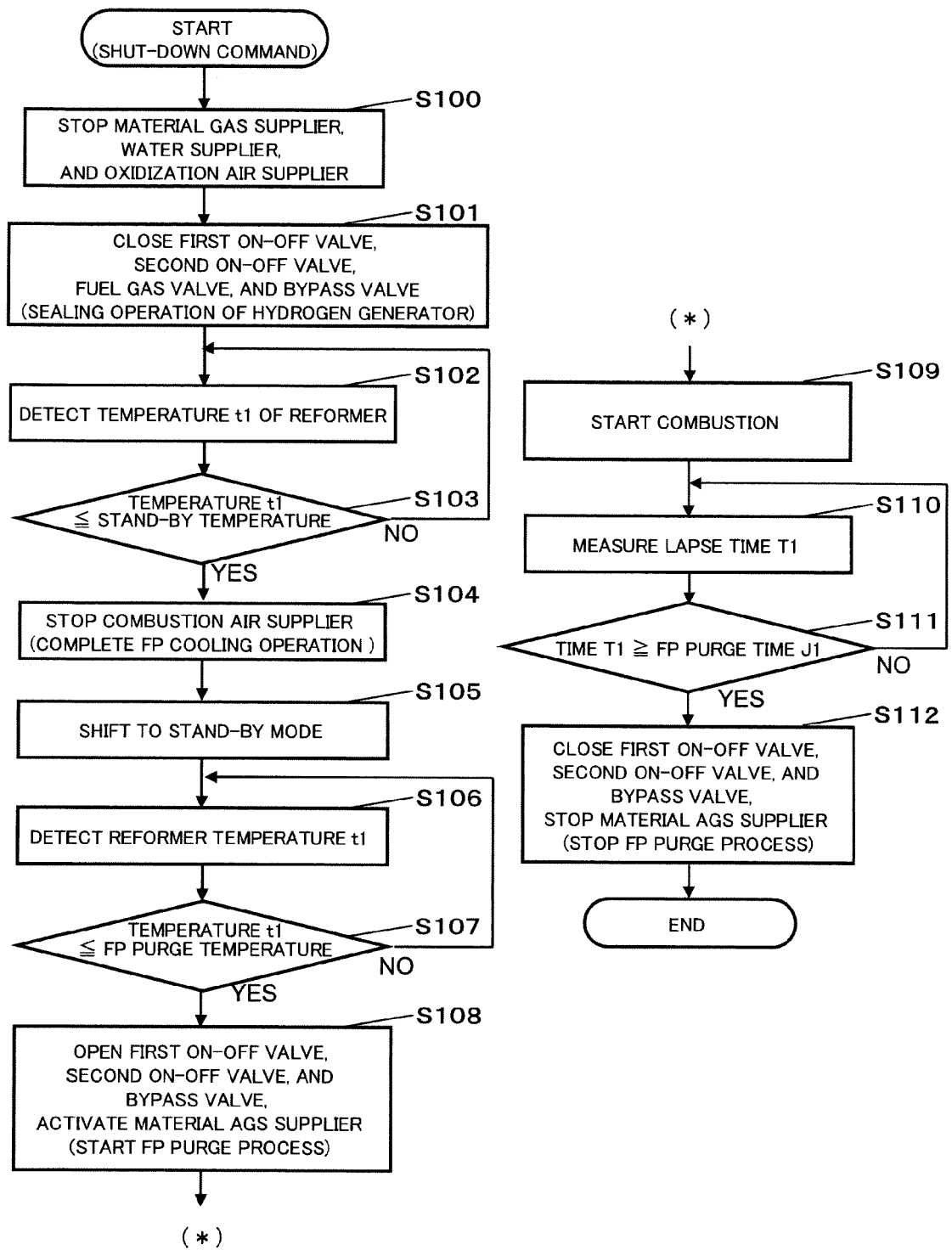
FIG. 3 is a flowchart showing an exemplary normal shut-down process in the hydrogen generator according to Embodiment 2 of the present invention.

The normal shut-down process (shut-down operation) of the hydrogen generator 102 according to Embodiment 2 will be described with reference to FIG. 3. FIG. 3 is a flowchart showing an exemplary normal shut-down process in the hydrogen generator 102 according to Embodiment 2 of the present invention.

When the controller 110 outputs the shut-down command, the booster pump as the material gas supplier 112 stops its operation and the water supplier 105 stops its operation. In addition, the oxidizing air supplier 11 stops its operation. Thereby, the supply of the material gas and the supply of the water to the hydrogen generator 102 stop, and the supply of the oxidizing air to the air mixing section 25 stops. Then, the first on-off valve 71 and the second on-off valve 72 provided on the material gas supply path 41 are closed, and the fuel gas valve 79 and the bypass valve 80 are closed (step S101), to provide discommunication between the interior of the hydrogen generator 102 and outside air (sealing operation) of hydrogen generator).

In the above configuration, during a period before the bypass valve 80 is closed in step S101, the burner 102a continues combustion. When the bypass valve 80 is closed in step S101 and the supply of the fuel gas to the burner 102a stops, the burner 102a stops the combustion of the fuel gas and the combustion air. Regarding the stop of combustion in the burner 102a, the gas remaining within the radiation tube 9 is exhausted to outside the housing 111 with the air supplied from the combustion air supplier 117 after the flame is extinguished. Thus, the burner 102a completes the combustion stop process.

Then, after the burner 102a stops the combustion, the combustion air supplier 117 operates, to deprive heat from the reformer 16 or the like with the combustion air supplied to the burner 102a, thereby cooling the hydrogen generator 102 including the reformer 16 (cooling operation of the hydrogen generator 102).

During the cooling operation, the temperature detector 143 attached on the reformer 16 of the hydrogen generator 102 detects a temperature t1 of the reformer 16 (step S102). If the detected temperature t1 is not higher than a stand-by temperature (e.g., 500 degrees C.) (Yes in step S103), the combustion air supplier 117 stops the supply of the combustion air to the burner 102a (step S104), and the cooling operation of the hydrogen generator 102 completes. It should be noted that the stand-by temperature is a temperature at which the hydrogen generator 102 can shift to a stand-by mode, and is defined as, for example, an upper limit temperature at which no carbon is deposited even if only the material gas is supplied to the hydrogen generator 102.

When the cooling operation for cooling the hydrogen generator 102 to the stand-by temperature completes, the hydrogen generator 102 shifts to the stand-by mode (step S105). The stand-by mode refers to a state in which the hydrogen generator 102 is awaiting next start of operation of the hydrogen generator 102, and is defined as, for example, a state in which the hydrogen generator 102 is ready to perform a next start-up process in response to a start-up command output from the controller 110 when a predetermined start-up request is generated. Examples of the start-up request may include the fact that the user operates the key operation section 120b of the remote control device 120 to make an operation request, a need for hydrogen in the hydrogen consuming device 101 arises, etc. Therefore, if the start-up request is made prior to executing a FP purge process as described below, in the stand-up mode of the hydrogen generator 102, the controller 110 outputs a star-up command without executing the FP purge process. Thus, the hydrogen generator 102 performs a next start-up process.

In the stand-by mode, the hydrogen generator 102 is naturally cooled. During this time, the temperature detector 143 attached to the reformer 16 of the hydrogen generator 102 detects the temperature t1 of the reformer 16 (step S106). When the detected temperature reaches a temperature which is not higher than a FP purge temperature (e.g., 300 degrees C.) which is lower than the stand-by temperature (Yes in step S107), the first on-off valve 71, the second on-off valve 72, and the bypass valve 80 are opened, and the material gas supplier 112 supplies the material gas to the hydrogen generator 102 (step S108). Thereby, the material gas purges a gas such as steam remaining in reactors such as the reformer 16 provided within the hydrogen generator 102, and exhausts the gas from the hydrogen generator 102 (purge process for the hydrogen generator 102 (hereinafter FP (Fuel processor) purge process)). The gas is exhausted to the burner 102a through the bypass path 44 and is combusted therein (step S109). This FP purge process can suppress the steam from condensing into water which would degrade catalysts such as a reforming catalyst, in the interior of the hydrogen generator 102. The purge temperature is defined as a temperature at which no carbon is deposited from the material gas within the reformer 16 in view of addition of a temperature increase in the reformer 16, which results from the combustion operation in the burner 102a in the purge process for the hydrogen generator 102. Although in Embodiment 2, the material gas is used as a replacement gas and the material gas supplier 112 constitutes a replacement gas supplier for supplying the replacement gas to the reformer 16, the present invention is not limited to this, but an inert gas such as a nitrogen gas may be used as the replacement gas, for example. In that case, a gas tank which stores the inert gas such as nitrogen gas and supplies the inert gas to the reformer 16 may be provided as the replacement gas supplier.

Then, the controller 110 measures a time $T_1$ that lapses after the FP purge process has started (step S110). When the lapse time T1 reaches a time which is not less than a FP purge time J1 (Yes in step S111), the material gas supplier 112 is stopped, and the first on-off valve 71, the second on-off valve 72 and the bypass valve 80 are closed (FP purge process terminates) (step S112). The purge time is defined as a time required to purge the steam from at least the hydrogen generator 102. Thus, the normal shut-down process terminates.

Thus, in the case where the hydrogen generator 102 according to Embodiment 2 shifts to the shut-down operation in a normal state, the hydrogen generator 102 is configured to execute a shut-down process (e.g., sealing operation for providing discommunication between the hydrogen generator 102 and outside air) which protects at least the function of the hydrogen generator 102, and quickly shift to the stand-by mode. In addition, the hydrogen generator 102 is configured to execute the minimum and necessary cooling operation such as the exhaust heat recovery operation, until the hydrogen generator 102 reaches a temperature condition in which the hydrogen generator 102 can re-start-up (i.e., the temperature of the reformer 16 reaches the temperature which is not higher than the stand-by temperature). Therefore, the hydrogen generator 102 can shift to the stand-by mode quickly. Also, in the next start-up process, the temperatures of the components of the hydrogen generator 101, such as the reformer 16, are higher than ambient temperature (outside temperature) depending on the time which lapses after the hydrogen generator 102 shifts to the stand-by mode, an energy required to raise the temperature of the hydrogen generator 102 is reduced, a time required for the start-up process is reduced, and the start-up of the hydrogen generator 102 is facilitated.

Although in the shut-down process of the hydrogen generator 102 according to Embodiment 2, the cooling operation for the hydrogen generator 102 is performed, the present invention is not limited to this, but the cooling operation may not be performed, for example. To be specific, the hydrogen generator 102 may be provided with a combustion fuel supply path which branches from the material gas supply path 41 to directly supply the material gas as the combustion fuel to the burner 102a, and in a step of temperature increase in the start-up process of the hydrogen generator 102, the burner 102a may perform combustion using the combustion fuel supplied via the combustion fuel supply path (assist combustion system). In the start-up process of the hydrogen generator 102 so configured, it is not necessary to flow only the material gas inside the hydrogen generator 102 in the step of temperature increase of the hydrogen generator 102, and therefore, it is not necessary to perform the cooling operation. Also, if a system in which the material gas and water are supplied together to the hydrogen generator 102 is used, instead of using the assist combustion system, a chance that a carbon will be deposited is reduced, and therefore, it is not necessary to perform the cooling operation.

Although in the shut-down process of the hydrogen generator 102 of Embodiment 2, the FP purge process is executed, it may be omitted.

Next, the shut-down process (hereinafter referred to as abnormality detection/shut-down process) performed when an abnormality is detected by the detectors 140 to 145 according to Embodiment 2 will be described.

Initially, in particular, the abnormality (which is followed by the shut-down of the operation of the hydrogen generator 102), detected by each abnormality detector in the hydrogen generator 102 according to Embodiment 1, will be described with reference to FIG. 4. FIG. 4 is a table showing examples of abnormality.

In the present invention, the abnormality which is followed by the shut-down of the operation of the hydrogen generator 102 is defined to include a first abnormality and a second abnormality. In other words, the abnormality which is followed by the shut-down of the operation of the hydrogen generator 102 may be defined to include abnormalities other than the first abnormality and the second abnormality.

As used herein, the first abnormality refers to an abnormality in a case where a predetermined shut-down process corresponding to the abnormality detected by each of the detectors 140 to 145 is performed, and the hydrogen generator 102 shifts to the stand-by mode without an operator's maintenance operation. The first abnormality includes, for example, an abnormality which may possibly be obviated by performing a predetermined restoration process corresponding to each abnormality As used herein, the second abnormality refers to an abnormality in a case where a predetermined shut-down process corresponding to the abnormality determined by the abnormality determiner 110a based on the detected value of each of the detectors 140 to 145 is performed, and the hydrogen generator 102 cannot shift to the stand-by mode unless the maintenance operator performs the maintenance operation. In other words, the second abnormality refers to an abnormality in a case where, even if the shut-down process terminates after the abnormality is detected by each of the detectors 140 to 145, the start-up is not permitted, the controller 110 does not output a start-up command irrespective of generation of a start-up request, and therefore, the hydrogen generator 102 does not start the start-up process, unless the maintenance operator performs the maintenance operation. As used herein, the maintenance operation refers to an operation in which the maintenance operator comes to a place where the hydrogen generator 102 is installed and performs an abnormality restoration operation or repair of the hydrogen generator 102.

As shown in FIG. 4, in this embodiment, a burner misfire abnormality is determined as the first abnormality. This abnormality is merely exemplary and abnormalities other than this abnormality may be determined as the first abnormality.

The burner misfire abnormality means that the ignition detector 141 does not detect the ignition of the burner 102a during a hydrogen generation operation after a hydrogen generation reaction in the hydrogen generator 102 is initiated. Therefore, this abnormality does not include an ignition abnormality at the start of the combustion in the burner 102a in the start-up process of the hydrogen generator 102, but refers to a misfire abnormality occurring during the start-up process and during the supply of the fuel gas to the hydrogen utilizing device 101 after the burner 102 stably performs the combustion, the temperature of the hydrogen generator 102 rises and the hydrogen generator 102 shifts to the steam reforming reaction.

A specific example of this abnormality is assumed as follows. For example, in the start-up process of the hydrogen generator 102, when the water supplier 105 starts supplying of water while the material gas supplier 112 is supplying the material gas, in a state where the temperature of the reformer 16 reaches a temperature (e.g., 500 degrees C.) at which the reforming reaction can occur, and the temperature of the evaporator 15 reaches a temperature (e.g., 100 degrees C.) at which the water can be evaporated, a volume expansion occurs in the evaporator 15 due to water evaporation and thereby the flow rate of the gas supplied to the burner 102a fluctuates, causing unstable combustion in the burner 102a. In this case, the ignition detector 141 detects a misfire in the burner 102a, and the abnormality determiner 110a determines that a misfire has occurred in the burner 102a based on a detection signal from the ignition detector 141. The reason why this abnormality is treated as the first abnormality is that this abnormality is not a fatal abnormality which requires change of device in maintenance, for example, a failure of a device relating to combustion in the burner 102a, such as the material gas supplier 112 or the combustion air supplier 117, but might be an abnormality which occurs accidentally due to a transient flow rate fluctuation of the gas (combustion fuel or air) supplied to the burner 102a.

If the same first abnormality is detected several times (e.g., three times) per week or twice in succession after the re-start-up, for example, this abnormality is determined as the second abnormality and the shut-down process corresponding to this abnormality is performed.

As shown in FIG. 4, in this embodiment, as the second abnormality, there are failures of components (e.g., failure of temperature detector, failure of CO sensor, and failure of combustion air supplier), gas leakage abnormalities (e.g., combustible gas leakage abnormality), detected temperature abnormalities of the temperature detectors (e.g., excess increase and excess decrease in the reforming temperature). These abnormalities are merely exemplarily and a part of these abnormalities may be determined as the second abnormality or abnormalities other than these abnormalities may be determined as the second abnormality.

The abnormality with which the failure of the temperature detector is assumed is, for example, abnormality in which in a case where the temperature detectors 143 to 145 are thermistors, the detected values indicate a short-circuit or disconnection. In this embodiment, this abnormality is treated as the second abnormality and the shut-down process corresponding to this abnormality is performed.

The abnormality with which the failure of the CO sensor is assumed, is, for example, an abnormality in which in a case where the CO sensor 142 is a contact combustion sensor, the value detected by this sensor indicates disconnection of an electric resistance. In this embodiment, this abnormality is determined as the second abnormality.

The abnormality with which the failure of the combustion air supplier is assumed is, for example, an abnormality in which the number of rotations of the combustion air supplier 117 is outside an allowable range with respect to the operation amount commanded by the controller 110 (e.g., the rotation number does not reach a target rotation number for a predetermined time or longer even though the operation amount is set larger with respect to a set operation amount corresponding to the target rotation number). This abnormality may possibly occur when a desired rotation number corresponding to a command value of the operation amount cannot be obtained because of degradation of a motor. Therefore, this abnormality is determined as the abnormality with which the failure of the combustion air supplier is assumed and as the second abnormality in this embodiment.

The combustible gas leakage abnormality refers to an abnormality in which the combustible gas sensor 140 detects a combustible gas. For example, this abnormality may occur when a combustible gas (material gas, fuel gas, and other gases) leaks into the package 111 and the combustible gas sensor 140 detects the combustible gas. In this embodiment, this abnormality is determined as the second abnormality.

For the failure of each abnormality detector, among the above stated abnormalities, the abnormality determiner 110a operates as an abnormality detector of the present invention, while for abnormalities different from the failures of the detectors, the abnormality determiner 110a and a detector for outputting a detected value used to determine whether or not there is an abnormality, operate as the abnormality detector of the present invention.

Next, the abnormality detection and the following shut-down process (abnormality detection/shut-down process) in the hydrogen generator 102 of Embodiment 2 will be described with reference to FIG. 5.

Figure 5:
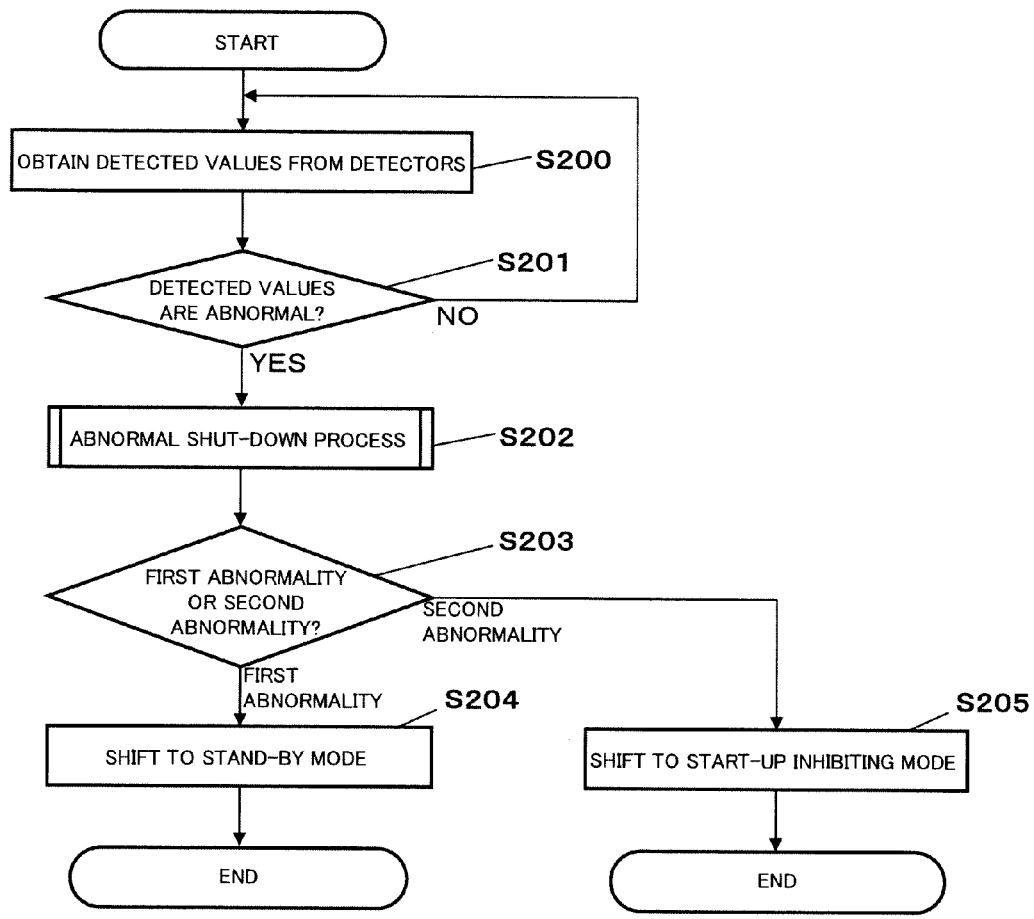
FIG. 5 is a flowchart schematically showing a content of an abnormality detection/shut-down process program stored in a memory section of a controller in the hydrogen generator of FIG. 2.

FIG. 5 is a flowchart schematically showing a content of an abnormality detection/shut-down process program stored in the memory section of the controller 110 in the hydrogen generator 102 of FIG. 2.

Initially, during the power generation operation of the hydrogen generator 102, the calculation section of the controller 110 obtains the values detected by the detectors 140 to 145 (step S200) and determines whether or not the values detected in step S200 are abnormal (step S201). If it is determined that these detected values are not abnormal, the process returns to step S200 and step S200 and step S201 are repeated to monitor the presence/absence of abnormality unless any abnormality is detected. On the other hand, if it is determined that any one of these detected values is abnormal, the process goes to step S202.

In step S202, the shut-down process (abnormal shut-down process) corresponding to the abnormality determined by the abnormality determiner 110a is performed under the control of the controller 110. When this shut-down process terminates, the process goes to step S203.

In step S203, if the abnormality determined by the abnormality determiner 110a is the first abnormality, the process goes to step S204, whereas if the abnormality determined by the abnormality determiner 110a is the second abnormality, the process goes to step S205.

In step S204, the hydrogen generator 102 shifts to the stand-by mode when the abnormal shut-down process terminates, and the program ends. On the other hand, in step S205, the hydrogen generator 102 shifts to a start-up inhibiting mode in which the start-up is not permitted even if a start-up request is generated, and the program ends. The same shut-down process is not performed for each abnormality but a predetermined restoration process corresponding to each abnormality is carried out. It should be noted that the cooling operation common to the respective abnormalities (cooling operation of the hydrogen generator 102, etc.) is carried out.

Figure 6:
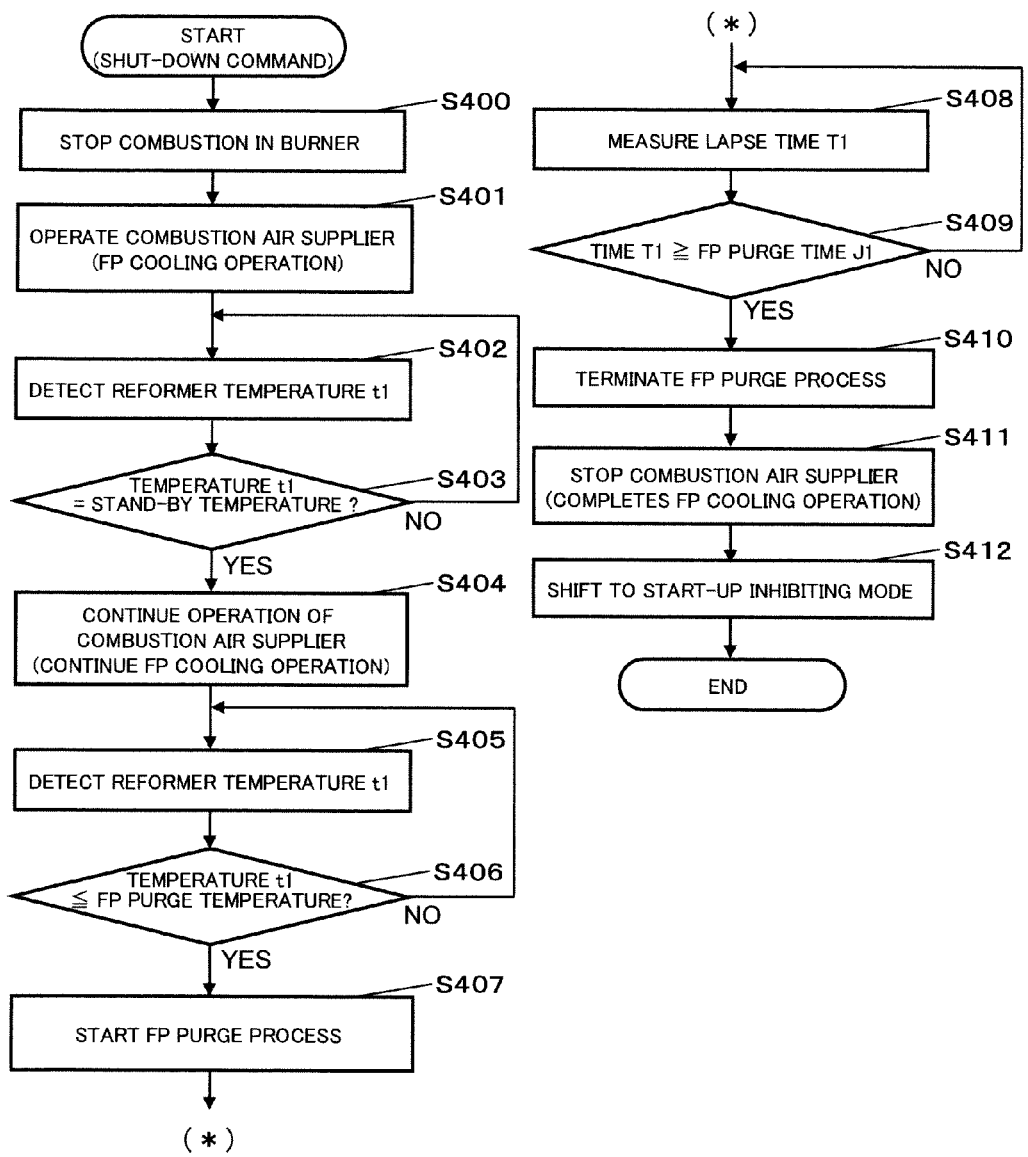
FIG. 6 is a flowchart showing in more detail an abnormal shut-down process in the flowchart of the shut-down process program of FIG. 5.

Now, the abnormal shut-down process in a case where the failure of the temperature detector occurs, which is an example of the abnormality which is followed by the shut-down of the hydrogen generator 102, will be described. FIG. 6 is a flowchart showing in more detail an abnormal shut-down process in the flowchart of the shut-down process program of FIG. 5. Although the failure of the temperature detector belongs to the second abnormality, the following abnormal shut-down process is carried out in such a manner that the cooling operation of the hydrogen generator 102 is performed in the same manner when an abnormality which requires the shut-down of the operation of hydrogen generator 102 is detected as well as when the second abnormality is detected. In other words, the cooling operation of the hydrogen generator 102 is performed in the same manner when the first abnormality is detected.

As shown in FIG. 6, when the detected value of the temperature detector is the value indicating the short-circuit or disconnection and the abnormality determiner 110a determines that this is the abnormality, the supply of the material gas and the supply of the water to the hydrogen generator 102 are stopped, and the sealing operation of the hydrogen generator 102 is carried out, as in the normal shut-down process (see step S100 and S101 in FIG. 3). Thereby, the combustion operation of the burner 102 stops (step S400). Regarding the stop of combustion in the burner 102a, the gas remaining within the radiation tube 9 is purged to outside the housing 111 with the air supplied from the combustion air supplier 117 after the flame is extinguished. Thus, the burner 102a completes the combustion stop process.

The combustion air supplier 117 supplies the combustion air to the burner 102a after stop of combustion in the burner 102a to perform the cooling operation of the hydrogen generator 102, under control of the controller 110 (step S401). Unlike in the normal shut-down process, the cooling operation continues even after the detected temperature of the temperature detector 143 attached on the reformer 16 of the hydrogen generator 102 reaches a stand-by temperature (e.g., 500 degrees C.) or lower (step S402 to S404). Because of this, the reformer 16 can be cooled more quickly in the abnormal shut-down process than in the normal shut-down process.

When the detected temperature of the temperature detector 143 reaches a temperature which is not higher than the FP purge temperature during continuation of the cooling operation of the hydrogen generator 102 (step S405 and step S406), a FP purge process similar to that in the normal shut-down process is performed (see step S106~step S112 in FIG. 3) (step S407 to step S410). Thereafter, when the FP purge process terminates, the controller 110 stops the operation of the combustion air supplier 117 (step S411), the abnormal shut-down process terminates. Then, the controller 110 causes the hydrogen generator 102 to shift to the start-up inhibiting mode (step S412). The phrase "the hydrogen generator 102 shifts to the start-up inhibiting mode" means that the calculation section of the controller 110 places the hydrogen generator 102 in a state where the hydrogen generator 102 does not perform the start-up process, even if the user operates the remote control device 120 to start the start-up of the hydrogen generator 102. In Embodiment 2, the controller 110 is configured not to permit the hydrogen generator 102 to perform the start-up process, even when the user operates the key operation section 120b of the remote control device 120 to send a start-up command to the communication section of the controller 110, in the case where each of the detectors 141 to 145 detects the second abnormality.

In the cooling operation of the hydrogen generator 102 in the abnormal shut-down process, the amount of combustion air supplied to the burner 102a is desirably controlled to be more than the amount of combustion air supplied to the burner 102a during a rated operation of the hydrogen generator 102. To be specific, in the cooling operation of the hydrogen generator 102 in the abnormal shut-down process, the controller 110 causes the operation amount to be larger than the operation amount during the rated operation of the hydrogen generator 102. This makes it possible to quickly lower the temperature of the hydrogen generator 102, thereby facilitating shifting to the maintenance operation. As defined herein, the rated operation of the hydrogen generator 102 refers to an operation in which the hydrogen generator 102 is supplying hydrogen with a maximum possible amount stably during a hydrogen supply operation of the hydrogen generator 102.

Now, comparison between the abnormal shut-down process and the normal shut-down process will be described. In the abnormal shut-down process, in a time period from when the temperature of the reformer 16 has reached a temperature which is not higher than the stand-by temperature until it reaches a temperature (FP purge temperature or lower), at which the FP purge process can be performed, the combustion air supplier 117 continues the cooling operation of the hydrogen generator 102, to more quickly cool the hydrogen generator 102, instead of waiting for the hydrogen generator 102 to be naturally cooled like the normal shut-down process.

For this reason, in the hydrogen generator 102 according to Embodiment 2, the abnormal shut-down process is performed in such a manner that the hydrogen generator 102 is cooled with a higher rate in the abnormal shut-down process than in the normal shut-down process. Therefore, the temperatures of the components within the hydrogen generator 102 are more quickly lowered to temperatures at which the maintenance operator will not get burnt, etc, thereby enabling the maintenance operator to start the maintenance operation at an earlier time. In addition, in the hydrogen generator 102 of Embodiment 2, a time period from when the temperature of the reformer 16 reaches the stand-by temperature or lower until it reaches the temperature at which the FP purge process can occur (temperature which is not higher than the FP purge temperature) is shorter in the abnormal shut-down process than in the normal shut-down process. Therefore, the FP purge process is carried out at an earlier time in the abnormal shut-down process than in the normal shut-down process.

On the other hand, in the normal shut-down process, the hydrogen generator 102 is cooled with a lower rate than in the abnormal shut-down process. Therefore, at the time when the start-up process is initiated, depending on a time that lapses after the hydrogen generator 102 has shifted to the stand-by mode, the temperature of the component (e.g., reformer 16) constituting the hydrogen generator 102 is higher than ambient temperature (outside air temperature). Thus, an energy and a time required to raise the temperature of the component are reduced. As a result, the start-up of the hydrogen generator 102 is facilitated.

Although in the hydrogen generator 102 of the above embodiment, the cooling operation of the hydrogen generator 102 (reformer 16) continues until the FP purge process terminates in the abnormal shut-down process, the present invention is not limited to this example. Any configuration may be employed so long as the hydrogen generator 102 is cooled with a higher rate in the abnormal shut-down process than in the normal shut-down process.

Although in Embodiment 2, the combustion air supplier 117 performs the cooling operation of the hydrogen generator 102 for a longer time to cool the hydrogen generator 102 with a higher rate, in the abnormal shut-down process than in the normal shut-down process, the present invention is not limited to this, but the combustion air supplier 117 may be controlled so that the combustion air is supplied to the burner 102a with a larger amount in the abnormal shut-down process. This is implemented in such a manner that the controller 110 causes the operation amount of the combustion air supplier 117 to be larger in the cooling operation of the hydrogen generator 102 in the abnormal shut-down process than in the cooling operation of the hydrogen generator 102 in the normal shut-down process.

In the hydrogen generator 102 of Embodiment 2, the abnormal shut-down process is performed in such a manner that the hydrogen generator 102 is cooled with a higher rate than in the normal shut-down process, when the abnormality which requires shut-down of the operation of the hydrogen generator 102 is detected as well as when the first abnormality is detected or the second abnormality is detected. However, in the abnormal shut-down process performed when the first abnormality which does not require the maintenance operation after the shut-down process terminates is detected, the cooling operation of the hydrogen generator 102 which is similar to that in the normal shut-down process may be performed. Thereby, in the abnormal shut-down process performed in the case where the first abnormality is detected, the cooling operation of the hydrogen generator 102 for facilitating shifting to the maintenance operation is not performed. Thus, at next start-up, an energy and a time required to raise the temperature of the component (e.g., reformer 16) constituting the hydrogen generator 102 are reduced. As a result, the start-up of the hydrogen generator 102 is facilitated.

Embodiment 3

A hydrogen generator according to Embodiment 3 of the present invention includes a heat exchanger for recovering heat from a combustion exhaust gas exhausted from the combustor, a heat medium path through which a heat medium which receives the heat recovered from the combustion exhaust gas in the heat exchanger flows, and a pump for flowing the heat medium in the heat medium path, and is an example in which the controller operates the pump in a cooling step for cooling the reformer with the air supplied from the combustion air supplier in a state where the combustion operation of the combustor is stopped, in the abnormal shut-down process.

Figure 7:
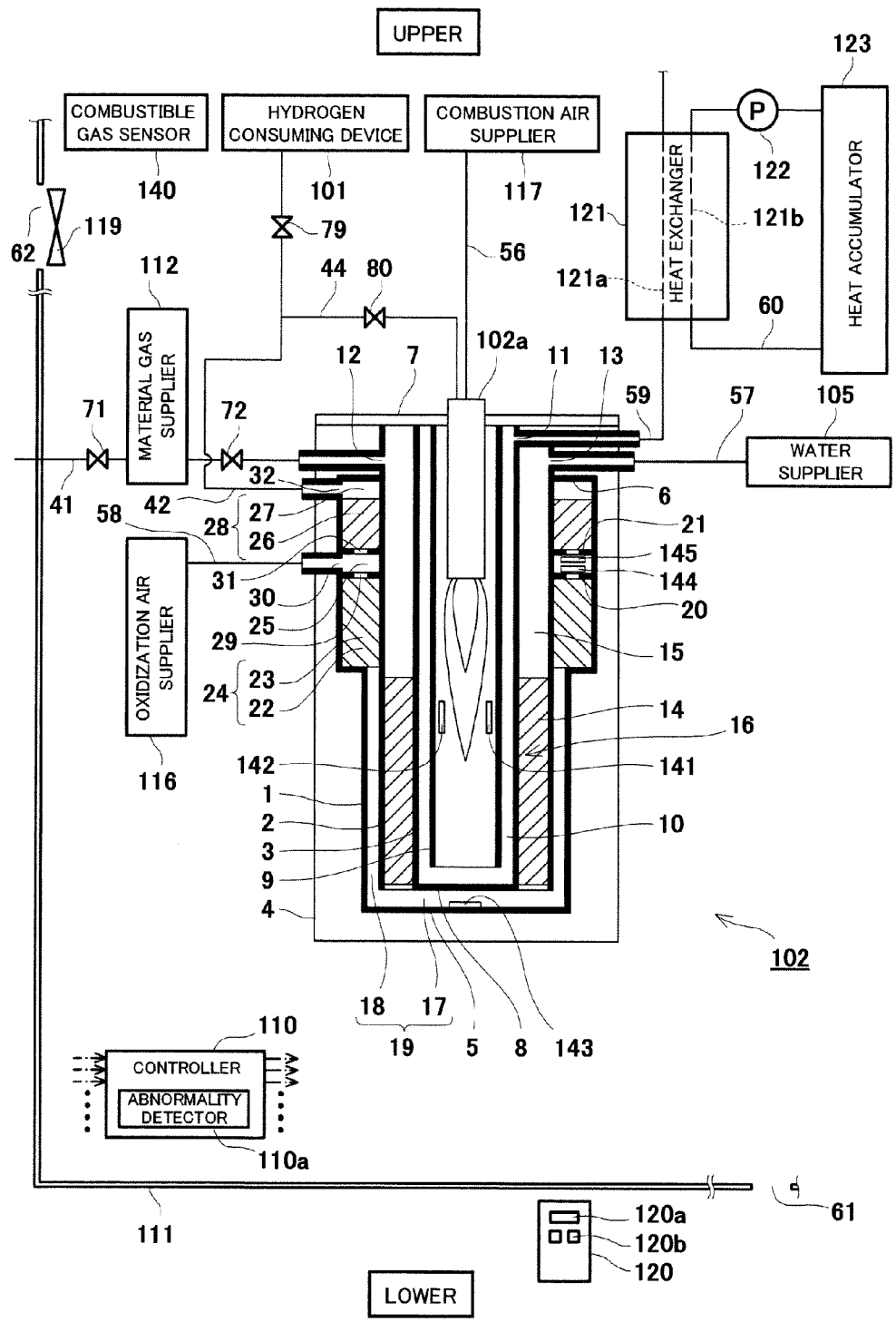
FIG. 7 is a view showing a schematic configuration of a hydrogen generator according to Embodiment 3 of the present invention.

FIG. 7 is a view showing a schematic configuration of a hydrogen generator according to Embodiment 3 of the present invention. In FIG. 7, upper and lower sides of the hydrogen generator are upper and lower sides in FIG. 7, and a part of the hydrogen generator is omitted.

As shown in FIG. 7, the hydrogen generator 102 according to Embodiment 3 of the present invention has basically the same configuration as that of the hydrogen generator 102 according to Embodiment 2, but is different from the same in that a heat exchanger 121 and a heat accumulator 123 for storing the heat medium which has recovered heat in the heat exchanger 121 are provided on the combustion exhaust gas path 59. To be specific, a combustion exhaust gas path 59 is connected to a primary passage 121a of the heat exchanger 121, while a heat medium path 60 is connected to a secondary passage 121b of the heat exchanger 121 to flow the heat medium. A pump 122 is provided in the heat medium path 60 to flow the water through the heat medium path 60. The combustion exhaust gas exhausted from the burner 102a exchanges heat with the water flowing through the secondary passage 121b in the heat exchanger 121 while flowing through the primary passage 121a in the heat exchanger 121 and is thereby cooled.

The hydrogen generator 102 of this embodiment operate as follows at the shut-down of the operation. Initially, in the hydrogen generator 102, the controller 110 stops combustion in the burner 102a. When the combustion in the combustor stops, typically, the combustible gas remaining within the burner 102a is purged to outside the housing with the air supplied from the burner 102a after the flame is extinguished, and a combustion stop process of the burner 102a completes. Then, during a period of the cooling operation of the hydrogen generator 102 (reformer 16) with the air supplied from the combustion air supplier 117, the controller 110 operates the pump 122 to flow the heat medium through the secondary passage 121b in the heat exchanger 121, to cause the heat exchanger 121 to perform a heat recovery operation using the heat medium. In this way, the heat can be recovered from the hydrogen generator 102, and it is possible to prevent the temperature of the air exhausted to outside the hydrogen generator 102 (outside the package 111) via the combustion exhaust gas path 59 from becoming too high. Alternatively, the heat medium that has recovered heat in the heat recovery operation may be returned to the heat accumulator 123, or may be flowed through a heat radiator (not shown) provided on a path which branches from the heat medium path 60. In this case, as the heat radiator, a heat radiator for executing a cooling operation actively, such as air cooling by a fan or water cooling using circulating water, is employed, instead of natural cooling using a fin or the like.

Like Embodiment 2, in the hydrogen generator 102 of Embodiment 3, the shift converter 24 and the purifier 28 may be omitted if it is not necessary to further reduce the concentration of the hydrogen-containing gas generated in the reformer 16.

As used herein, examples of the period of the cooling operation of the hydrogen generator 102 by the combustion air supplier 117 at the stop of combustion in the burner 102a includes a cooling operation period for which the combustion air supplier 117 is operated until the temperature of the reformer 16 reaches a temperature which is not higher than the stand-by temperature after the combustion in the burner 102 stops in the normal shut-down process and a cooling operation period for which the combustion air supplier 117 is operated until the temperature of the reformer 16 reaches a temperature which is not higher than the purge temperature after the combustion in the burner 102 stops in the abnormal shut-down process. These examples are merely exemplary so long as a cooling operation period is a period for which the cooling operation is performed with the air supplied from the combustion air supplier 117 after the combustion in the burner 102a stops.

The hydrogen generator 102 is cooled with a higher rate in the abnormal shut-down process than in the normal shut-down process. In that case, if the controller 110 executes control so that the amount (operation amount of the combustion air supplier 117) of combustion air supplied to the burner 102a during the cooling operation period of the hydrogen generator 102 is set larger than that in the normal shut-down process, the amount of heat recovered with the air flowing through the combustion exhaust gas passage 10 increases, causing an increase in the temperature of the air exhausted to outside the hydrogen generator 102 via the combustion exhaust gas path 59. For this reason, the controller 110 preferably controls the pump 122 so that the flow rate of the heat medium flowing through the secondary passage 112b in the heat exchanger 112 is higher in the abnormal shut-down process than in the normal shut-down process. In other words, the controller 110 preferably controls a cooler 121 so that the cooler 121 cools the exhausted air with a higher rate in the abnormal shut-down process than in the normal shut-down process.

The hydrogen generator 102 according to Embodiment 3 configured as described above can achieve the same advantages as those of the hydrogen generator 102 of Embodiment 1. In addition, in the hydrogen generator 102 according to Embodiment 3, it is possible to prevent the temperature of the air exhausted to outside via the combustion exhaust gas path 59 from becoming too high, during the cooling operation period of the hydrogen generator 102 (reformer 16). Thus, the hydrogen generator 102 can be stopped more safely.

Embodiment 4

A hydrogen generator according to Embodiment 4 of the present invention is an example in which the hydrogen generator includes a gas supplier for supplying a gas to the reformer and is configured to perform a pressure compensation operation for supplying the gas from the gas supplier to the reformer to make up for a decrease in a pressure in the interior of the sealed reformer after a hydrogen generating operation in the hydrogen generator stops, and the controller causes the gas supplier to perform the pressure compensation operation with a higher frequency (controller sets the number of times of the pressure compensation operation of the gas supplier in a given period larger) in the abnormal shut-down process than in the normal shut-down process.

In the shut-down process, firstly, the hydrogen generator 102 of this embodiment closes the inlet and the outlet of the combustible gas path of the hydrogen generator 102 to perform the seal operation to form the gas path including the reformer 16 into a closed space. Thereafter, an internal pressure decreases with a decrease in the temperature of the hydrogen generator 102, and hence an excessively negative pressure is generated, which may possibly damage the components. To avoid this, the hydrogen generator 102 of Embodiment 4 is configured to perform the pressure compensation process for supplying the gas to the hydrogen generator 102 when the pressure in the hydrogen generator 102 is not higher than a predetermined pressure threshold P1 which is higher than a negative pressure resistance limit value of the hydrogen generator 102.

The hydrogen generator 102 of Embodiment 4 is configured to set the rate of the cooling per unit time higher in the cooling operation of the hydrogen generator 102 (reformer 16) in the abnormal shut-down process than in the normal shut-down process. For this reason, the temperature of the hydrogen generator (reformer 16) and the pressure in the hydrogen generator (reformer 16) decrease at a higher pace in the abnormal shut-down process than in the normal shut-down process. Therefore, the controller 110 is configured to set a frequency of the pressure compensation process higher (set the number of rimes of the pressure compensation operation in a given period is larger) in the abnormal shut-down process than in the normal shut-down process. Hereinafter, this will be described in detail.

The hydrogen generator 102 according to Embodiment 4 has basically the same configuration as that of the hydrogen generator 102 according to Embodiment 2 shown in FIG. 2. In the normal shut-down process, the cooling operation of the hydrogen generator 102 is performed (see FIG. 3) like Embodiment 2, and the pressure compensation process is executed. The pressure compensation process will be described in detail later.

The cooling operation in the normal shut-down process of the hydrogen generator 102 of Embodiment 4 is identical to the cooling operation (see step S100–S105 in FIG. 3) of the hydrogen generator 102 of Embodiment 1.

Figure 8:
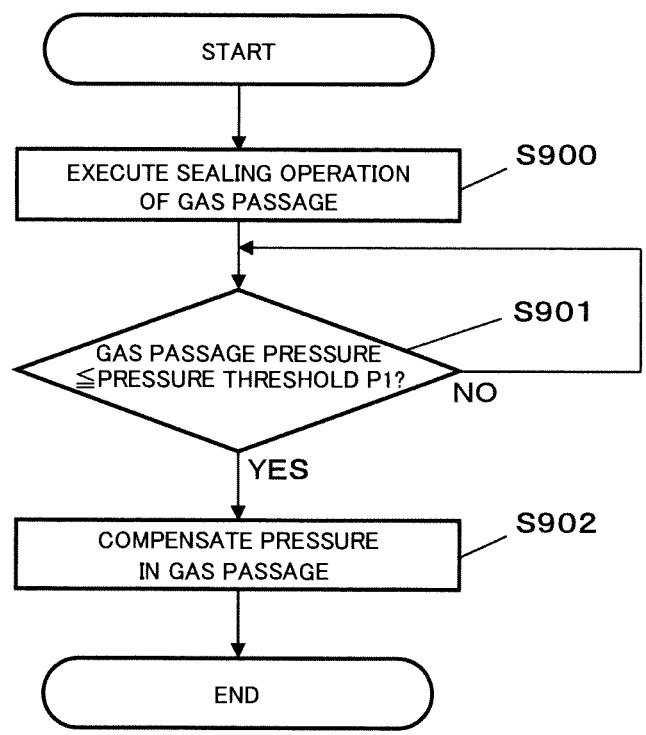
FIG. 8 is a flowchart showing an exemplary pressure compensation process performed in a hydrogen generator according to Embodiment 4 of the present invention.

Next, the pressure compensation process of the hydrogen generator 102 of Embodiment 4 will be described with reference to FIG. 8. FIG. 8 is a flowchart showing an exemplary pressure compensation process performed in the hydrogen generator 102 according to Embodiment 4 of the present invention.

As shown in FIG. 8, after the shut-down process starts, the sealing operation of the hydrogen generated 102 is executed (step S900). To be specific, at least one of the first on-off valve 71 and the second on-off valve 72 provided on the material gas supply path 41 is closed, and the fuel gas valve 79 and the bypass valve 80 are closed.

Then, when the pressure value detected by a pressure detector (not shown) provided within the gas path including the hydrogen generator 102 which is formed into the closed space by the sealing operation is not more than the predetermined pressure threshold P1 (e.g., −5 kPa with respect to an atmospheric pressure) (Yes in step S901), the controller 110 opens the first on-off valve 71 and the second on-off valve 72 while closing the fuel gas valve 79 and the bypass valve 80, and causes the material gas supplier 112 to supply the material gas (step S902). When the pressure reaches an atmospheric pressure or higher, the controller 110 causes the material gas supplier 112 to stop supply of the material gas to the gas path including the hydrogen generator 102, and closes the first on-off valve 71 and the second on-off valve 72. Thus, the pressure compensation process terminates.

Then, the controller 110 performs step S901 on a regular basis (e.g., every 30 sec) after the pressure compensation operation has been performed, and performs the pressure compensation process as necessary when the value of the pressure in the gas path has decreased to a level at which the pressure compensation is required.

Although it is determined whether or not to perform the pressure compensation operation using the detected value of the pressure detector for directly detecting the pressure in the gas path, the above pressure compensation process may be performed based on the temperature detected by the temperature detector (e.g., temperature detector 143, etc) in the gas path associated with this pressure value and a lapse time after the start of the shut-down process which is measured by the timer and is associated with above pressure value.

Next, the abnormal shut-down process in the hydrogen generator 102 according to Embodiment 4 will be described. The abnormal shut-down process is performed along the flow (see FIG. 6) similar to the flow of the cooling operation of the hydrogen generator 102 of Embodiment 2. The controller 110 executes control so that the combustion air is supplied to the burner 102a with a higher rate in the cooling operation of the hydrogen generator in the abnormal shut-down process than in the cooling operation of the hydrogen generator in the normal shut-down process. To be specific, the controller 110 executes control so that the operation amount of the combustion air supplier 117 is a predetermined amount larger than the operation amount of the combustion air supplier 117 in the cooling operation of the hydrogen generator 102 in the normal shut-down process.

Since the controller 110 performs the cooling operation such that the hydrogen generator 102 is cooled at a higher pace in the abnormal shut-down process than in the normal shut-down process as described above, the temperature of the hydrogen generator 102 is lowered more quickly in the abnormal shut-down process than in the normal shut-down process and the pressure in the gas path is lowered more frequently to a level at which the pressure compensation is required, in the abnormal shut-down process than in the normal shut-down process Since the above pressure compensation operation is performed more frequently in the abnormal shut-down process of the hydrogen generator 102 of Embodiment 4 than in the normal shut-down process, generation of an excessively negative pressure within the gas passage of the hydrogen generator 102 is suppressed. As a result, the hydrogen generator 102 is protected.

Embodiment 5

A hydrogen generator according to Embodiment 5 of the present invention is an example in which the controller controls the combustion air supplier so that the reformer is cooled with a higher rate in the abnormal shut-down process executed after the second abnormality which requires maintenance is detected than in the abnormal shut-down process executed after the first abnormality which does not require maintenance is detected.

The hydrogen generator 102 according to Embodiment 5 of the present invention has basically the same configuration as that of the hydrogen generator 102 according to Embodiment 2 shown in FIG. 2, but is different from the same in that the shut-down process (in particular, cooling operation of the hydrogen generator 102) is different from the shut-down process of the hydrogen generator 102 of Embodiment 2. Hereinafter, the shut-down process of the hydrogen generator 102 of Embodiment 5 will be described in detail.

Figure 9:
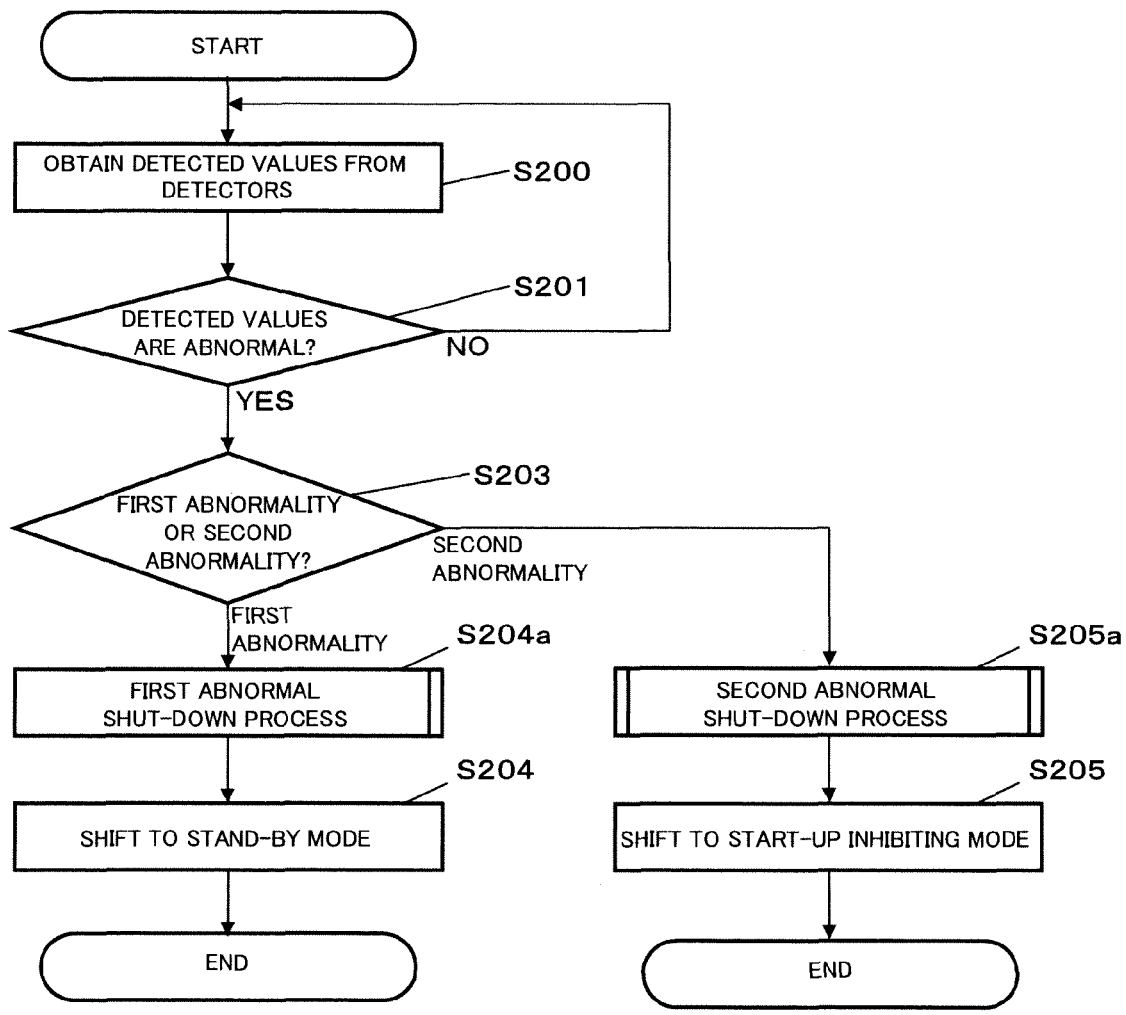
FIG. 9 is a flowchart schematically showing a content of an abnormality detection/shut-down process program stored in a memory section of a controller in a hydrogen generator according to Embodiment 5 of the present invention.

FIG. 9 is a flowchart schematically showing a content of an abnormality detection/shut-down process program stored in a memory section of a controller 110 in the hydrogen generator 102 according to Embodiment 5 of the present invention.

As shown in FIG. 9, in the hydrogen generator 102 according to Embodiment 5, initially, during the operation of the hydrogen generator 102, the calculation section of the controller 110 obtains the detected values from the detectors 140 to 145 (step S200) and determines whether or not the detected values obtained in step S200 are abnormal (step S201). If it is determined that the detected values are not abnormal, the process returns to step S200, and step S200 and step S201 are repeated to monitor the presence/absence of abnormality unless any abnormality is detected. On the other hand, if it is determined that any one of the detected values is abnormal, the process goes to step S203.

In step S203, if the abnormality determined by the abnormality determiner 110a is the first abnormality, the process goes to step S204a, whereas if the abnormality determined by the abnormality determiner 110a is the second abnormality, the process goes to step S205a.

In step S204a, the first abnormal shut-down process corresponding to each abnormality determined by the abnormality determiner 110 is executed under control of the controller 110. When this shut-down process terminates, the hydrogen generator 102 shifts to the stand-by mode (step S204), and the program ends. In the first abnormal shut-down process, the same shut-down process is not performed for each abnormality but a predetermined restoration process corresponding to each abnormality is carried out. It should be noted that the cooling operation common to the respective abnormalities (cooling operation of the hydrogen generator 102, etc.) is also carried out.

In step S205a, the second abnormal shut-down process corresponding to each abnormality determined by the abnormality determiner 110 is executed under control of the controller 110. When this shut-down process terminates, the hydrogen generator 102 shifts to a start-up inhibiting mode in which the start-up is not permitted even if a start-up request is generated (step S205). In the second abnormal shut-down process, the same shut-down process is not performed for each abnormality but a predetermined restoration process corresponding to each abnormality is carried out. It should be noted that the cooling operation common to the respective abnormalities (cooling operation of the hydrogen generator 102, etc.) is also carried out.

In the hydrogen generator 102 according to Embodiment 5, the fuel cell is cooled with a higher rate in the second abnormal shut-down process than in the first abnormal shut-down process. The rate of cooling is detected in a cooling rate detector. In the first abnormal shut-down process, the cooling operation is stopped when the cooling rate detected by the cooling rate detector becomes a first threshold or more, while in the second abnormal shut-down process, the cooling operation is stopped when the cooling rate detected by the cooling rate detector becomes a value which is not less than a second threshold larger than the first threshold. As the cooling rate detector, for example, there are temperature detectors (e.g., temperature detectors 143 to 145) for detecting the temperature of the hydrogen generator 102, a meter for measuring a cooling operation time that lapses after the cooling operation starts, etc. Furthermore, in the first abnormal shut-down process, the first threshold may be zero, i.e., the cooling operation of the hydrogen generator 102 may be omitted.

Figure 10:
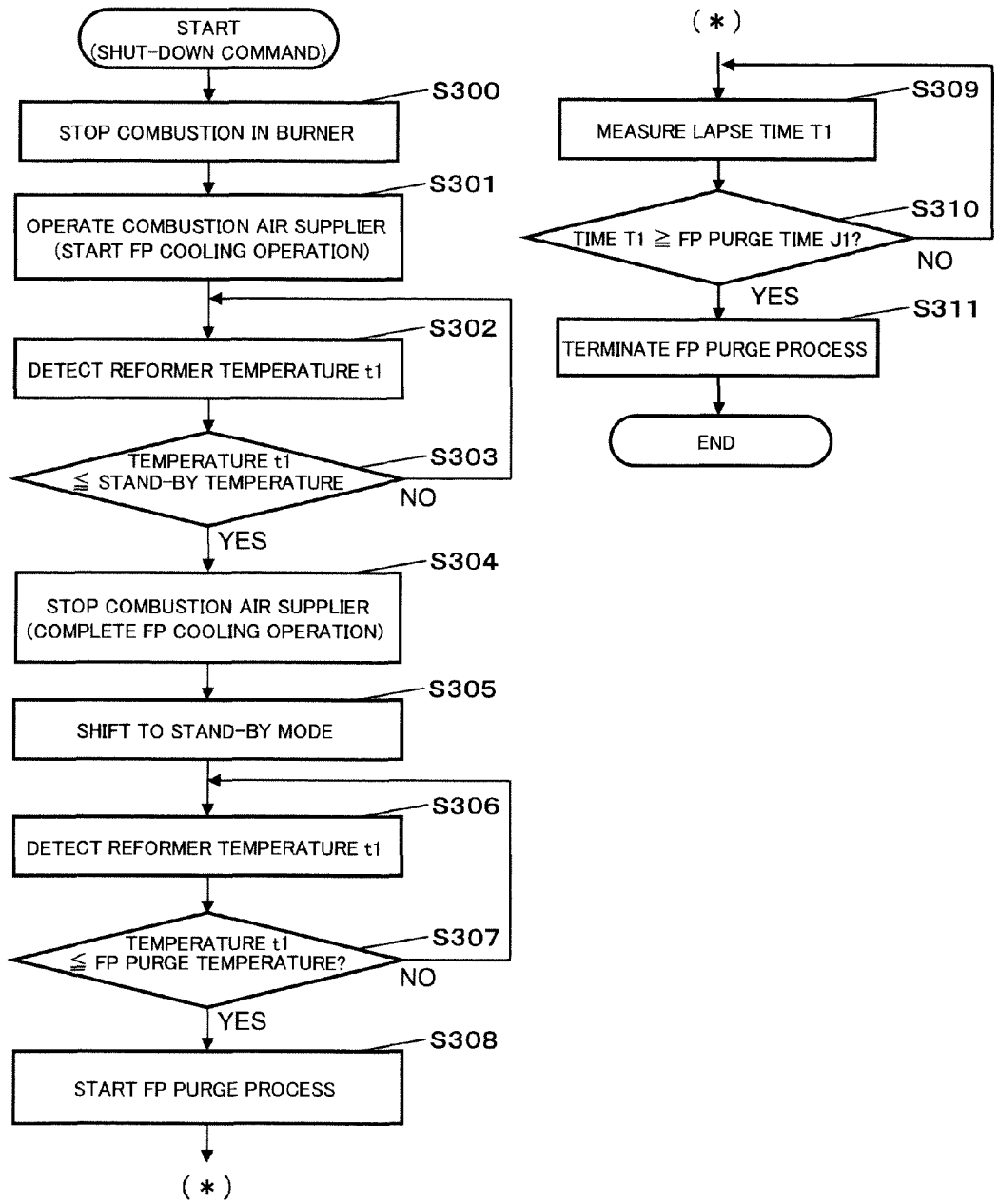
FIG. 10 is a flowchart showing in detail a first abnormal shut-down process in the flowchart of the abnormality detection/shut-down process program shown in FIG. 9.

Now, the first abnormal shut-down process executed in the case of the burner misfire abnormality which is an example of the first abnormality, will be described. FIG. 10 is a flowchart showing in detail a first abnormal shut-down process in the flowchart of the abnormality detection/shut-down process program shown in FIG. 9.

In a case where the abnormality determiner 110a determines that a misfire has occurred in the burner 102a based on the detected value of the ignition detector 141 during the hydrogen generation operation of the hydrogen generator 102, the shut-down process similar to that executed along the flow of the normal shut-down process which has been explained with reference to FIG. 3 is executed. To be specific, the supply of the material gas and the supply of the water to the hydrogen generator 102 stop, and the sealing operation of the hydrogen generator 102 is performed, so that the combustion operation of the burner 102a is stopped (step S300). Regarding the stop of combustion in the burner 102a, the gas remaining within the radiation tube 9 is purged to outside the housing 111 with the air supplied from the combustion air supplier 117 after the flame is extinguished. Thus, the burner 102a completes the combustion stop process. Then, after the burner 102a stops the combustion, the combustion air supplier 117 supplies the combustion air to the burner 102a to execute the cooling operation of the hydrogen generator 102 (step S301).

The above cooling operation continues until the detected temperature of the temperature detector 143 attached on the reformer 16 of the hydrogen generator 102 reaches a temperature which is not higher than a stand-by temperature (e.g., 500 degrees C.) (step S302, step S303). When the detected temperature of the temperature detector 143 which is an example of the cooling rate detector is not higher than the stand-by temperature, the controller 110 stops the combustion air supplier 117, and the cooling operation of the hydrogen generator 102 completes (step S304). It should be noted that the stand-by temperature in step S304 is an example of a first threshold used to determine whether or not stop the cooling operation of the hydrogen generator 102.

When the cooling operation of cooling the hydrogen generator 102 to the stand-by temperature completes, the hydrogen generator 102 shifts to the stand-by mode (step S305). After the hydrogen generator 102 has shifted to the stand-by mode, the FP purge process is executed as the temperature of the hydrogen generator 102 decreases, as in the case of the normal shut-down process (see step S106 to step S112 in FIG. 2) (step S306 to S311). After the hydrogen generator 102 has shifted to the stand-by mode, if a start-up request is made, the controller 110 outputs a start-up command and the start-up process is initiated even before the purge process is not performed yet.

Figure 11:
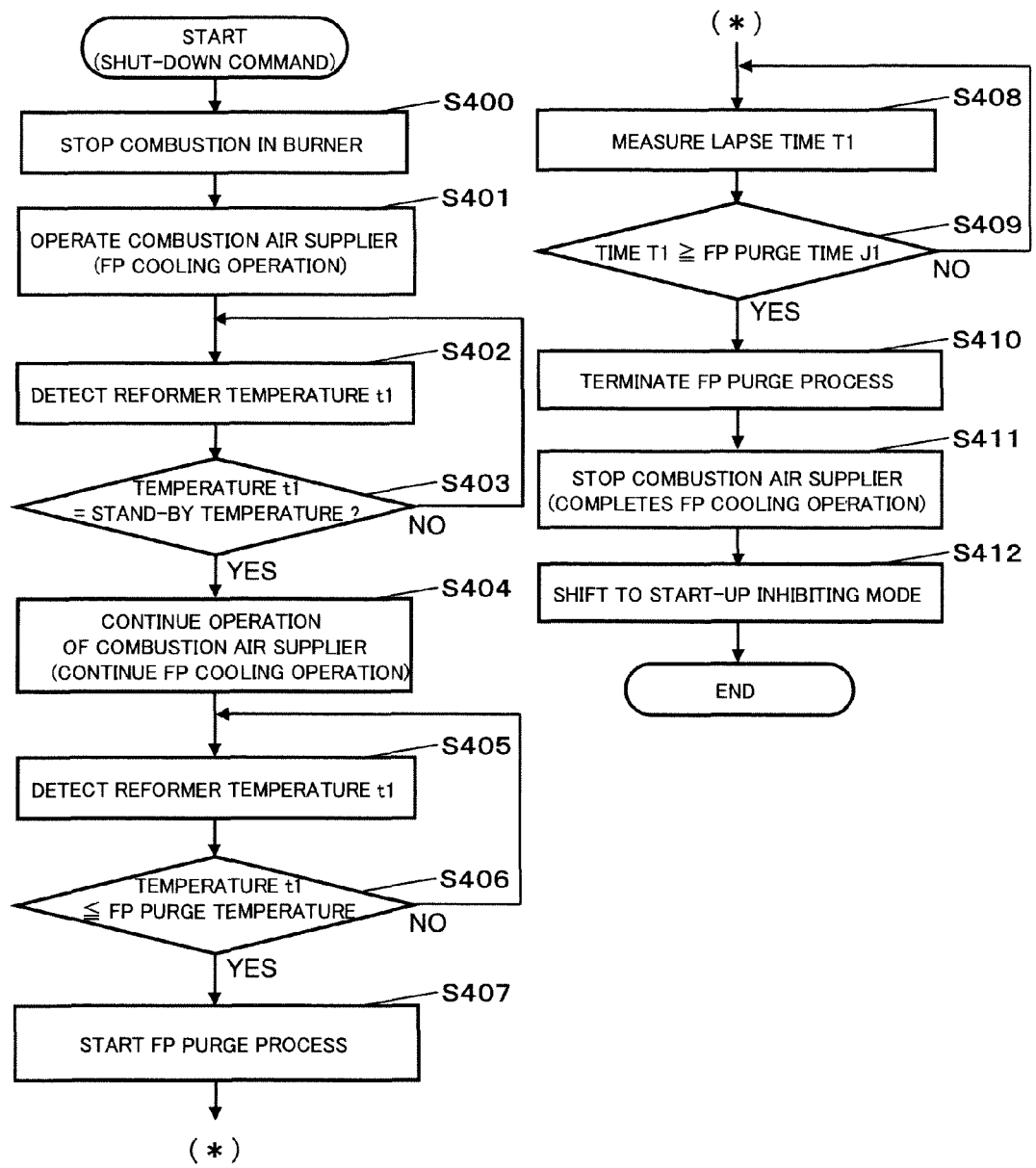
FIG. 11 is a flowchart showing in detail a second abnormal shut-down process in the flowchart of the abnormality detection/shut-down process program shown in FIG. 9.

Now, the second abnormal shut-down process executed in the case of the failure of the temperature detector which is an example of the second abnormality, will be described, with reference to FIG. 11. FIG. 11 is a flowchart showing in detail the second abnormal shut-down process in the flowchart of the abnormality detection/shut-down process program shown in FIG. 9.

As shown in FIG. 11, when the detected value of the temperature detector is the value indicating the short-circuit or disconnection and the abnormality determiner 110a determines that this is the abnormality, the supply of the material gas and the supply of the water to the hydrogen generator 102 are stopped, and the sealing operation of the hydrogen generator 102 is carried out, as in the normal shut-down process (see step S100 and S101 in FIG. 3). Thereby, the combustion operation of the burner 102 stops (step S400).

The combustion air supplier 117 supplies the combustion air to the burner 102a after stop of combustion in the burner 102a to perform the cooling operation of the hydrogen generator 102, under control of the controller 110 (step S401). Unlike in the normal shut-down process or the first abnormal shut-down process, the cooling operation continues even after the detected temperature of the temperature detector 143 attached on the reformer 16 of the hydrogen generator 102 reaches a stand-by temperature (e.g., 500 degrees C.) or lower (step S402 to S404).

When the detected temperature of the temperature detector 143 reaches a temperature which is not higher than the purge temperature during continuation of the cooling operation of the hydrogen generator 102, a FP purge process similar to that in the normal shut-down process is performed (step S405 to step S410). Thereafter, when the FP purge process terminates, the controller 110 stops the operation of the combustion air supplier 117 (step S411), and the FP cooling operation completes. Then, the controller 110 causes the hydrogen generator 102 to shift to the start-up inhibiting mode (step S412). The phrase "the hydrogen generator 102 shifts to the start-up inhibiting mode" means that the start-up of the fuel cell system is not permitted and the controller 110 does not output a start-up command, even if a start-up request is made. For example, the controller 110 is configured not to permit the hydrogen generator 102 to perform the start-up process, even when the user operates the key operation section 120b of the remote control device 120 to make an operation start request to start the start-up of the hydrogen generator 102. It should be noted that the purge temperature is a second threshold used to determine whether or not stop the cooling operation of the hydrogen generator 102.

Although in Embodiment 5, the FP purge process is performed in the second abnormal shut-down process, it is desired that the purge process is not performed, because the material gas which is the combustible gas might dangerously leaks in the package 111 of the hydrogen generator 102 during the purge process, if the abnormality detected by the abnormality determiner 110a is a gas leakage abnormality (e.g., combustible gas leakage abnormality). In that case, a cooling stop temperature lower than the stand-by temperature may be set instead of the purge temperature, and the cooling operation of the hydrogen generator 102 may continue until the temperature of the reformer 16 detected by the temperature detector 143 is lowered to a value which is not higher than the cooling stop temperature. Or, a time that lapses after the sealing operation of the hydrogen generator 102 is initiated, is measured, and the cooling operation of the hydrogen generator 102 may continue for a period of a time at which the temperature of the reformer 16 reaches a value which is not higher than the cooling stop temperature, which time is found preliminarily in experiment or the like.

Although the temperature detector 143 is used as the cooling rate detector in the first abnormal shut-down process and in the second abnormal shut-down process, the temperature detector is not limited to this but may be one provided in a specified location within the hydrogen generator 102 so long as it is capable of detecting an increase in the cooling rate which results from the cooling operation of the hydrogen generator 102. In addition, the stand-by temperature and the purge temperature are examples of the first threshold and the second threshold, respectively, and are not limited to the examples. They are suitably set according to a configuration and design concept of the hydrogen generator 102.

Now, comparison between the second abnormal shut-down process and the first abnormal shut-down process will be made. In the second abnormal shut-down process, instead of waiting for the hydrogen generator 102 to be naturally cooled like the first abnormal shut-down process in a period from when the temperature of the reformer 16 reaches a temperature which is not higher than the stand-by temperature until the temperature of the reformer 16 reaches a temperature at which FP purge process can occur (temperature which is not higher than the FP purge temperature), the combustion air supplier 117 performs the cooling operation of the hydrogen generator 102 including the burner 102a, to more quickly cool the hydrogen generator 102.

In the hydrogen generator 102 of Embodiment 5, the hydrogen generator 102 is cooled with a higher rate in the second abnormal shut-down process than in the first abnormal shut-down process so that the temperature of the hydrogen generator 102 (reformer 16) is more quickly lowered to a temperature at which the maintenance operator will not get burnt, etc, thereby enabling the maintenance operator to start the maintenance operation at an earlier time.

On the other hand, since the hydrogen generator 102 is cooled with a lower rate in the first abnormal shut-down process than in the second abnormal shut-down process, the temperature of the component (e.g., reformer 16) constituting the hydrogen generator 102 is higher than ambient temperature (outside air temperature), depending on a time which lapses after the hydrogen generator 102 shifts to the stand-by mode. Therefore, an energy required to raise the temperature of the hydrogen generator 102 is reduced, and a time required for the start-up process is reduced. As a result, the start-up of the hydrogen generator 102 is facilitated.

Although in Embodiment 5, the hydrogen generator 102 is cooled with a higher rate by causing the combustion air supplier 117 to cool the hydrogen generator 102 (reformer 16) for a longer time in the second abnormal shut-down process than in the first abnormal shut-down process, the present invention is not limited to this. Alternatively, the hydrogen generator 102 may be cooled with a higher rate by causing the operation amount of the combustion air supplier 117 to be larger, in the second abnormal shut-down process.

Although in Embodiment 5, the controller 110 is configured to perform the start-up process after a next start-up request (start-up request signal generated by the user using the remote control device 120) is generated, after the hydrogen generator 102 shifts to the stand-by mode in the case where the first abnormality is detected, the present invention is no limited to this. Alternatively, the controller 110 may be configured to automatically perform the start-up process without awaiting a next start-up request after the hydrogen generator 102 shifts to the stand-by mode of FIG. 9.

Furthermore, although the cooling operation of the hydrogen generator 102 is executed when the first abnormality is detected, the present invention is not limited to this. Like the normal shut-down process of Embodiment 2, the cooling operation may be omitted.

Embodiment 6

A hydrogen generator according to Embodiment 6 of the present invention in an example in which the hydrogen generator includes a heat exchanger for recovering heat from a combustion exhaust gas from the combustor, a heat medium path through which a heat medium which receives the heat recovered from the combustion exhaust gas in the heat exchanger flows, a pump for flowing the heat medium in the heat medium path, and a heat accumulator for storing the heat medium that has recovered heat via the heat exchanger, and the controller operates the pump in a cooling step of cooling the reformer in which the combustion air supplier is operated in a state where the combustion operation of the combustor is stopped, in the abnormal shut-down process executed after the second abnormality is detected.

The hydrogen generator 102 according to Embodiment 6 of the present invention has basically the same configuration as that of the hydrogen generator 102 according to Embodiment 3, but is different from the same in the shut-down process (especially, cooling operation of the hydrogen generator 102).

To be specific, the hydrogen generator 102 of Embodiment 6 performs the abnormal shut-down process like the hydrogen generator 102 of Embodiment 5, but the following is different. To be specific, in the first abnormal shut-down process, the controller 110 causes the heat exchanger 121 to perform the heat recovery operation using the heat medium in such a manner that it controls the pump 122 to flow the heat medium through the secondary passage 122b in the heat exchanger 121, during a cooling operation period for which the combustion air supplier 177 is operated until the temperature of the reformer 16 reaches a temperature which is not higher than the stand-by temperature after the combustion in the burner 102a stops. On the other hand, in the second abnormal shut-down process, the controller 110 causes the heat exchanger 121 to perform the heat recovery operation using the heat medium in such a manner that it controls the pump 122 to flow the heat medium through the secondary passage 122b in the heat exchanger 121, during a cooling operation period for which the combustion air supplier 177 is operated until the temperature of the reformer 16 reaches a temperature which is not higher than the purge temperature after the combustion in the burner 102a stops.

In the hydrogen generator 102 of Embodiment 6, the cooling rate is set higher in the second abnormal shut-down process than in the first abnormal shut-down process. In that case, if the controller 110 executes control so that the amount of combustion air (operation amount of the combustion air supplier 117) supplied to the burner 102a during the cooling operation period of the hydrogen generator 102 (reformer 16) is set larger in the second abnormal shut-down process than in the first abnormal shut-down process, the amount of heat recovered with the air flowing through the combustion exhaust gas passage 10 increases, thereby increasing a temperature of the air exhausted to outside the hydrogen generator 102 via the combustion exhaust gas path 59. For this reason, the controller 110 preferably controls the pump 122 so that the flow rate of the heat medium flowing through the secondary passage 112b in the heat exchanger 112 is set larger in the abnormal shut-down process than in the normal shut-down process. In other words, the controller 110 preferably controls the flow rate of the heat medium flowing through the heat exchanger 112 so that an amount of heat recovery from the exhausted air by the heat exchanger 112 in the second abnormal shut-down process is larger than an amount of heat recovery from the exhausted air by the heat exchanger 112 in the first abnormal shut-down process.

The hydrogen generator 102 according to Embodiment 6 configured as described above can achieve the same advantages as those of the hydrogen generator 102 of Embodiment 5. In addition, in the hydrogen generator 102 according to Embodiment 6, it is possible to prevent the temperature of the air exhausted to outside via the combustion exhaust gas path 59 from becoming too high, during the cooling operation period of the hydrogen generator 102 (reformer 16). Thus, the hydrogen generator 102 can be stopped more safely.

Embodiment 7

A hydrogen generator according to Embodiment 7 of the present invention is an example in which the hydrogen generator is configured to perform a pressure compensation operation for supplying the gas from the gas supplier to the reformer with a decrease in a pressure in the interior of the sealed reformer after a hydrogen generating operation in the hydrogen generator, and the controller causes the gas supplier to perform the pressure compensation operation with a higher frequency (controller sets the number of times of the pressure compensation operation of the gas supplier in a given period larger) in the abnormal shut-down process executed after the second abnormality is detected than in the normal shut-down process executed after the first abnormality is detected.

The hydrogen generator 102 according to Embodiment 7 of the present invention has basically the same configuration as that of the hydrogen generator 102 according to Embodiment 5, but is different from the same in that the hydrogen generator 102 according to Embodiment 7 performs the pressure compensation process similar to that in the hydrogen generator 102 according to Embodiment 4. The hydrogen generator 102 of Embodiment 7 is configured to set the rate of the cooling per unit time higher in the cooling operation of the hydrogen generator 102 (reformer 16) in the second abnormal shut-down process than in the first abnormal shut-down process. Therefore, the temperature of the hydrogen generator (reformer 16) and the pressure in the hydrogen generator (reformer 16) decrease at a higher pace in the second abnormal shut-down process than in the first abnormal shut-down process. For this reason, the controller 110 is configured to set the frequency of the pressure compensation process higher (set the number of times of the pressure compensation process in a given period larger) in the second abnormal shut-down process than in the first abnormal shut-down process. In this way, generation of an excessively negative pressure within the gas passage (reformer 16) of the hydrogen generator 102 is suppressed. As a result, the fuel cell 101 is protected.

Embodiment 8

A fuel cell system according to Embodiment 8 of the present invention includes the hydrogen generator 102 of Embodiment 2. Although the fuel cell system according to Embodiment 8 includes the hydrogen generator 102 of Embodiment 2, it is clear that the advantages of the present invention are achieved in a fuel cell system including the hydrogen generator 102 of Embodiment 1 and a fuel cell. Hereinafter, the fuel cell system of Embodiment 8 will be described in detail.

[Configuration of Fuel Cell System]

Figure 12:
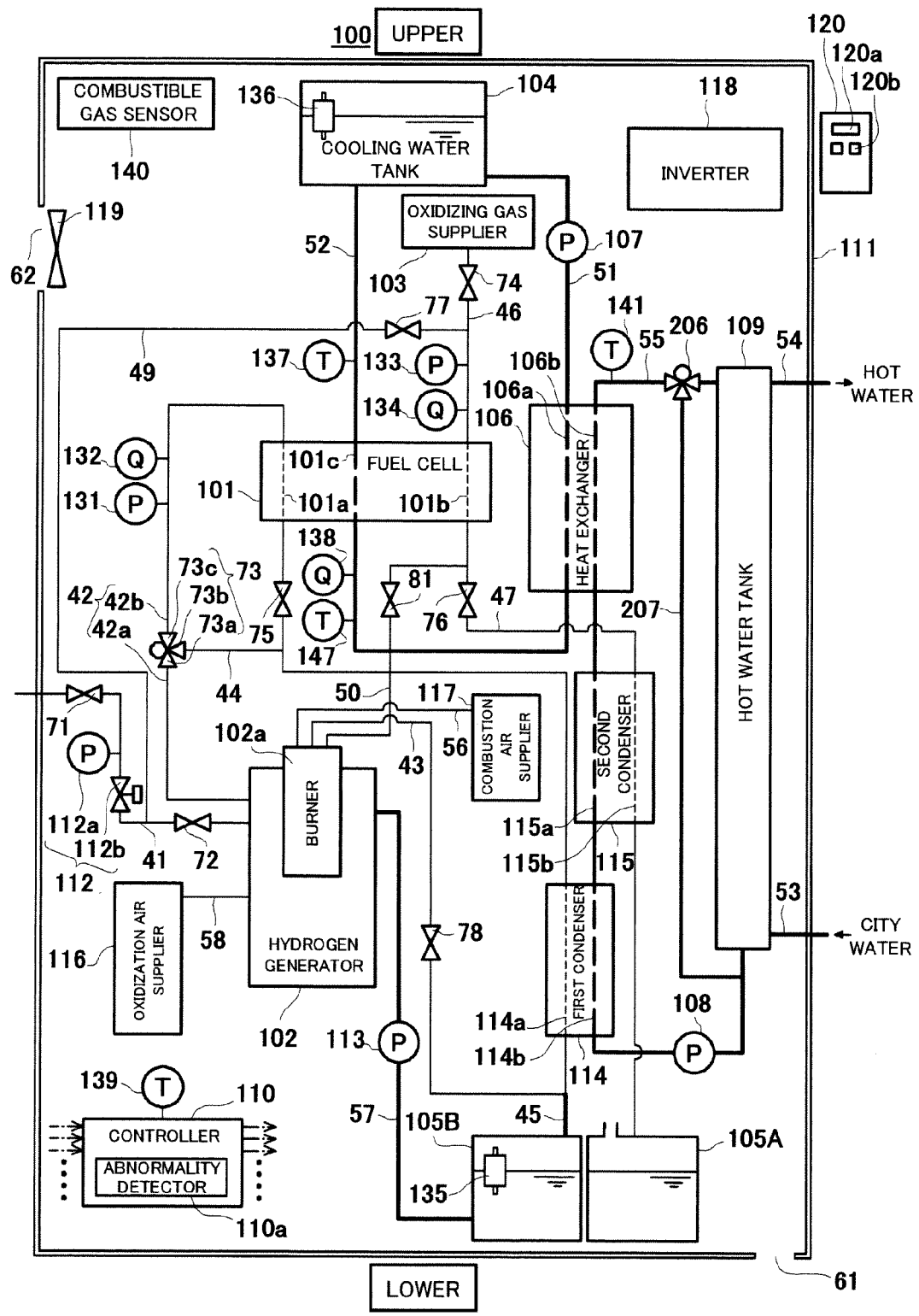
FIG. 12 is a view showing a schematic configuration of a fuel cell system according to Embodiment 8 of the present invention.

FIG. 12 is a view showing a schematic configuration of a fuel cell system according to Embodiment 8 of the present invention. In FIG. 12, upper and lower sides of the hydrogen generator are upper and lower sides in FIG. 12.

As shown in FIG. 12, a fuel cell system 100 according to Embodiment 8 of the present invention includes a fuel cell 101, the hydrogen generator 102, an oxidizing gas supplier 103, a cooling water tank 104, a condensed water tank 105, a heat exchanger (heat radiator) 106, a first pump (first flow control device) 107, a second pump (second output device) 108, a hot water storage tank 109, the controller 110, the abnormality determiner 110a, the package 111 formed by a housing, and detectors 140 to 145. In this embodiment, the package 111 extends vertically, and components such as the fuel cell 101 are accommodated. The abnormality determiner 110a constitutes the abnormality detector of the present invention and is configured to determine whether or not there is an abnormality based on the detected values of the detectors 140 to 145.

The hydrogen generator 102 includes the reformer 16, the shift converter 24, the purifier 28 (see FIG. 2), and the burner 102a. The downstream end of a material gas supply path 41 is connected to a material gas supply inlet 12 (see FIG. 2) of the reformer 16 of the hydrogen generator 102. In this Embodiment, as a material gas, a city gas containing methane as a major component is used. The upstream end of the material gas supply path 41 is connected to a pipe (not shown) of the city gas. The material gas supply path 41 is provided with a first on-off valve 71, a booster pump 112a, a flow control valve 112b, and a second on-off valve 72 which are arranged in this order from the upstream side. The first on-off valve 71 and the second on-off valve 72 are configured to permit/inhibit the flow of the material gas flowing through the material gas supply path 41. As these valves, electromagnetic valves may be used, for example. The booster pump 112a is configured to increase the pressure of the material gas flowing through the material gas supply path 41. The flow control valve 112b is configured to control the flow rate of the material gas flowing through the material gas supply path 41. The material gas supplier 112 is constituted by the booster pump 112a and the flow control valve 112b. Although the material gas supplier 112 is constituted by the booster pump 112a and the flow control valve 112b, it may consist of the booster pump 112a. In other words, the booster pump 112a may be configured to increase the pressure of the material gas and control the flow rate of the material gas.

The downstream end of an off-fuel-gas path 43 is connected to the burner (combustor) 102a so that an extra fuel gas remaining unconsumed in the fuel cell 101 is supplied as an off-gas to the burner 101a. In addition, the downstream end of a cathode purge gas exhaust path 50 is connected to the burner 102a so that a gas (hereinafter referred to as a cathode purge gas) which has been purged by a cathode purge process in the fuel cell 101 performed in a start-up process or a shut-down process of the fuel cell system 100 as described later, and stays in an oxidizing gas passage 101b, is supplied to the burner 102b. The downstream end of a combustion air supply path 56 is connected to the burner 102b, while a combustion air supplier 117 is connected to the upstream end of the combustion air supply path 56.

Thereby, the burner 102a is configured to combust the material gas supplied through a passage which is not shown (or off-fuel-gas supplied from the fuel cell 101 through the off-fuel-gas path 43 or the cathode purge gas supplied from the fuel cell 101 through the cathode purge gas exhaust path 50), with combustion air supplied from the combustion air supplier 117 through the combustion air supply path 56. As the combustion air supplier 117, for example, a blower or a fan such as a sirocco fan may be used.

The downstream end of a reforming water supply path 57 is connected to a water supply inlet 13 (see FIG. 2) of the reformer 16 of the hydrogen generator 102, while the upstream end of the reforming water supply path 57 is connected to the lower portion of a second condensed water tank 105B. A third pump 113 is provided in the reforming water supply path 57 to control the flow rate of the reforming water (condensed water) flowing through the reforming water supply path 57. Although the condensed water is directly supplied from the second condensed water tank 105B to the reformer 16 of the hydrogen generator 102, the present invention is not limited to this. The condensed water may be directly supplied from the first condensed water tank 105A to the reformer 16 of the hydrogen generator 102, or the condensed water stored in the second condensed water tank 105B may be supplied to the cooling water tank 104, and a part of the cooling water stored in the cooling water tank 104 may be supplied to the reformer 16 of the hydrogen generator 102 together with the cooling water stored in the cooling water tank 104.

The upstream end of an oxidization air supply passage 58 is connected to the purifier 28 of the hydrogen generator 102, while the downstream end of the oxidization air supply passage 58 is connected to the oxidization air supplier 116. The oxidization air supplier 116 is configured to supply air used in an oxidization reaction in the purifier. As the oxidization air supplier 116, for example, a bower or fan such as a sirocco fan may be used.

In the reformer 16, a reforming reaction between a material gas (methane) supplied from the material gas supplier 112 via the material gas supply path 41 and the condensed water supplied from the first condensed water tank 105A proceeds by utilizing heat transmission of a combustion exhaust gas generated in the burner 102a, to generate a hydrogen-rich reformed gas. In the shift converter 24, a shift reaction of the reformed gas generated in the reformer 16 occurs to reduce carbon monoxide contained in the reformed gas. In the purifier 28, carbon monoxide in the reformed gas, carbon monoxide of which has been reduced in the shift converter 24 reacts with an oxidization air supplied from the oxidization air supplier 116 via the oxidization air supply passage 58, to generate a fuel gas, carbon monoxide of which has been reduced to 10 ppm or lower. Although in this embodiment, methane is used as the material gas, a gas containing an organic compound composed of at least carbon and hydrogen which is represented by a gas containing hydrocarbon such as ethane or propane, or a gas containing a gaseous alcohol, may be used. In addition, although the hydrogen generator 102 is configured to include the shift converter 24 and the purifier 28 in the fuel cell system 100 of Embodiment 8, the shift converter 24 and the purifier 28 may be omitted if it is not necessary to further reduce carbon monoxide contained in the hydrogen-containing gas generated in the reformer 16. For example, when the hydrogen consuming device 101 is a device (solid oxide fuel cell) which is less likely to be poisoned by carbon monoxide, this configuration may be used.

The upstream end of a fuel gas supply path 42 is connected to the fuel gas outlet (see FIG. 2) of the purifier 28 of the hydrogen generator 102. A first switch 73 including a three-way valve is provided in an intermediate position of the fuel gas supply path 42. The downstream end of the fuel gas supply path 42 is connected to the upstream end of the fuel gas passage 101a of the fuel cell 101. To be specific, the fuel gas supply path 42 consists of a first fuel gas supply path 42a and a second fuel gas supply path 42b. The upstream end of the first fuel gas supply path 42a is connected to the fuel gas outlet 32 of the purifier 28 of the hydrogen generator 102, while the downstream end of the first fuel gas supply path 42a is connected to a first port 73a of the first switch 73. The upstream end of the second fuel gas supply path 42b is connected to a third port 73c of the first switch 73, while the downstream end of the second fuel gas supply path 42b is connected to the upstream end of the fuel gas passage 101a of the fuel cell 101. The upstream end of a fuel gas bypass path 44 is connected to a second port 73b of the first switch 73, while the downstream end of the fuel gas bypass path 44 is connected to an intermediate position of the off-fuel-gas path 43.

The upstream end of the off-fuel-gas path 43 is connected to the downstream end of the fuel gas passage 101a of the fuel cell 101, while the downstream end of the off-fuel-gas path 43 is connected to the burner 102a of the hydrogen generator 102. A fourth on-off valve 75 is provided in the off-fuel-gas path 43 in a location which is upstream of a point where the off-fuel-gas path 43 is connected to the fuel gas bypass path 44 and configured to permit/inhibit the flow of the fuel gas or the like flowing through the off-fuel-gas path 43. A first condenser 114 is provided at the off-fuel-gas path 43 in a location which is downstream of a point where the off-fuel-gas path 43 is connected to the fuel gas bypass path 44. The off-fuel-gas path 43 is connected to a primary passage 114a of the first condenser 114. The first condenser 114 is configured to condense a steam into water to separate an unreacted fuel gas from water. The upstream end of the first condensed water path 45 extending vertically is connected to the off-fuel-gas path 43 in a location downstream of the first condenser 114, while the downstream end of the first condensed water path 45 is connected to the upper portion (upper end surface) of the second condensed water tank 105B. Further, a seventh on-off valve 78 is provided at the off-fuel-gas path 43 in a location which is downstream of a point where the off-fuel-gas path 43 is connected to the fuel gas bypass path 44.

In this configuration, the fuel gas generated in the hydrogen generator 102 is supplied to the fuel gas passage 101a of the fuel cell 101. The fuel gas supplied to the fuel gas passage 101a is supplied to an anode (not shown) of each cell and is used in an electrical chemical reaction while flowing through the fuel gas passage 101a. An extra fuel gas remaining unconsumed in the fuel cell 101 flows into the off-fuel-gas path 43 as an off-gas. The steam contained in the extra fuel gas which has flowed into the off-fuel-gas path 43 is condensed into water while flowing through the primary passage 114a of the first condenser 114. The extra fuel gas which has been separated in the first condenser 114 is supplied to the burner 102a as the off-gas and is combusted in the burner 102a as described above. The water which has been separated in the first condenser 114 is supplied to the second condensed water tank 105B via the first condensed water path 45.

The oxidizing gas supplier 103 is configured to supply an oxidizing gas (in this embodiment air) to the oxidizing gas passage 101b of the fuel cell 101. As the oxidizing gas supplier 103, for example, a blower or a fan such as a sirocco fan may be used. The upstream end of the oxidizing gas supply path 46 is connected to the oxidizing gas supplier 103, while the downstream end of the oxidizing gas supply path 46 is connected to the oxidizing gas passage 101b of the fuel cell 101.

The third on-off valve 74 is configured to open and close the oxidizing gas supply path 46, and may be, for example, an electromagnetic valve.

The downstream end of a purge gas supply path 49 is connected to the oxidizing gas supply path 46 in a location downstream of the third on-off valve 74, while the upstream end thereof is connected to the material gas supply path 41 in a location between the flow control valve 112b and the second on-off valve 72. The purge gas supply path 49 is configured to flow a material gas as a purge gas or a pressure-compensation gas and is provided with a sixth on-off valve 77. The sixth on-off valve 77 is configured to open and close the purge gas supply path 49, and may be, for example, an electromagnetic valve or the like.

The upstream end of an off-oxidizing-gas path 47 is connected to the downstream end of the oxidizing gas passage 101b of the fuel cell 101, while the downstream end thereof opens outside the fuel cell system 100. A fifth on-off valve 76 is provided in the off-oxidizing-gas path 47 and configured to open and close the off-oxidizing-gas path 47. The upstream end of a cathode purge gas exhaust path 50 is connected to the off-oxidizing-gas path 47 in a location between the upstream end of the off-oxidizing-gas path 47 and the fifth on-off valve 76, while the downstream end of the cathode purge gas exhaust path 50 is connected to the burner 102a of the hydrogen generator 102 as described above. A ninth on-off valve 81 is provided in the cathode purge gas exhaust path 50.

A second condenser 115 is provided at the off-oxidizing-gas path 47 in a location downstream of the fifth on-off valve 76. The off-oxidizing-gas path 47 is connected to the primary passage 115a of the second condenser 115. The second condenser 115 is configured to condense a steam in an off-oxidizing-gas flowing through the off-oxidizing-gas path 47 to generate water so that an extra off-oxidizing-gas remaining unconsumed in the fuel cell 101 is separated from water. A portion of the off-oxidizing-gas path 47 which is downstream of the second condenser 115 extends vertically and is connected to the first condensed water tank 105A.

In this configuration, the oxidizing gas is supplied from the oxidizing gas supplier 103 to the oxidizing gas passage 101b of the fuel cell 101 via the oxidizing gas supply path 46. Then, the oxidizing gas supplied to the oxidizing gas passage 101b is supplied to a cathode (not shown) of each cell and is consumed in an electrochemical reaction while flowing through the oxidizing gas passage 101b. An extra oxidizing gas remaining unconsumed in the electrochemical reaction in the fuel cell 101 flows into the off-oxidizing-gas path 47, together with the water generated through the electrochemical reaction. The steam contained in the extra oxidizing gas which has flowed into the off-oxidizing-gas path 47 is condensed into water while flowing through the secondary passage 115b of the second condenser 115. The extra oxidizing gas which has been exhausted from the second condenser 115 is guided to the first condensed water tank 105A via the off-oxidizing-gas path 47. After that, the extra oxidizing gas is exhausted through an exhaust outlet provided at the first condensed water tank 105A and finally outside the fuel cell system 100 (outside the package 111). The water separated in the second condenser 115 is supplied to the first condensed water tank 105A. The water supplied to the first condensed water tank 105A is supplied to the second condensed water tank 105B at a time point when the amount of the water stored in the first condensed water tank 105A reaches a predetermined level or more In the fuel cell 101, the fuel gas supplied to the anode of each cell through the fuel gas passage 101a and the oxidizing gas supplied to the cathode of each cell through the oxidizing gas passage 101b electrochemically react with each other to generate electricity and heat. An extra fuel gas remaining unconsumed in the electrochemical reaction in the fuel cell 101 flows through the off-fuel-gas path 43 and is stored in the second condensed water tank 105B.

The fuel cell 101 is provided with a cooling water passage 101c for flowing the cooling water (first heat medium) for recovering the heat generated through the electrochemical reaction between the fuel gas and the oxidizing gas to cool the fuel cell 101 flows. The downstream end of the cooling water supply path 51 is connected to the upstream end of the cooling water passage 101c, while the upstream end of the cooling water supply path 51 is connected to the lower portion of the cooling water tank 104 for storing the cooling water. The upstream end of a cooling water discharge path 52 is connected to the downstream end of the cooling water passage 101c, while the downstream end of the cooling water discharge path 52 is connected to the lower end surface of the cooling water tank 104.

A heat exchanger 106 is provided at a proper position of a cooling water path (first heat medium path), for example, at a cooling water path which is other than the cooling water passage 101c within the fuel cell 101. A primary passage 106a of the heat exchanger 106 is connected to the cooling water supply path 51. In this embodiment, for example, the heat exchanger 106 is provided at the cooling water supply path 51. The heat exchanger 106 is configured to exchange heat between the cooling water flowing through the primary passage 106a and the hot water (second heat medium) flowing through a secondary passage 106b as described later. The cooling water supply path 51, the primary passage 106a of the heat exchanger 106, the cooling water passage 101c of the fuel cell 101, and the cooling water discharge path 52 constitute the cooling water path (first heat medium path).

A water temperature 137 is provided in the vicinity of the upstream end of the cooling water discharge path 52. The temperature detector 137 is configured to detect the temperature of the cooling water flowing through the cooling water path and output the detected temperature to the controller 110. In this embodiment, the temperature detector 147 is provided at the cooling water supply path 51 in a location downstream of the heat exchanger 106 and is configured to detect the temperature of the cooling water which has flowed through the heat exchanger 106 and flows into the fuel cell 101. The temperature detector for detecting the temperature of the cooling water is not limited to the above configuration, but may be either one of the temperature detector 137 and the temperature detector 147, or may be provided at any location on the cooling water path (first heat medium path).

Figure 13:
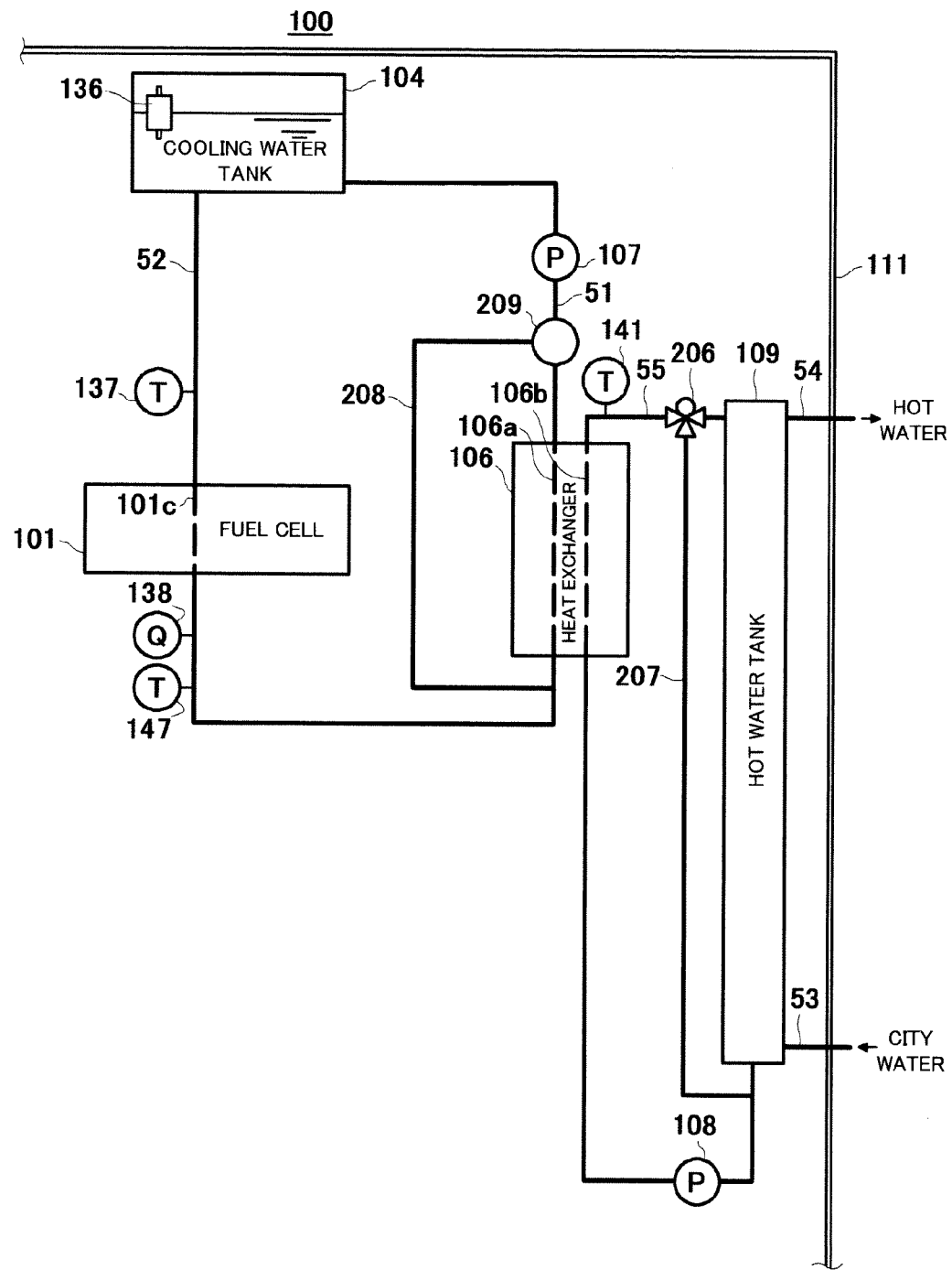
FIG. 13 is a schematic view showing another configuration of the fuel cell system 100 of FIG. 12.

The first pump (first flow control device) 107 configured to control the flow rate of the cooling water flowing through the cooling water path is provided at a proper location of the cooling water path (in this embodiment, cooling water supply path 51). Although a pump capable of controlling the flow rate is used as the first flow control device of the present invention, the present invention is not limited to this, but the first flow control device may be configured as shown in FIG. 13. FIG. 13 is a schematic view showing another configuration of the fuel cell system 100 of FIG. 12. In FIG. 13, a part of the configuration is omitted.

As shown in FIG. 13, a heat exchanger bypass path 208 which branches from the cooling water path (in this embodiment, cooling water discharge path 52) and bypasses the heat exchanger 106 may be provided, and a flow control device (e.g., mixing valve 209) configured to control the flow rate of the cooling water which has flowed through the fuel cell 101 and then flows into the heat exchanger bypass path 208 or into the heat exchanger 106, may be combined with a pump to control the flow rate of the cooling water flowing through the heat exchanger 106, as the first flow control device of the present invention.

In this configuration, the cooling water flowing through the cooling water supply path 51 exchanges heat with the hot water flowing through the secondary passage 106b of the heat exchanger 106 and is thereby cooled while flowing through the primary passage 106a of the heat exchanger 106. The cooling water which has been cooled is supplied to the cooling water passage 101c of the fuel cell 101. The cooling water supplied to the cooling water passage 101c recovers the heat generated in the fuel cell 101 to cool the fuel cell 101. Then, the cooling water which has recovered the exhaust heat from the fuel cell 101 is supplied to the cooling water tank 101.

In this embodiment, the hot water storage tank 109 extends vertically. A water supply path 53 through which city water is supplied is connected to the lower portion of the hot water storage tank 109. A hot water supply path 54 through which hot water is supplied to a user is connected to the upper portion of the hot water storage tank 109. A heat load (not shown) which utilizes hot water is connected to the hot water supply path 54. As the heat load, for example, there are a hot water device, a heating device, an air conditioner, etc.

The upstream end of the hot water path 55 is connected to the lower end surface of the hot water storage tank 109, while the downstream end of the hot water path 55 is connected to the upper portion of the hot water storage tank 109. The hot water path 55 is provided with the second pump (second output device) 108, the first condenser 114, the second condenser 115, and the heat exchanger 106 which are arranged in this order from the upstream side. The hot water path 55 is connected to the secondary passage 114b of the first condenser 114, the secondary passage 115b of the second condenser 115 and the secondary passage 106b of the heat exchanger 106.

Thereby, the hot water flowing through the hot water path 55 exchanges heat with an off-fuel-gas flowing through the primary passage 114a of the first condenser 114 and is thereby heated while flowing through the secondary passage 114b of the first condenser 114. Then, the hot water exchanges heat with the oxidizing gas flowing though the primary passage 115a of the second condenser 115 and is thereby heated while flowing through the secondary passage 115b of the second condenser 115. Then, the hot water which has flowed through the secondary passage 115b of the second condenser 115 exchanges heat with the cooling water flowing through the primary passage 106a of the heat exchanger 106 and is thereby heated while flowing though the secondary passage 106a of the heat exchanger 106. The heated hot water flows through the hot water path 55 and is supplied to the upper end portion of the hot water storage tank 109. In such a configuration, the hot water storage tank 109 is so-called a layered hot water storage tank in which water with a temperature which is close to and as low as the temperature of the city water is stored in the lower portion of the hot water storage tank 109 and the heat medium with a temperature raised by the heat exchanger 106 or the like is stored in the upper portion thereof.

The fuel cell system 100 includes a temperature detector 146 configured to detect the temperature of the hot water which has flowed through the heat exchanger 106, on the hot water path 55, a hot water bypass path 207 which bypasses the hot water storage tank 109 and is connected to the hot water path 55 in a location upstream of the first condenser 114, at the hot water path 55 in a location which is downstream of the temperature detector 146, and a switch 206 which is configured to switch a destination of the hot water which has flowed through the heat exchanger 106 between the hot water storage tank 109 and the hot water bypass path 207.

An inverter 118 is electrically connected to the fuel cell 101 via a suitable wire and is configured to convert a DC generated in the fuel cell 101 into an AC, and supplies an electric power to a power load outside the fuel cell system 100. A system power supply is connected to an electric path through which the current output from the inverter 118 flows, via a system interconnection point (not shown). In other words, the electric power output from the fuel cell 101 and the electric power output from the system electric power supply are interconnected at the system/interconnection point.

The package 111 is provided with an air inlet 61 and an air outlet 62 at suitable locations. The air inlet 61 and the air outlet 62 are preferably distant from each other as far as possible so that outside air flows through the inside of the entire package 111. The air outlet 62 is preferably provided at the upper portion of the package 11 where a combustible gas such as a city gas containing methane as a major component or hydrogen, which is lighter than oxygen, tends to be stagnant. A ventilation fan 119 is provided in the vicinity of the air outlet 62. As the ventilation fan 119, a fan such as a sirocco fan may be used.

Thus, outside air is suctioned through the air inlet 61 by the ventilation fan 119 and the suctioned outside air is exhausted through the air outlet 62.

Within the package 111 of the fuel cell system 100, a combustible gas sensor 140 is provided. The combustible gas sensor 140 is configured to detect a leakage (concentration) of a combustible gas (e.g., material gas or hydrogen gas) within the fuel cell system 100 (package 111) and output the detected combustible gas concentration to the controller 110. In this Embodiment, the combustible gas sensor 140 is provided at the upper portion of the package 111 where a combustible gas such as a city gas containing methane as a major component or hydrogen, which is lighter than oxygen, tends to be stagnant, and in the vicinity of the ventilation fan 119.

The controller 110 is constituted by a computer such as a microcomputer, and includes a calculation section constituted by a CPU, a memory section constituted by a memory or the like, a communication section, and a timer section having a calendar function (not shown). The calculation section is configured to read out a predetermined control program stored in the memory section and run the program to control the fuel cell system 100. The calculation section is configured to process data stored in the memory section and data input from the operation input section. Particularly, the calculation section also serves as the abnormality determiner 110a configured to determine whether or not abnormality which is followed by the shut-down of the fuel cell system 100 has occurred, based on an abnormality determination program which is read out from the memory section and the detected values received from the detectors 140 to 145 as inputs. If the abnormality determiner 110a determines that the abnormality has occurred, a shut-down process of the fuel cell system 101 is performed as described later.

As used herein, the term "controller" encompasses not only a single controller but also a controller group in which a plurality of controllers cooperate to control the fuel cell system 100. Therefore, the controller 110 need not be constituted by a single controller but may be a plurality of controllers which are distributed and are configured to cooperate with each other to control the fuel cell system 100.

Although the abnormality determiner 110a determines whether or not there is an abnormality, based on the detected values received from the detectors 140 to 145 as inputs, the present invention is not limited to this. The detectors 140 to 145 may include calculators such as microcomputers to determine whether or not there is an abnormality based on the physical amounts detected by them, respectively.

The remote control device 120 includes a control section (not shown) constituted by a microcomputer, a communication section (not shown), a display section 120a and a key operation section 120b. The control section controls the communication section, and others. In the remote control device 120, the communication section receives a control signal and the control section processes the control signal and transmits it to the display section 120a. An operation signal is input with the key operation section 120b of the remote control device 120 and is sent to the controller 110 via the control section and the communication section of the remote control device 120 and is received in the communication section of the controller 110. Hereinafter, for easier explanation, it is assumed that signals are sent between the controller 110 and the remote control device 120 without communication between communication sections of the controller 110 and the remote control device 120 and processing in the control section in the remote control device 120.

[Operation of Fuel Cell System]

Next, a start-up process (start-up operation) of the fuel cell system 100 of Embodiment 8 will be described with reference to FIG. 12. Upon the user operating the remote control device 120, the controller 110 starts controlling of the fuel cell system 100, to carry out the following operation.

Initially, at the start of the start-up process, the third on-off valve 74, the fifth on-off valve 76 and the sixth on-off valve 77 maintain their closed states so that the material gas and the oxidizing gas do not flow through the oxidizing gas supply path 46. The first switch 73 connects the first port 73a to the second port 73b and disconnects the third port 73c so that a fuel gas, carbon monoxide of which has not been sufficiently reduced yet, is not supplied to the fuel gas passage 101a of the fuel cell 101. Then, the first on-off valve 71 opens, so that the material gas is supplied to the material gas supply path 41.

Then, the second on-off valve 72 opens. Thereby, the material gas is supplied from the material gas supplier 112 to the burner 102a via a passage which is not shown so as to bypass the hydrogen generator 102. Combustion air is supplied from the combustion air supplier 117 to the burner 102a via the combustion air supply path 56. The burner 102a combusts the supplied material gas by the combustion air to generate a combustion exhaust gas. The generated combustion exhaust gas flows through a combustion exhaust gas passage 10 (see FIG. 2) provided within the hydrogen generator 102, heats the reformer 16, the shift converter 24 and the purifier 28, and is thereafter exhausted to outside the fuel cell system 100 (package 111). In this case, the reformer 16, the shift converter 24 and the purifier 28 of the hydrogen generator 102 are heated by the heat transmitted from the combustion exhaust gas.

Then, the material gas is supplied from the material gas supplier 112 to the reformer 16 of the hydrogen generator 102 via the material gas supply path 41, and the reforming water (condensed water) is supplied from the first condensed water tank 105A to the reformer via the reforming water supply path 57. The supplied water is heated to generate a steam. The material gas and the steam react with each other to generate a reformed gas containing hydrogen. The generated hydrogen-containing gas flows through the shift converter 24 and the purifier 28 of the hydrogen generator 102, and is output from the hydrogen generator 102 as a fuel gas, carbon monoxide of which has been reduced. The output fuel gas is guided to the first fuel gas supply path 42a through the fuel gas outlet 32 (see FIG. 2) of the purifier 28 of the hydrogen generator 102.

The fuel gas which has been guided to the first fuel gas supply path 42a flows through the first fuel gas supply path 42a, the fuel gas bypass path 44 and the off-fuel-gas path 43 (to be precise, a portion of the off-fuel-gas path 43 which is downstream of a joint where the fuel gas bypass path 44 and the off-fuel-gas path 43 are joined together) and is then supplied to the burner 102a. Upon the start of the supply of the fuel gas to the burner 102a, the direct supply of the material gas from the material gas supplier 112 to the burner 102a by bypassing the hydrogen generator 100 is stopped.

When the temperature detected by the temperature detector 143 attached to the reformer 16 of the hydrogen generator 102 reaches a predetermined temperature (e.g., 500 degrees C.), the sixth on-off valve 77 and the ninth on-off valve 81 are opened, so that the material gas flows through the purge gas supply path 49 and the oxidizing gas supply path 46 (to be specific, a portion of the oxidizing gas supply path 46 which is downstream of the third on-off valve 74) and is supplied to the oxidizing gas passage 101b of the fuel cell 101, to purge hydrogen which has entered the oxidizing gas passage 101b from the fuel gas passage 101a via an electrolyte during a shut-down period of the fuel cell system 100 (cathode purge process in start-up process of the fuel cell system 100). By the cathode purge process, the exhausted cathode purge gas and material gas are supplied to the burner 10a via the cathode purge gas exhaust path 50 and is combusted therein. When the material gas which is more than an amount required to purge at least the gas sealed in the oxidizing gas passage 101b to the burner 102a has been supplied, before the start of the cathode purge process, the sixth on-off valve 77 and the ninth on-off valve 81 are closed and the cathode purge gas process terminates.

When the temperature detector 143 attached to the reformer 16 in the hydrogen generator 102, the temperature detector 144 attached to the shift converter 24 in the hydrogen generator 102, and the temperature detector 145 attached to the purifier 28 in the hydrogen generator 102 detect predetermined temperatures (e.g., the temperature of the reformer 16 is 600~650 degrees C., the temperature of the shift converter 24 is 200~250 degrees C., and the temperature of the purifier 28 is 130~170 degrees C.), the controller 110 terminates the start-up process of the fuel cell system 100 terminates and starts a power generation process (power generation operation).

Next, the power generation process (power generation operation) of the fuel cell system 100 of Embodiment 8 will be described.

Initially, when the temperature detected by the temperature detector 143 attached to the reformer 16 in the hydrogen generator 102, the temperature detected by the temperature detector 144 attached to the shift converter 24 in the hydrogen generator 102, and the temperature detected by the temperature detector 145 attached to the purifier 28 in the hydrogen generator 102 reach the associated predetermined temperatures (e.g., the temperature of the reformer 16 is a predetermined temperature in a range of 600~650 degrees C., the temperature of the shift converter 24 is in a range of 200~250 degrees C., and the temperature of the purifier 28 is in a range of 130~170 degrees C.), the controller 110 determines that carbon monoxide has been sufficiently reduced in the shift converter 24 and the purifier 28 and outputs a power generation start signal.

Thereupon, the third on-off valve 74, the fourth on-off valve 75 and the fifth on-off valve 76 are opened. In addition, the first switch 73 connects the first port 73a to the third port 73c, disconnects the second port 73b, and starts the operation of the oxidizing gas supplier 103.

Thereby, the fuel gas generated in the hydrogen generator 102 flows through the first fuel gas supply path 42a and the second fuel gas supply path 42b (i.e., fuel gas supply path 42) and is supplied to the fuel gas passage 101a of the fuel cell 101. The oxidizing gas is supplied from the oxidizing gas supplier 103 to the oxidizing gas passage 101b of the fuel cell 101 via the oxidizing gas supply path 46.

The fuel gas supplied to the fuel gas passage 101a of the fuel cell 101 is supplied to the anode of each cell and the oxidizing gas supplied to the oxidizing gas passage 101b of the fuel cell 101 is supplied to the cathode of each cell. The fuel gas and the oxidizing gas electrochemically react with each other to generate water, electricity and heat. The generated electricity is supplied to a power load outside the fuel cell system 100 after a DC has been converted into an AC by the inverter 118.

An extra fuel gas remaining unconsumed in the fuel cell 101 is supplied as an off-fuel-gas to the off-fuel-gas path 43. A steam contained in the extra fuel gas supplied to the off-fuel-gas path 43 is condensed into water while flowing through the primary passage 114a of the first condenser 43. The extra fuel gas which has flowed through the first condenser 114 is supplied to the burner 102a as an off-fuel-gas and is combusted in the burner 102a as described above. The water separated in the first condenser 114 is supplied to the second condensed water tank 105B via the off-fuel-gas path 43.

An extra oxidizing gas remaining unconsumed in the electrochemical reaction in the fuel cell 101 is supplied to the off-oxidizing-gas path 47. A steam contained in the extra oxidizing gas supplied to the off-oxidizing-gas path 47 is condensed into water while flowing through the primary passage 115a of the second condenser 115. The extra oxidizing gas which has flowed through the second condenser 115 is finally exhausted to outside the fuel cell system 100 via an exhaust outlet of the first condensed water tank 105A. The water separated in the second condenser 115 is supplied to the first condensed water tank 105A via the off-oxidizing-gas path 47.

Further, by operating the first pump 107, the cooling water is supplied from the cooling water tank 104 to the cooling water passage 101c of the fuel cell 101 via the cooling water path (to be precise, cooling water supply path 51). To be specific, the cooling water is supplied from the cooling water tank 104 to the primary passage 106a of the heat exchanger 106 via the cooling water supply path 51. The cooling water which has been supplied to the primary passage 106a of the heat exchanger 106, exchanges heat with the hot water flowing through the secondary passage 106b of the heat exchanger 106, and is thereby cooled while flowing through the primary passage 106a of the heat exchanger 106. The cooling water which has been cooled is supplied to the cooling water passage 101c of the fuel cell 101 via the cooling water supply path 51. The cooling water supplied to the cooling water passage 101c recovers heat generated in the fuel cell 101 to cool the fuel cell 101. The cooling water which has recovered exhaust heat from the fuel cell 101 is supplied to the cooling water tank 104 via the cooling water discharge path 52.

The hot water supplied from the lower portion (herein, lower end surface) of the hot water storage tank 109 to the hot water path 55 exchanges heat with the extra fuel gas and the extra oxidizing gas flowing through the primary passage 114a of the first condenser 114 and the primary passage 115a of the second condenser 115, respectively, and thereby is heated, while flowing through the secondary passage 114b of the first condenser 114 and the secondary passage 115b of the second condenser 115. The heated hot water is supplied to the secondary passage 106b of the heat exchanger 106 and exchanges heat with the cooling water flowing through the primary passage 106a of the heat exchanger 106 and is further heated while flowing through the secondary passage 106b of the heat exchanger 106. The heated hot water is supplied to the upper portion of the hot water storage tank 109 via the hot water path 55 and then is supplied to the heat load via the hot water supply path 54.

Next, a normal shut-down process (shut-down operation) of the fuel cell system 100 according to Embodiment 8 will be described. As used herein, the normal shut-down process refers to a shut-down process which is different from a shut-down process (abnormality detection/shut-down process) performed when the abnormality detector detects an abnormality during the power generation operation of the fuel cell system 100. For example, the normal shut-down process refers to a shut-down process which is performed when a power demand of a power load has decreased to a level at which a power generation operation is unnecessary, a shut-down process performed at a preset shut-down time, etc.

In the present invention, the shut-down process (shut-down operation) is defined as an operation performed from when the controller 110 outputs a shut-down signal until the fuel cell system 100 completes the shut-down process. After the fuel cell system 100 completes the shut-down process, the controller 110 is operating and the components other than the controller 110 are in a stopped state. If a start-up request is generated, the controller 110 outputs a start-up command, and the fuel cell system 100 quickly shifts to a stand-by mode in which the fuel cell system 100 can start the start-up process. The controller 110 outputs a shut-down command, when the user operates the remote control device 120 to enter a shut-down command, or the power demand of the power load reaches a value which is not more than a predetermined threshold (a power demand of a load power which is detected by a load power detector (not shown) reaches a value which is not more than a predetermined threshold). The shut-down of power generation of the fuel cell 101 is performed in such a manner that the output of the inverter 118 is set to zero, and an electric path at an exit side of the inverter 118 is electrically disconnected.

Figure 14A:
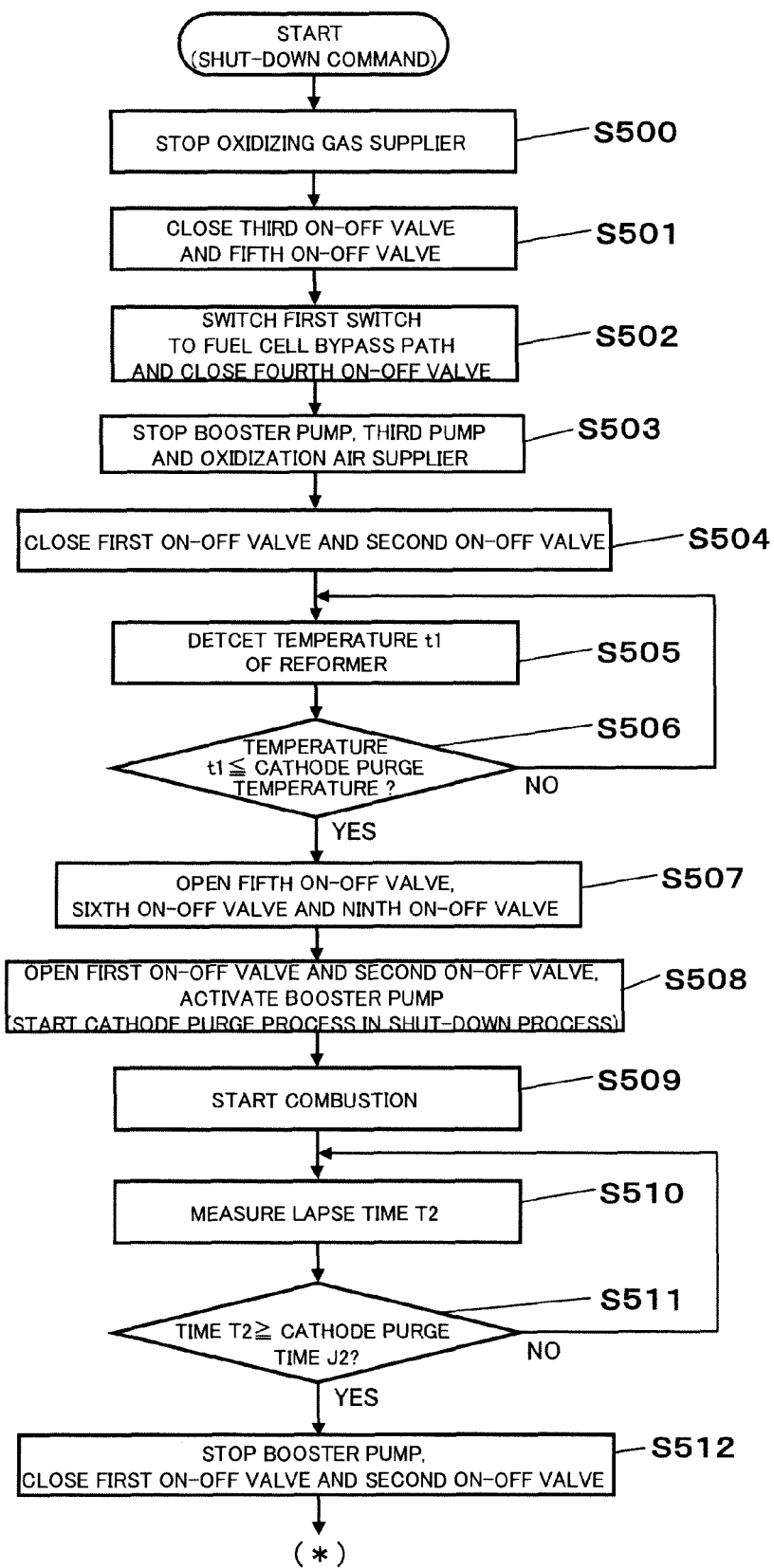
FIG. 14A is a flowchart showing a main operation of a normal shut-down process in the fuel cell system according to Embodiment 8 of the present invention.
Figure 14B:
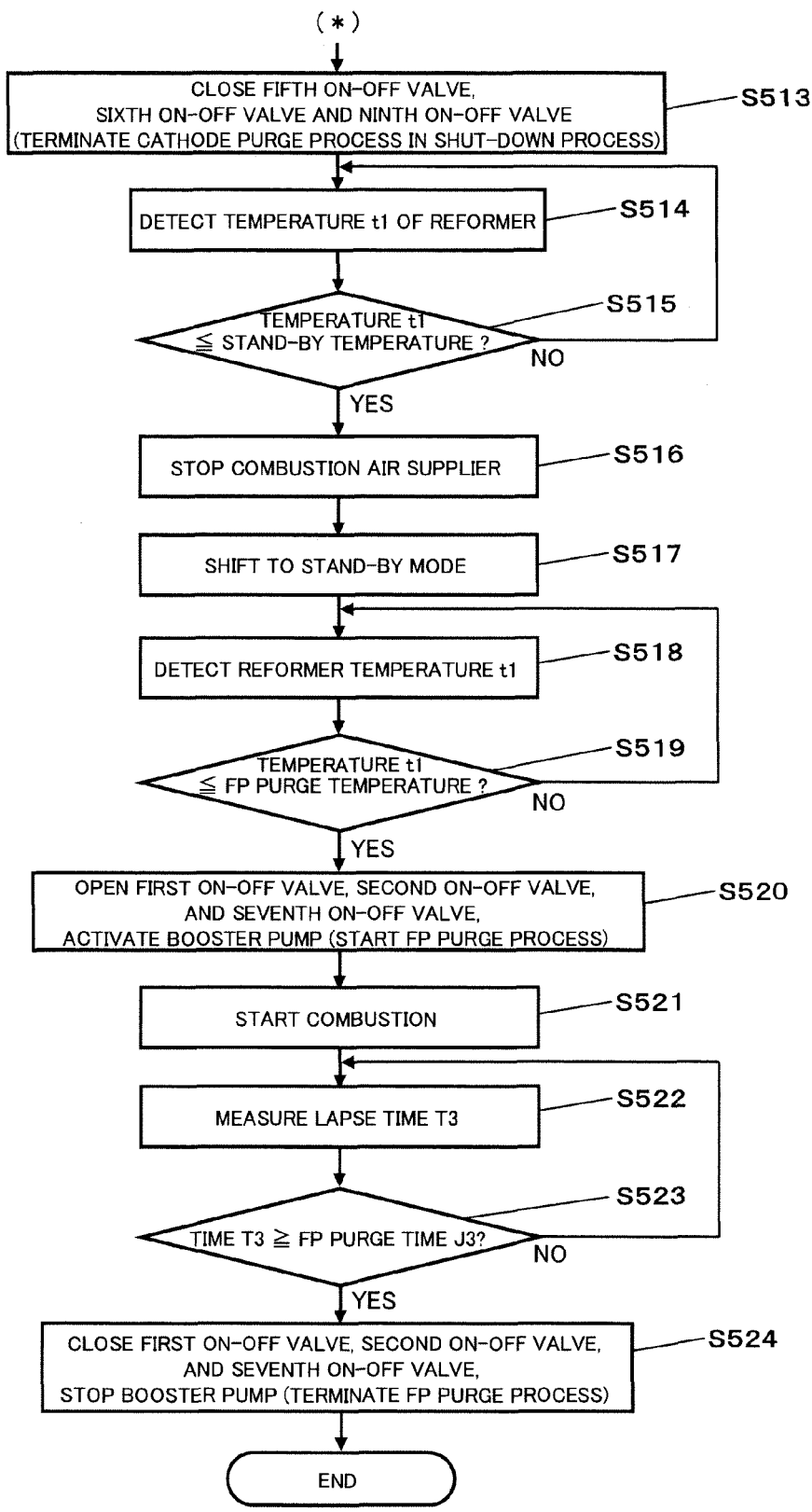
FIG. 14B is a flowchart showing a main operation of the normal shut-down process in the fuel cell system according to Embodiment 8 of the present invention.
Figure 15:
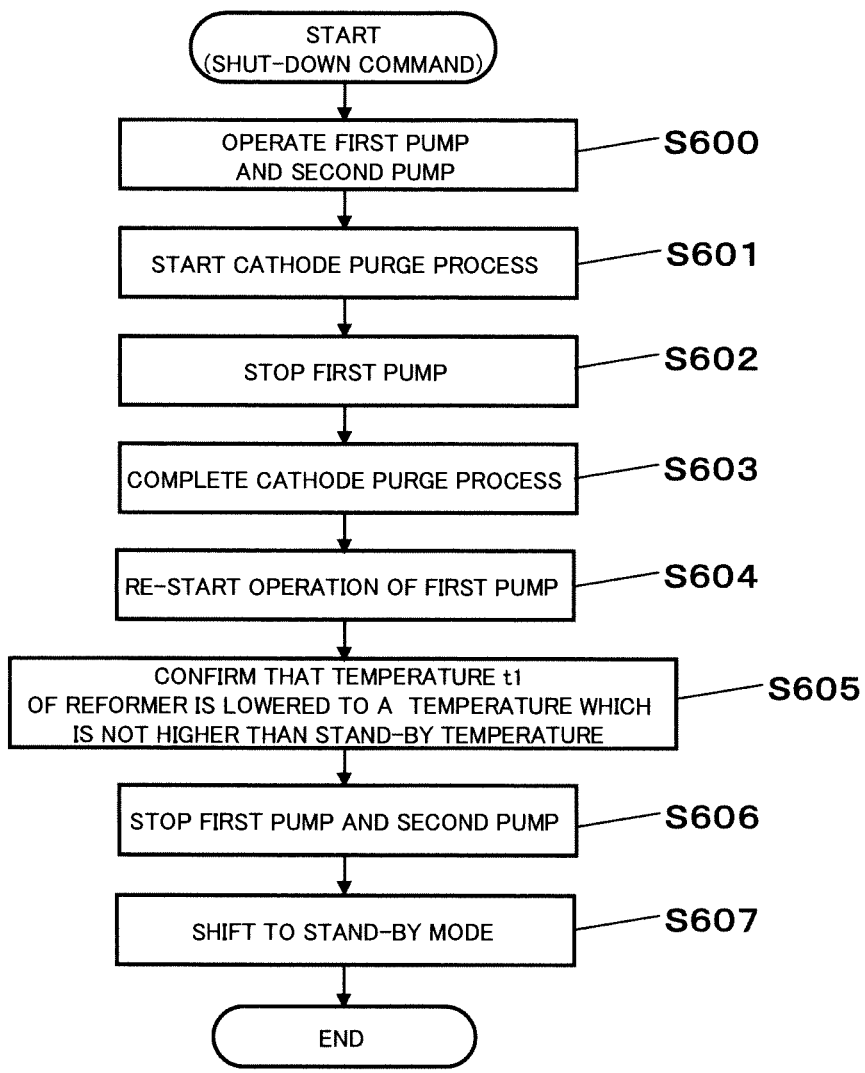
FIG. 15 is a flowchart showing an exhaust heat recovery operation of the fuel cell in the normal shut-down process of the fuel cell system according to Embodiment 8 of the present invention.

Hereinafter, the normal shut-down process (shut-down operation) of the fuel cell system 100 according to Embodiment 8 will be described with reference to FIGS. 14A and 14B and FIG. 15. FIG. 14A is a flowchart showing a main operation of a normal shut-down process in the fuel cell system according to Embodiment 8 of the present invention. FIG. 14B is a flowchart showing a main operation of the normal shut-down process in the fuel cell system according to Embodiment 8 of the present invention. FIG. 15 is a flowchart showing an exhaust heat recovery operation of the fuel cell in the normal shut-down process of the fuel cell system according to Embodiment 8 of the present invention.

Initially, the operation of the oxidizing gas supplier 103 is stopped and the supply of the oxidizing gas to the oxidizing gas passage 101b is stopped (step S500). And, the third on-off valve 74 and the fifth on-off valve 76 are closed and the oxidizing gas passage 101b of the fuel cell 101 is disconnected from outside (step S501).

The first switch 73 connects the first port 73a to the second port 73b and disconnects the third port 73c, and the fourth on-off valve 75 is closed (step S502). Thereby, the fuel gas is confined in a passage between the third port 73c of the first switch 73 and the fourth on-off valve 75, i.e., a passage including the second fuel gas supply path 42, the fuel gas passage 101a of the fuel cell 101 and a portion of the off-fuel-gas path 43 up to the fourth on-off valve 75, so that entry of air or the like from outside into the fuel gas passage 101a is suppressed and degradation of the anode is suppressed.

The booster pump 112a, the third pump 113 and the oxidization air supplier 116 are stopped, and the supply of the material gas, reforming water and oxidization air to the hydrogen generator 102 is stopped (step S503). Furthermore, the first on-off valve 71, the second on-off valve 72, and the seventh on-off valve 78 are closed (step S504).

Thereby, the supply of the material gas, the reforming water and the oxidization air to the hydrogen generator 102 is stopped, and the supply of the fuel gas from the hydrogen generator 102 to the fuel gas passage 101a of the fuel cell 101 is stopped. Concurrently, the supply of the off-gas from the fuel cell 101 to the burner 102a is stopped and combustion in the burner 102a is stopped. The combustion in the burner 102a is stopped in such a manner that after extinguishment of a flame, an operation for exhausting a gas remaining in the radiation tube 9 outside the housing 111 by the air supplied from the combustion air supplier 117 is carried out, thereby completing a combustion stop process in the burner 102a. Through the above series of operation, the supply of the fuel gas and the supply of the oxidizing gas to the fuel cell 101 are stopped, and therefore power generation is stopped. After the stop of combustion in the burner 102a, the hydrogen generator 102 is cooled by the air supplied to the combustion air supplier 117, and the temperature of the hydrogen generator 102 decreases with time.

Then, when the temperature detected by the temperature detector 143 attached to the reformer 16 of the hydrogen generator 102 (step S505) reaches a temperature which is not higher than a cathode purge temperature (Yes in step S506), the fifth on-off valve 76, the sixth on-off valve 77 and the ninth on-off valve 81 are opened (step S507), the first on-off valve 71 and the second on-off valve 72 are opened, and the operation of the booster pump 112a starts (start of a cathode purge process in the shut-down process of the fuel cell system 100) (step S508). The cathode purge temperature is defined as a temperature (e.g., 600 degrees C.) which is lower than a heat resistance temperature of a catalyst used in the reformer 16 in view of addition of a temperature increase in the hydrogen generator 102 in the cathode purge process in the shut-down process. At the start of the cathode purge process of the shut-down process, the material gas and the steam sealed in the inner space just after the shut-down, remain in the interior of the reformer 16 of the hydrogen generator 102. Therefore, there is a small chance of deposition of carbon from a raw material during the cathode purge process in the shut-down process.

Thereby, the material gas (purge gas) is supplied from the material gas supply path 41 to the oxidizing gas passage 101b of the fuel cell 101, via the purge gas supply path 49 and then the oxidizing gas supply path 46 (to be precise a portion of the oxidizing gas supply path 46 which is downstream of a joint where the purge gas supply path 49 is joined to the oxidizing gas supply path 46). The oxidizing gas staying in the oxidizing gas passage 101b is purged by the purge gas and is supplied to the burner 102a via the off-oxidizing-gas path 47 (to be precise, a portion of the oxidizing gas path 47 which is upstream of the fifth on-off valve 76), and the cathode purge gas exhaust path 50. The oxidizing gas and material gas supplied to the burner 102a are combusted in the burner 102a (step S509).

Then, a time T2 which lapses after the cathode purge process in the shut-down process starts is measured (step S510), and when the lapse time T2 reaches a time which is not less than a cathode purge time J2 (Yes in step S511), the booster pump 112a is stopped, the first on-off valve 71 and the second on-off valve 72 are closed (step S512), and the fifth on-off valve 76, the sixth on-off valve 77 and the ninth on-off valve 81 are closed (cathode purge process of the shut-down process of the fuel cell system 100 terminates) (step S513). The cathode purge time is defined as a time required to exhaust the oxidizing gas in the oxidizing gas passage 101b of the fuel cell 101, at least from the oxidizing gas passage 101b.

Thereby, a purge gas is confined in a closed passage defined by the third on-off valve 74, the sixth on-off valve 77, the fifth on-off valve 76 and the ninth on-off valve 81, i.e., a path from a portion of the purge gas supply path 49 which is downstream of the sixth on-off valve 77, a portion of the oxidizing gas supply path 46 which is downstream of the third on-off valve 74, the oxidizing gas passage 101b, a portion of the off-oxidizing-gas path 47 up to the fifth on-off valve 76, and a portion of the cathode purge gas exhaust path 50 up to the ninth on-off valve 81 (hereinafter referred to as a purge gas seal passage), so that entry of air or the like from outside to the oxidizing gas passage 101b is suppressed.

The combustion air supplier 117 supplies the combustion air to the burner 102a after the combustion in the burner 102a in the cathode purge process stops. Thereby, the reformer 16 and the like in the hydrogen generator 102 are cooled by the combustion air flowing through the combustion exhaust gas path 59 (see FIG. 2) (cooling operation of the hydrogen generator 102).

Then, during the above cooling operation after the cathode purge process in the shut-down process of the fuel cell system 100 terminates, the temperature detector 143 attached to the reformer 16 of the hydrogen generator 102 detects a temperature of the reformer 16 (step S514). When the detected temperature is not higher than a stand-by temperature (e.g., 500 degrees C.) (Yes in step S515), the combustion air supplier 117 stops the supply of the combustion air to the burner 102a (step S516). Thus, the cooling process of the hydrogen generator 102 completes.

In the shut-down process of the fuel cell system 100, a predetermined cooling operation (exhaust heat recovery operation) is performed in a cooling system of the fuel cell 101 concurrently with the above series of shut-down process. To be specific, as shown in FIG. 5, after stop of the power generation in the fuel cell 101, the first pump 107 and the second pump 108 are operated (step S600), and the hot water exchanges heat with the cooling water in the heat exchanger 106 to recover extra heat held in the fuel cell 101.

When the temperature detected by the temperature detector 143 attached to the reformer 16 reaches a temperature which is not higher than the cathode purge temperature and the cathode purge process in the shut-down process starts (step S601), the controller 110 stops the operation of the first pump 107 (step S602). When the cathode purge process in the shut-down process terminates (step S603), the controller 110 resumes the operation of the first pump 107 (step 604), confirms whether or not the temperature t1 of the reformer 16 has decreased to the temperature which is not higher than the stand-by temperature in step S515 of FIG. 14B (step S605), and stops the operation of the first pump 107 and the operation of the second pump 108 when the combustion air supplier 117 stops the cooling operation of the hydrogen generator 108 in step S516 of FIG. 14B (step S606).

When the cooling operation for cooling the hydrogen generator 102 to the stand-by temperature and the cooling operation of the fuel cell performed in association with this cooling operation completes, the fuel cell system 100 shifts to the stand-by mode (step S517 in FIG. 14B and step S607 in FIG. 15). The stand-by mode refers to a state in which the fuel cell system 100 is awaiting next start of operation of the fuel cell system 100, and is defined as, for example, a state in which the fuel cell system 100 is ready to perform a next start-up process in response to a start-up command output from the controller 110 when a predetermined start-up request is generated. Examples of the start-up request may include the fact that the power demand of the power load is not less than the power generation output of the fuel cell system, or that the user operates the key operation section 120b of the remote control device 120 to make a power generation request.

In the stand-by mode, the hydrogen generator 102 is naturally cooled because the combustion air supplier 117 is in a stopped state. During this time, the temperature detector 143 attached to the reformer 16 of the hydrogen generator 102 detects the temperature t1 of the reformer 16 again as shown in FIG. 14A (step S518). When the detected temperature t1 reaches a temperature which is not higher than a FP purge temperature (e.g., 300 degrees C.) which is lower than the stand-by temperature (step S519), the first on-off valve 71, the second on-off valve 72, and the seventh on-off valve 78 are opened and the booster pump 112a is activated (FP (Fuel processor) purge process for the hydrogen generator 102)) (step S520).

Thereby, the material gas (purge gas) is supplied from the material gas supplier 112 to the hydrogen generator 102, purges a gas such as steam remaining in reactors such as the reformer 16 provided within the hydrogen generator 102, and exhausts the gas from the hydrogen generator 102 to the burner 102a. The gas exhausted to the burner 102a is combusted therein (step S521). This FP purge process can suppress the steam from condensing into water which would degrade catalysts such as a reforming catalyst. The FP purge temperature is defined as a temperature at which no carbon is deposited from the material gas within the reformer 16 in view of addition of a temperature increase in the reformer 16, which results from the combustion operation in the burner 102a in the FP purge process for the hydrogen generator 102.

A time T3 which lapses after the FP process starts is measured (step S522). When the lapse time T3 reaches a time which is not less than a FP purge time J3 (step S523), the booster pump 112a is stopped, and the first on-off valve 71, the second on-off valve 72 and the seventh on-off valve 78 are closed (FP purge process terminates) (step S524). The FP purge time is defined as a time required to purge the steam from at least the hydrogen generator 102.

Thus, in the case where the fuel cell system 100 according to Embodiment 8 shifts to the shut-down operation in a normal state, the fuel cell system 100 is configured to execute a shut-down process (e.g., cathode purge process in the shut-down process of the fuel cell system 100) which protects at least the function of the fuel cell system 100, and quickly shift to the stand-by mode. In addition, the fuel cell system 100 is configured to execute the minimum and necessary cooling operation such as the exhaust heat recovery operation, until the hydrogen generator 102 reaches a temperature condition in which the hydrogen generator 102 can re-start-up (i.e., the temperature of the reformer 16 reaches the temperature which is not higher than the stand-by temperature). Therefore, the fuel cell system 100 can shift to the stand-by mode quickly. Also, in the next start-up process, the temperatures of the components such as the fuel cell 101 are higher than ambient temperature (outside temperature) depending on the time which lapses after the fuel cell system 100 shifts to the stand-by mode, an energy required to raise the temperature of the fuel cell 101 is reduced, a time required for the start-up process is reduced, and the start-up of the fuel cell system 100 is further facilitated.

In the normal shut-down process of the fuel cell system 100 of Embodiment 8, the cooling operation of the hydrogen generator 102, the FP purge process, the cathode purge process of the fuel cell 101, and the exhaust heat recovery operation of the fuel cell 101 are performed, but the present invention is not limited to this. For example, at least one of the cooling operation of the hydrogen generator (reformer), the FP purge process, the cathode purge process of the fuel cell, and the exhaust heat recovery operation of the fuel cell may be omitted, or otherwise, the cooling operation of the hydrogen generator (reformer) and the exhaust heat recovery operation of the fuel cell may be stopped at timings which are different from the timings in the above described flow.

Next, a step of detecting an abnormality based on the detected values of the detectors 140 to 145 of the fuel cell system 100 according to Embodiment 8 and the following shut-down process (hereinafter referred to as abnormality detection/shut-down process) will be described.

In particular, the abnormality which is associated with the hydrogen generator 102 and is followed by the shut-down of the operation of the fuel cell system 100, among the abnormalities detected by the abnormality detector in the fuel cell system 100 according to Embodiment 8, are abnormalities as shown in FIG. 4, like Embodiment 2.

Then, abnormality detection in the fuel cell system 100 of Embodiment 8 and the following shut-down process (abnormality detection/shut-down process) will be described with reference to FIG. 16.

Figure 16:
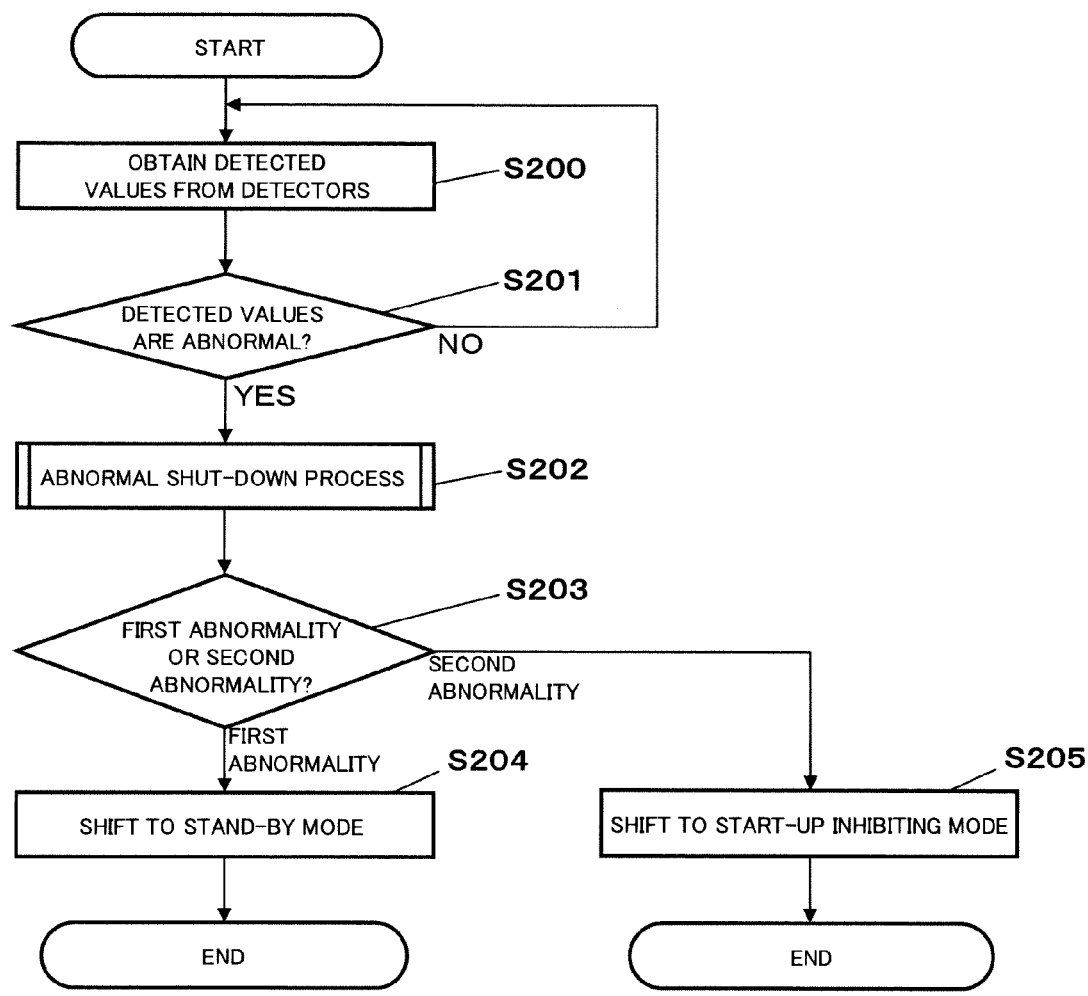
FIG. 16 is a flowchart schematically showing a content of an abnormality detection/shut-down process program stored in a memory section of a controller in the fuel cell system of FIG. 12.

FIG. 16 is a flowchart schematically showing a content of an abnormality detection/shut-down process program stored in the memory section of the controller 110 in the fuel cell system 100 of FIG. 12. The flow is similar to that of the abnormality detection/shut-down program (see FIG. 5) in the hydrogen generator 102 of Embodiment 2.

Initially, during the power generation operation of the fuel cell system 100, the calculation section of the controller 110 obtains the detected values from the detectors 140 to 145 (step S200) and determines whether or not the detected values obtained in step S200 are abnormal (step S201). If it is determined that the detected values are not abnormal, the process returns to step S200, and step S200 and step S201 are repeated to monitor the presence/absence of abnormality unless any abnormality is detected. On the other hand, if it is determined that any one of the detected values is abnormal, the process goes to step S202.

In step S202, the shut-down process (hereinafter referred to as abnormal shut-down process) corresponding to the abnormality determined by the abnormality determiner 110*a* is carried out under control of the controller 110. After the shut-down process terminates, the process goes to step S203.

In step S203, if the abnormality determined by the abnormality determiner 110*a* is the first abnormality, the process goes to step S204, whereas if the abnormality determined by the abnormality determiner 110*a* is the second abnormality, the process goes to step S205.

In step S204, the hydrogen generator 102 shifts to the stand-by mode when the abnormal shut-down process completes, and the program ends. On the other hand, in step S205, the fuel cell system 100 shifts to a start-up inhibiting mode in which the start-up is not permitted even if a start-up request is generated, and the program ends. The same shut-down process is not performed for each abnormality but a predetermined restoration process corresponding to each abnormality is carried out. It should be noted that the cooling operation common to the respective abnormalities (cooling operation of the hydrogen generator 102, exhaust heat recovery operation of the fuel cell 101, etc.) is carried out.

Figure 17:
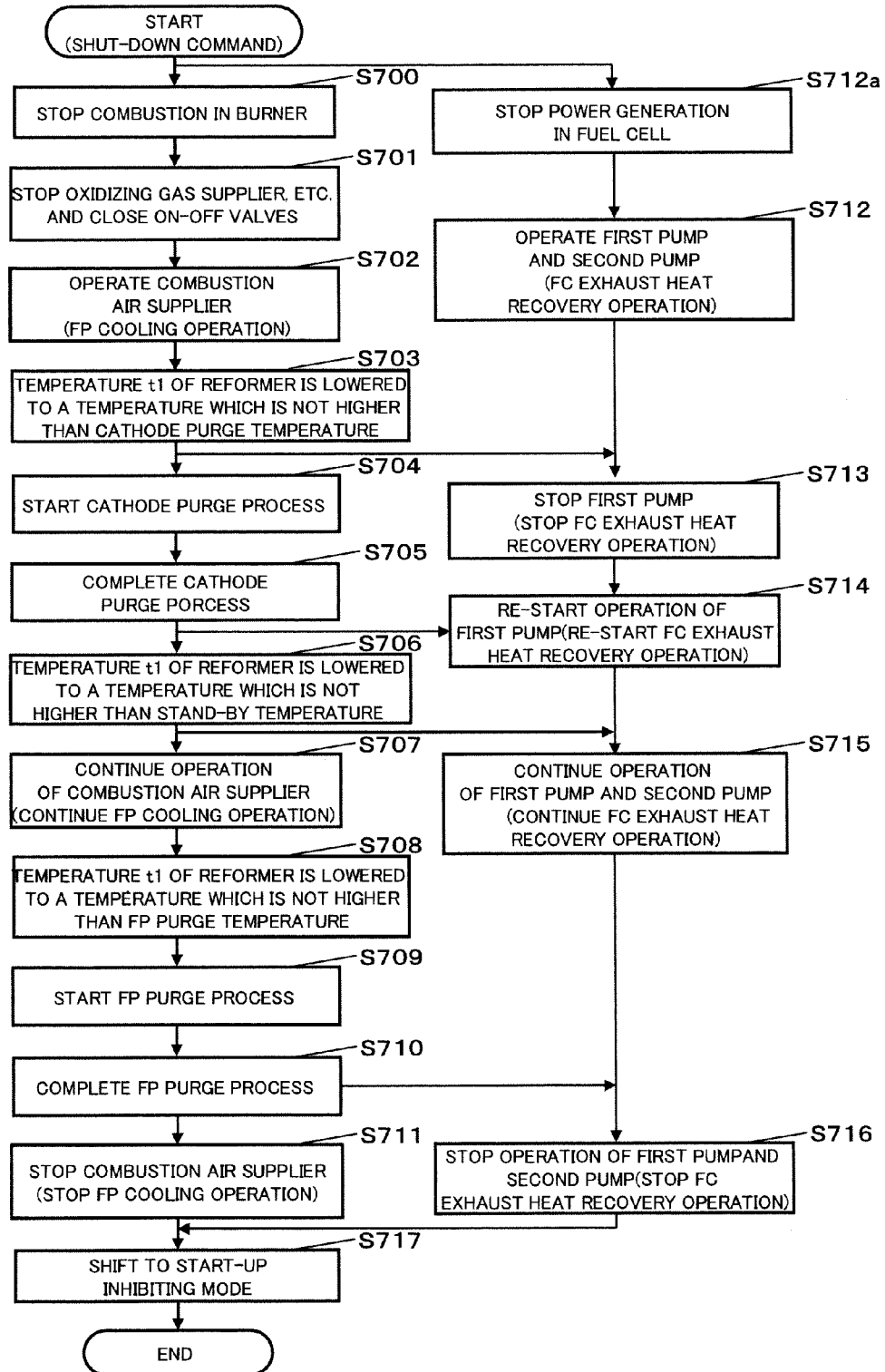
FIG. 17 is a flowchart showing in more detail the abnormal shut-down process in the flowchart of the shut-down process program of FIG. 16, which is associated with abnormality detection.

Now, the abnormal shut-down process in a case where the failure of the temperature detector 137 occurs, which is an example of the abnormality which is followed by the shut-down of the fuel cell system 100, will be described with reference to FIG. 17. FIG. 17 is a flowchart showing in detail the abnormal shut-down process in the flowchart of the shut-down process program of FIG. 16, which is associated with the abnormality detection. Although the failure of the temperature detector 137 belongs to the second abnormality, the following abnormal shut-down process is carried out in such a manner that the exhaust heat recovery operation of the fuel cell 101 and the cooling operation of the hydrogen generator 102 are performed in the same manner when an abnormality which requires the shut-down of the operation of the fuel cell 101 is detected as well as when the second abnormality is detected. In other words, the cooling operation of the fuel cell system 100 is performed in the same manner when the first abnormality is detected.

As shown in FIG. 17, when the detected value of the temperature detector is the value indicating the short-circuit or disconnection and the abnormality determiner 110*a* determines that this is the abnormality, the supply of the material gas and the supply of the water are stopped and the sealing operation (step S100, S101 in FIG. 3) of the hydrogen generator 102 is performed in the shut-down operation of the hydrogen generator 102. Thus, the combustion operation of the burner 102*a* is stopped (step S700). The fuel cell 101 stops power generation (step S712). After stop of the power generation, the first pump 107 and the second pump 108 are operated to perform the exhaust heat recovery operation for recovering the heat remaining in the fuel cell 101 (step S712). In the shut-down operation of the fuel cell 101, the oxidizing gas supplier 103 or the like are stopped and the on-off valves are closed (see steps S500 to S504 in step S14A) (step S701). Thereby, in the burner 102*a* of the hydrogen generator 102, the combustion of the fuel gas and the combustion air stops, and the power generation of the fuel cell 101 stops.

After stop of the combustion in the burner 102*a*, the cooling operation of the hydrogen generator 102 is performed using the air supplied from the combustion air supplier 117 (step S702). When the temperature t1 detected by the temperature detector 143 attached to the reformer 16 of the hydrogen generator 102 reaches a temperature which is not higher than the cathode purge temperature (S703), the cathode purge process in the shut-down process is performed (see step S506 to step S513 in FIGS. 14A and 14B) (step S704). At this time, the controller 110 stops the operation of the first pump 107 to stop the exhaust heat recovery operation of the fuel cell 101 (step S713).

When the cathode purge process in the shut-down process completes (step S705) and the combustion operation of the burner 102*a* completes, the controller 110 resumes the operation of the first pump 107, and resumes the exhaust heat recovery operation of the fuel cell 101 (step S714). Then, even when the temperature t1 detected by the temperature detector 143 has decreased to the temperature which is not higher than the stand-by temperature (step S706), the controller 110 causes the combustion air supplier 117 to continue the operation (step S707) and causes the first pump 107 and the second pump 108 to continue the operation (step S715) unlike in the normal shut-down process.

Then, when the temperature t1 of the reformer 16 which is detected by the temperature detector 143 reaches a temperature which is not higher than a FP purge temperature (step S708), a FP purge process (see step S103 to S112 in FIG. 3) is performed (step S709). Thereafter, when the FP purge process terminates (step S710), the controller 110 stops the operation of the combustion air supplier 117, the operation of the first pump 107 and the operation of the second pump 108 (step S711, step S716) and terminates the abnormal shut-down process. The controller 110 causes the fuel cell system 100 to shift to the start-up inhibiting mode (step S717). The phrase "the fuel cell system 100 shifts to the start-up inhibiting mode" means that the calculation section of the controller 110 does not permit the fuel cell system 100 to start-up and places the fuel cell system 100 in a state where the fuel cell system 100 does not perform the start-up process, even if the user operates the remote control device 120 to enter a start-up command to start the operation of the fuel cell system 100. In Embodiment 8, the controller 110 is configured not to permit the fuel cell system 100 to perform the start-up process, even when the user or the like operates the key operation section 120b of the remote control device 120 to send a start-up command to the communication section of the controller 110. To be more specific, in Embodiment 8, the controller 110 is configured not to permit the fuel cell system 100 to perform the start-up process, even when the user operates by mistake, the key operation section 120b of the remote control device 120 to send a start-up command to the communication section of the controller 110. In the cooling operation of the hydrogen generator 102 in the abnormal shut-down process, the amount of combustion air supplied to the burner 102a is desirably controlled to be more than the amount of combustion air supplied to the burner 102a during a rated operation of the hydrogen generator 102. To be specific, in the cooling operation of the hydrogen generator 102 in the abnormal shut-down process, the controller 110 causes the operation amount to be larger than the operation amount during the rated operation of the hydrogen generator 102. This makes it possible to quickly lower the temperature of the hydrogen generator 102 which is a component constituting the fuel cell system 100, thereby facilitating shifting to the maintenance operation. As defined herein, the rated operation of the fuel cell system 100 refers to an operation in which the fuel cell system 100 is supplying hydrogen with a maximum possible amount stably during a hydrogen supply operation of the fuel cell system 100.

Although in the abnormal shut-down process of the fuel cell system 100 of Embodiment 8, the cathode purge process is performed, it may be omitted. Although in the abnormal shut-down process of the fuel cell system 100 of Embodiment 8, the cooling operation of the hydrogen generator 102 (reformer 16) and the exhaust heat recovery operation of the fuel cell 101 are carried out, the cooling operation of the hydrogen generator (reformer 16) and the exhaust heat recovery operation of the fuel cell may be stopped at timings which are different from the timings in the above described flow shown in FIG. 17 so long the hydrogen generator (reformer 16) is cooled with a higher rate in the abnormal shut-down process than in the normal shut-down process.

Figure 18:
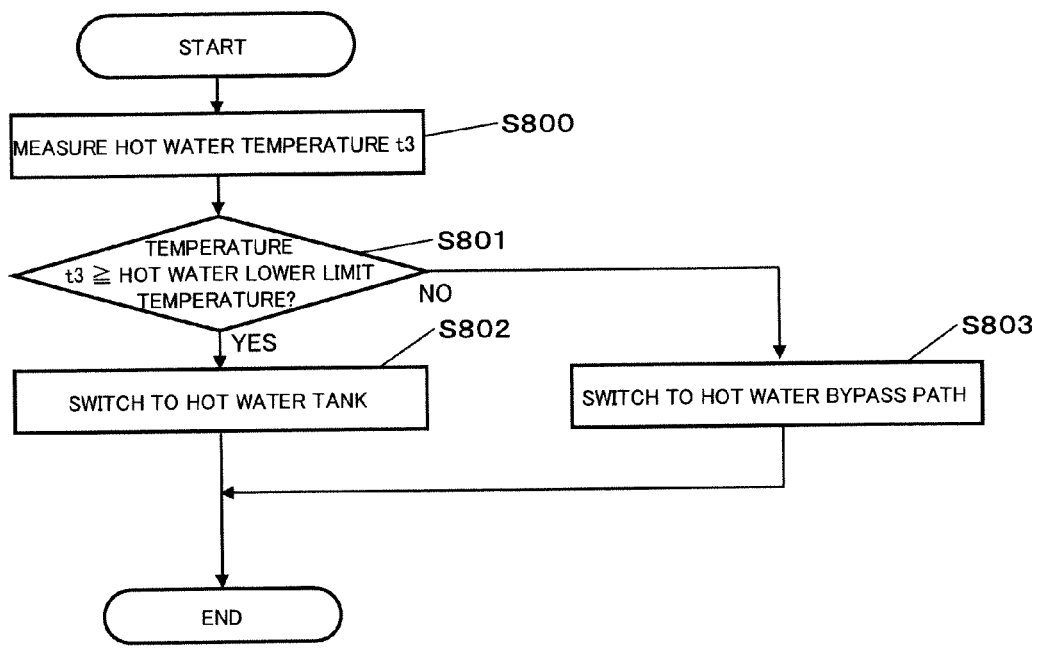
FIG. 18 is a flowchart showing a schematic content of hot water control in the fuel cell system according to Embodiment 8 of the present invention.

In the exhaust heat recovery operation of the fuel cell 101 in the normal shut-down process and the abnormal shut-down process, control for the hot water temperature shown in FIG. 18 is performed concurrently with the exhaust heat recovery operation. FIG. 18 is a flowchart showing a schematic content of the hot water control in the fuel cell system 100 according to Embodiment 8 of the present invention.

The control for the hot water temperature is directed to storing hot water with a hot water lower limit temperature (e.g., 60 degrees C.) or higher in the hot water storage tank 109. To be specific, as shown in FIG. 18, the temperature detector 146 detects temperature t3 of the hot water which has flowed through the heat exchanger 106 (step S800). If the temperature t3 of the hot water is not lower than the hot water lower limit temperature (Yes in step S801), the controller 110 controls the switch 206 so that the hot water flows into the hot water storage tank 109 (step S802). On the other hand, if the temperature t3 of the hot water is lower than the hot water lower limit temperature (No in step S801), the controller 110 controls the switch 206 so that the hot water flows to the hot water bypass path 207 (step S803).

Now, comparison between the abnormal shut-down process and the normal shut-down process will be described. In the abnormal shut-down process, in a time period from when the temperature of the reformer has 16 has reached a temperature which is not higher than the stand-by temperature until it reaches a temperature (FP purge temperature or lower), at which the FP purge process can be performed, the combustion air supplier 117 performs the cooling operation of the hydrogen generator 102 and the first pump 107 and the second pump 108 perform the exhaust heat recovery operation of the fuel cell 101, to more quickly cool the hydrogen generator 102 and the fuel cell 101, instead of waiting for the hydrogen generator 102 to be naturally cooled like the normal shut-down process.

For this reason, in the fuel cell system 100 according to Embodiment 8, the abnormal shut-down process is performed in such a manner that the fuel cell 101 and the hydrogen generator 102 are cooled with a higher rate in the abnormal shut-down process than in the normal shut-down process. Therefore, the temperatures of the components within the fuel cell system 100 are more quickly lowered to temperatures at which the maintenance operator will not get burnt, etc., thereby enabling the maintenance operator to start the maintenance operation at an earlier time.

Although in Embodiment 8, the combustion air supplier 117 performs the cooling operation of the hydrogen generator 102 (reformer 16) for a longer time and the first pump 107 and the second pump 108 perform the exhaust heat recovery operation of the fuel cell 101 for a longer time to cool the fuel cell 101 and the hydrogen generator 102 (reformer 16) with a higher rate, in the abnormal shut-down process than in the normal shut-down process, the present invention is not limited to this, but at least one of the amount of combustion air supplied to the burner 102a, and the flow rate of at least one of cooling water and the amount of hot water flowing through the heat exchanger 106 may be set larger. To be specific, the operation amount of the combustion air supplier 117 may be set larger than the operation amount in the cooling operation of the hydrogen generator 102 in the normal shut-down process, and the operation amount of at least one of the first pump 107 and the second pump 108 may be set larger than that in the exhaust heat recovery operation of the fuel cell 100 in the normal shut-down process.

Although the operation amount of the first pump 107 and the operation amount of the second pump 108 may be set larger than that in the exhaust heat recovery operation of the fuel cell 100 in the normal shut-down process to increase the amount of the cooling water and the amount of the hot water flowing through the heat exchanger 106, the present invention is not limited to this. For example, as shown in FIG. 13, when the first flow control device includes the first pump 107 and the flow control device (e.g., mixing valve 209) for controlling the flow rate of the cooling water which has flowed through the fuel cell 101 and then flows into the heat exchanger bypass path 208 or into the heat exchanger 106, the mixing valve 209 may be controlled to increase the flow rate of cooling water flowing to the heat exchanger 106. In this case, the controller 110 controls the first pump 107 to maintain or increase the operation amount of the first pump 107, as well as the control for the mixing valve 209.

In the fuel cell system 100 of Embodiment 8, the abnormal shut-down process is performed in such a manner that the fuel cell 101 and the hydrogen generator 102 are cooled with a higher rate than in the normal shut-down process, when the abnormality which requires shut-down of the power generation operation of the fuel cell system is detected as well as when the first abnormality is detected or the second abnormality is detected. However, in the abnormal shut-down process performed when the first abnormality which does not require the maintenance operation after the shut-down process completes is detected, the exhaust heat recovery operation of the fuel cell 101 and the cooling operation of the hydrogen generator 102 which are similar to those in the normal shut-down process may be performed. Thereby, in the abnormal shut-down process performed in the case where the first abnormality is detected, the exhaust heat recovery operation of the fuel cell 101 and the cooling operation of the hydrogen generator 102 for facilitating shifting to the maintenance operation are not performed. Therefore, at next start-up, an energy required to raise the temperature of the components (e.g., hydrogen generator 102, the fuel cell 101, etc.) constituting the fuel cell system 100 is reduced. As a result, the start-up of the fuel cell system 100 is facilitated.

Embodiment 9

A fuel cell system according to Embodiment 9 of the present invention includes, a first heat medium path through which a first heat medium for cooling the fuel cell flows, and a first flow control device for controlling the flow rate of the first heat medium in the first heat medium path, and a controller is configured to control the combustion air supplier to increase the cooling rate of the reformer in the abnormal shut-down process executed after the abnormality detector detects an abnormality associated with the hydrogen generator, than in the normal shut-down process, and controls the first flow control device so that the fuel cell is cooled with a rate substantially equal to the rate of cooling in the normal shut-down process, in the abnormal shut-down process executed after the abnormality detector detects an abnormality associated with the hydrogen generator.

As used herein, "abnormality associated with hydrogen generator" refers to abnormalities associated with components constituting the hydrogen generator. For example, there are an abnormality of a material gas flow rate, a temperature abnormality of the reformer, a combustion abnormality of a burner, etc. As used herein, "abnormality which is associated with the fuel cell and is other than the abnormality associated with hydrogen generator" refers to abnormalities of the components associated with the power generation operation of the fuel cell other than the hydrogen generator. For example, there are a cooling water temperature abnormality, an oxidizing gas flow rate abnormality, a water level abnormality of a cooling water tank, a water level abnormality of a condensed water tank, etc.

The fuel cell system 100 according to Embodiment 9 of the present invention has a configuration which is basically identical to that of the fuel cell system 100 of Embodiment 8 but is different from the same in the shut-down process after detecting the abnormality based on the values detected by the detectors 140 to 145 (i.e., when abnormality associated with the hydrogen generator 102 is detected). To be specific, the controller 110 performs the cooling operation of the hydrogen generator 102 like the cooling operation in the abnormal shut-down process of the fuel cell system 100 of Embodiment 8 but performs the exhaust heat recovery operation of the fuel cell 101 like that in the normal shut-down process. Hereinafter, this will be described with reference to FIG. 19.

Figure 19:
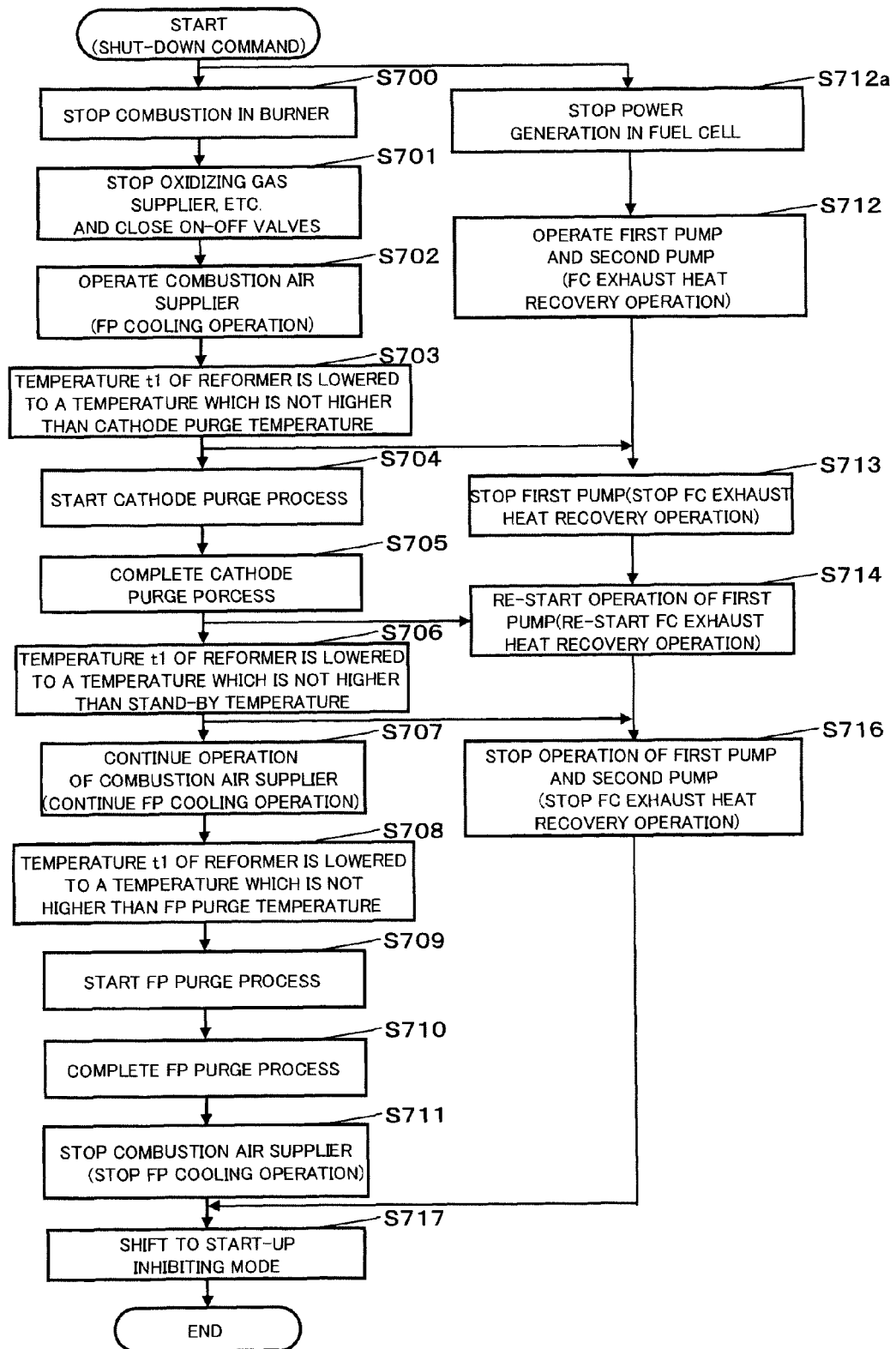
FIG. 19 is a flowchart showing in detail an abnormal shut-down process in a fuel cell system according to Embodiment 9.

FIG. 19 is a flowchart showing in detail an abnormal shut-down process in the fuel cell system 100 according to Embodiment 9.

As shown in FIG. 19, when the abnormality determiner 110a determines that there is an abnormality which is associated with the hydrogen generator 102 and is followed by the shut-down of the fuel cell system 100, the shut-down operation of the hydrogen generator 102 and the shut-down operation of the fuel cell 102 are performed like the fuel cell system 100 according to Embodiment 8 (step S700 to step S702). In this case, after stop of the combustion in the burner 102a, the cooling operation of the hydrogen generator 102 is carried out using the air supplied from the combustion air supplier 117 (step S703). Also, after stop of the power generation of the fuel cell 102, the first pump 107 and the second pump 108 are operated to perform the exhaust heat recovery operation of the fuel cell 101 (step S712).

When the temperature t1 detected by the temperature detector 143 attached to the reformer 16 of the hydrogen generator 102 reaches a temperature which is not higher than the cathode purge temperature (step S703), the cathode purge process in the shut-down process starts (step S704). In this case, the controller 110 stops the operation of the first pump 107 and stops the exhaust heat recovery operation of the fuel cell 101 (step S713).

When the cathode purge process in the shut-down process completes (step S705) and the combustion operation of the burner 102a completes, the controller 110 resumes the operation of the first pump 107, and resumes the exhaust heat recovery operation of the fuel cell 101. Then, even when the temperature t1 detected by the temperature detector 143 has decreased to the temperature which is not higher than the stand-by temperature (step S706), the controller 110 causes the combustion air supplier 117 to continue the operation (step S707).

When the temperature t1 of the reformer 16 has decreased to a temperature which is not higher than the stand-by temperature, the operation of the first pump 107 and the second pump 108 is stopped (step S716). That is, the exhaust heat recovery operation of the fuel cell 101 is stopped.

Then, when the temperature t1 of the reformer 16 which is detected by the temperature detector 143 has decreased a temperature which is not higher than a FP purge temperature (step S708), a FP purge process is performed (step S709, step S710), stops the operation of the combustion air supplier 117 (step S711), and causes the fuel cell system 100 to shift to the start-up inhibiting mode (step S717). Although in the above flow, the cathode purge process is executed, it may be omitted. In addition, although the exhaust heat recovery operation of the fuel cell 101 continues until the temperature of the reformer 101 has decreased to a temperature which is not higher than the stand-by temperature, the present invention is not limited to this so long as the cooling rate of the fuel cell 101 after shut-down of power generation is set substantially equal to that of the normal shut-down process. Further, although the cooling operation of the hydrogen generator 102 (reformer 16) continues until the FP purge completes, the present invention is not limited to this so long as the cooling rate is set higher than in the normal shut-down process.

In brief, the fuel cell system 100 of Embodiment 9 is different from the fuel cell system 100 of Embodiment 8 in that in the abnormal shut-down process followed by abnormality detection of the hydrogen generator, the first pump 107 and the second pump 108 are stopped to stop the exhaust heat recovery operation of the fuel cell 101 when the cooling rate becomes substantially equal to that in the normal shut-down process.

Thus, in the fuel cell system 100 according to Embodiment 9, the abnormal shut-down process is performed in such a manner that the hydrogen generator 102 (reformer 16) is cooled with a higher rate in the abnormal shut-down process than in the normal shut-down process. Therefore, the temperatures of the components within the hydrogen generator 102 are more quickly lowered to temperatures at which the maintenance operator will not get burnt, etc., thereby enabling the maintenance operator to start the maintenance operation at an earlier time. In the fuel cell 101 of the fuel cell system 100, the first pump 107 and the second pump 108 are controlled so that the fuel cell is cooled with a rate substantially equal to that in the normal shut-down process, and the cooling rate of the fuel cell 101 which does not require maintenance operation is suppressed. This lessens an energy consumed in the operation of the first pump and the second pump.

Embodiment 10

A fuel cell system according to Embodiment 10 of the present invention includes, a first heat medium path through which a first heat medium for cooling the fuel cell flows, and a first flow control device for controlling the flow rate of the first heat medium in the first heat medium path, and a controller is configured to control the first flow control device so that the fuel cell is cooled with a higher rate than in the normal shut-down process, and controls the combustion air supplier so that the reformer is cooled with a lower rate than in the abnormal shut-down process, when the abnormality detector detects abnormality which is associated with the fuel cell and is other than the abnormality associated with hydrogen generator.

As used herein, "abnormality which is associated with the fuel cell and is other than the abnormality associated with hydrogen generator" refers to abnormalities of the components associated with the power generation operation of the fuel cell other than the hydrogen generator. For example, there are a cooling water temperature abnormality, an oxidizing gas flow rate abnormality, a water level abnormality of a cooling water tank, a water level abnormality of a condensed water tank, etc.

The fuel cell system 100 according to Embodiment 10 of the present invention has a configuration which is basically identical to that of the fuel cell system 100 of Embodiment 8 but is different from the same in the shut-down process after detecting the abnormality based on the values detected by the detectors 131 to 140 (detecting abnormality which is associated with the fuel cell 101 and is other than the abnormality associated with hydrogen generator 102). To be specific, the controller 110 performs the exhaust heat recovery operation of the fuel cell 101 like the exhaust heat recovery operation in the abnormal shut-down process of the fuel cell system 100 of Embodiment 8 but performs the cooling operation of the hydrogen generator 102 at a cooling rate substantially equal to a cooling rate in the normal shut-down process.

Initially, among the abnormalities detected by the abnormality detector in the fuel cell system 100 of Embodiment 10, abnormality which is associated with the fuel cell system 100 is other than the abnormality associated with hydrogen generator 102 and is followed by the shut-down of the operation of the fuel cell system 100 will be described with reference to FIG. 20. FIG. 20 is a table showing examples of abnormality which is followed by the shut-down of the operation of the fuel cell system 100 of the present invention.

In the present invention, the abnormality which is followed by the shut-down of the operation of the fuel cell system 100 is defined to include a first abnormality which is associated with the fuel cell 101 and is other than the abnormality associated with hydrogen generator 102 (hereinafter in this embodiment, referred to as first abnormality) and a second abnormality which is associated with the fuel cell 101 and is other than the abnormality associated with hydrogen generator 102 (hereinafter in this embodiment, referred to as second abnormality). In other words, the abnormality which is followed by the shut-down of the operation of the fuel cell system 100 may be defined to include abnormalities other than the first abnormality and the second abnormality.

As used herein, the first abnormality refers to an abnormality in a case where a predetermined shut-down process corresponding to the abnormality detected by each of the detectors 131 to 140 is performed, and the fuel cell system shifts to the stand-by mode without maintenance operator's maintenance operation.

As used herein, the second abnormality refers to an abnormality in a case where a predetermined shut-down process corresponding to the abnormality determined by the abnormality determiner 110a based on the detected values of the detectors 131 to 140 is performed, and the fuel cell system cannot shift to the stand-by mode unless the maintenance operator performs the maintenance operation. In other words, the second abnormality refers to an abnormality in a case where, even if the shut-down process completes after the abnormality is detected by each of the detectors 131 to 140, the start-up is not permitted, the controller 110 does not output a start-up command irrespective of generation of a start-up request, and therefore, the fuel cell system does not start the start-up process, unless the maintenance operator performs the maintenance operation. As used herein, the maintenance operation refers to an operation in which the maintenance operator comes to a place where the fuel cell system 100 is installed and performs an abnormality restoration operation or repair of the fuel cell system 100.

As shown in FIG. 20, in this embodiment, the first abnormality is a cooling water temperature abnormality and a first pump abnormality. It should be noted that these abnormalities are merely exemplary and a part of these abnormalities may be the first abnormality, or otherwise abnormalities other than these abnormalities may be the first abnormality.

The cooling water temperature abnormality refers to an abnormality in a case where the temperature detector (in this embodiment, temperature detector 137 configured to detect a temperature of cooling water discharged from the downstream end of the cooling water passage 101c to the cooling water discharge path 52) detects the temperature of the cooling water supplied from the cooling water supply path 51 to the upstream end of the cooling water passage 101c of the fuel cell 101 or the temperature of cooling water discharged from the downstream end of the cooling water passage 101c to the cooling water discharge path 52, and the detected temperature is a temperature having increased or decreased excessively.

The first pump abnormality refers to a fact that the first pump 107 is not operating correctly. For example, in a case where trash enters the first pump 107, the first pump 107 is operating with an operation amount lower limit of the first pump 107 or lower but a rotation detector (not shown) configured to detect the operation of the first pump 107 does not output a pulse output associated with the rotation or reciprocation of the pump for a predetermined time, i.e., does not detect the operation of the pump for the predetermined time, the controller 110 outputs a signal for increasing the operation amount of the first pump 107. If a pulse is not output even though this signal is supplied to the first pump 107, the controller 110 determines that there is an abnormality in the first pump 107 and determines it as the abnormality followed by the shut-down of the operation of the fuel cell system 100. The reason why this abnormality is regarded as the first abnormality is that this abnormality is not a fatal abnormality which requires maintenance operation for replacing the first pump 107 or the like but may possibly be an abnormality which can be restored by performing a predetermined restoration process to remove trash or the like. It should be noted that if, for example, the same first abnormality is detected several times (e.g., three times)/per week or twice in succession, the controller 110 may determine in some cases that this abnormality is the second abnormality.

As shown in FIG. 20, in this embodiment, the second abnormality includes abnormalities of components (e.g., failure of a cooling water tank water level detector, failure of a condensed water tank water level detector, failure of a flow detector, failure of the temperature detector attached to the cooling water path, failure of a voltage transformer, failure of a ventilation fan), gas leakage abnormalities (e.g., gas leakage abnormality of a fuel gas passage, gas leakage abnormality of an oxidizing gas passage, combustible gas leakage abnormality), and a temperature increase abnormality of the controller. It should be noted that these abnormalities are merely exemplary and a part of these abnormalities may be the second abnormality, or otherwise abnormalities other than these abnormalities may be the second abnormality.

The abnormality with which the failure of the cooling water tank water level detector is assumed is, for example, an abnormality in a case where the water level of the cooling water tank 104 which is detected by the water level detector 136 does not reach a value which is not more than a predetermined threshold after a lapse of an abnormality determination time, even though water is drained from the cooling water tank 104. This abnormality may possibly occur if a float of a float-type water level sensor is immobilized at the upper side. Therefore, the controller 110 determines this abnormality is an abnormality with which failure of the water level detector 136 is assumed and determines this abnormality as the second abnormality.

The abnormality with which the failure of the condensed water tank water level detector is assumed is, for example, an abnormality in a case where the water level of the condensed water tank 105A which is detected by the water level detector 135 does not reach a value which is not more than a predetermined threshold after a lapse of an abnormality determination time, even though water is drained from the condensed water tank 105A. This abnormality may possibly occur if a float of a float-type water level sensor is immobilized at the upper side. Therefore, the controller 110 determines this abnormality is an abnormality with which failure of the water level detector 136 is assumed and determines this abnormality as the second abnormality.

Examples of the abnormality with which failure of the flow detector is assumed are an abnormality in which the flow rate of the oxidizing gas which is detected by the second flow detector 134 is outside an allowable range (e.g., a predetermined threshold or lower) with respect to the operation amount of the oxidizing gas supplier 103 and an abnormality in which the flow rate detected by the third flow detector 138 is outside an allowable range (e.g., a predetermined threshold or lower) with respect to the operation amount of the first pump 107. This abnormality may possibly occur when the flow detector is clogged with trash. Therefore, the controller 110 determines this abnormality as the abnormality with which failure of the flow detector is assumed and determines this abnormality as second abnormality.

The abnormality with which the failure of the voltage transformer (inverter 118) is assumed, is for example, an abnormality in a case where the temperature of a control board or the like of the controller 110 which is detected by the temperature detector 139 is outside an allowable range (e.g., predetermined threshold or higher). This abnormality may possibly occur when a short-circuit occurs within a circuit of the voltage transformer. The controller 110 determines this abnormality as the abnormality with which failure of the voltage transformer is assumed and determines this abnormality as the second abnormality.

The abnormality with which the failure of the temperature detector attached to the cooling water path is assumed is, for example, an abnormality in a case where detected values indicate a short-circuit or disconnection, when the temperature detectors 137 and 141 are thermistors. The controller 110 determines this abnormality as the second abnormality.

The gas leakage abnormality of the fuel gas passage is, for example, an abnormality in a case where, in a state where the third port 73c of the first switch 73 and the fourth on-off valve 75 are closed, and the fuel gas is sealed in the second fuel gas supply path 42b, the fuel gas passage 101a, and the off-fuel-gas path 43 in a period from when the shut-down process of the fuel cell system 100 has been performed until power generation of the fuel cell system 100 starts, as described above, the pressure in the sealed fuel gas path which is detected by the first pressure detector 131 is not more than a predetermined threshold. This abnormality may possibly occur when, for example, the fuel cell 101 is damaged and the fuel gas leaks from the fuel gas passage 101a, or the first switch 73 and/or the fourth on-off valve 75 is/are damaged and cannot seal the fuel gas. In these cases, it is difficult to continue the operation even when the operation of the fuel cell system 100 resumes after the shut-down of the fuel cell system 100. Therefore, the controller 110 determines this abnormality as the second abnormality.

The gas leakage abnormality of the oxidizing gas passage is, for example, an abnormality in a case where, in a state where the third on-off valve 74 and the fifth on-off valve 76 are closed and the material gas is confined in the purge gas passage in a period from when the shut-down process of the fuel cell system 100 has been performed until power generation of the fuel cell system 100 starts, the pressure in the sealed oxidizing gas path which is detected by the second pressure detector 133 is a value which is not more than a predetermined threshold. This abnormality may possibly occur when, for example, the fuel cell 101 is damaged and the material gas leaks from the oxidizing gas passage 101b, or the third on-off 74 and/or the fifth on-off valve 76 is/are damaged and cannot seal the material gas. In these cases, it is difficult to continue the operation even when the operation of the fuel cell system 100 resumes after the shut-down of the fuel cell system 100. Therefore, the controller 110 determines this abnormality as the second abnormality.

The combustible gas concentration abnormality refers to an abnormality in a case where the combustible gas sensor 140 detects the combustible gas. For example, the combustible gas concentration abnormality occurs when the combustible gas leaks in the fuel cell system 100 (package 111) and the combustible gas sensor 140 detects the combustible gas. Therefore, the controller 110 determines this abnormality as the second abnormality.

The abnormality with which the failure of the ventilation fan is assumed is, for example, abnormality that after the controller 110 outputs an operation start signal of the ventilation fan 119, a rotation detector (not shown) for detecting the rotation number of the ventilation fan 116 cannot detect the rotation for a predetermined time or longer. This abnormality may possibly occur when the ventilation fan 119 is clogged with trash. The controller 110 determines that this abnormality is an abnormality with which the failure of the ventilation fan 119 is assumed, and determines this abnormality as the second abnormality.

The temperature increase abnormality of the controller 110 is, for example, an abnormality that the temperature of the control board or the like of the controller 110 which is detected by the temperature detector 139 is outside an allowable range (e.g., a predetermined threshold or lower). The controller 110 determines this abnormality as the second abnormality.

Figure 21:
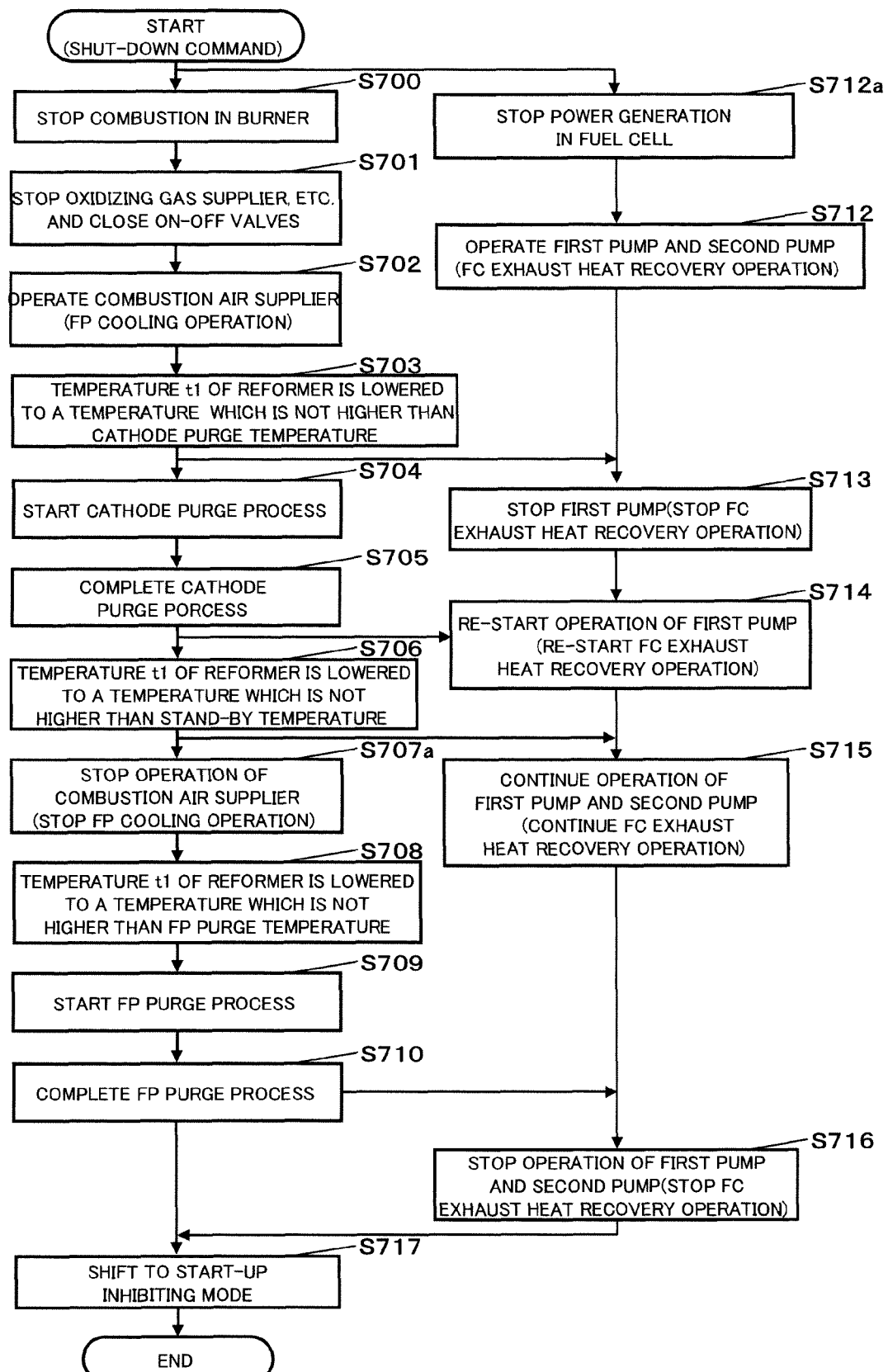
FIG. 21 is a flowchart showing in detail an abnormal shut-down process in a fuel cell system according to Embodiment 10.

For the failure of each detector among the above illustrated abnormalities, the abnormality determiner 110 operates as the abnormality detector of the present invention, while for the abnormalities different from the failures of the detectors, the abnormality determiner 110a and the detectors configured to output detected values used to determine the abnormalities operate as the abnormality detector of the present invention Next, the abnormal shut-down process executed in a case where the abnormality is detected based on the detected values of the detectors 131 to 140 in the fuel cell system 100 of Embodiment 10 will be described with reference to FIG. 21.

FIG. 12 is a view showing a schematic configuration of the fuel cell system 100 according to Embodiment 10 of the present invention.

As shown in FIG. 21, when the abnormality determiner 110a determines that there is an abnormality associated with the fuel cell system 100 and is other than the abnormalities of the hydrogen generator 102, the shut-down operation of the hydrogen generator 102 and the shut-down operation of the fuel cell 102 are performed similarly to the fuel cell system 100 of Embodiment 8 (step S700 to step S703). The power generation of the fuel cell 101 is stopped (step S712a). After stop of the power generation, the first pump 107 and the second pump 108 are operated to continue the exhaust heat recovery operation of the heat remaining in the fuel cell 101 (step S712).

When the temperature t1 detected by the temperature detector 143 attached to the reformer 16 of the hydrogen generator 102 reaches a temperature which is not higher than the cathode purge temperature (S703), the cathode purge process in the shut-down process is performed (step S704). At this time, the controller 110 stops the operation of the first pump 107 to stop the exhaust heat recovery operation of the fuel cell 101 (step S713).

When the cathode purge process in the shut-down process completes (step S705) and the combustion operation of the burner 102a completes, the controller 110 resumes the operation of the first pump 107 and resumes the exhaust heat recovery operation of the fuel cell 101 (step S714). Then, when the temperature t1 of the reformer 16 which is detected by the temperature detector 143 has decreased to the temperature which is not higher than the stand-by temperature (step S706), the operation of the combustion air supplier 117 is stopped (step S707a). That is, the cooling operation of the hydrogen generator 102 is stopped.

On the other hand, the operation of the first pump 107 and the operation of the second pump 108 are continued even after the temperature t1 of the reformer 16 has decreased to a temperature which is not higher than the stand-by temperature (step S715).

Then, when the temperature t1 of the reformer 16 which is detected by the temperature detector 143 reaches a temperature which is not higher than a FP purge temperature (step S708), a FP purge process is performed (step S709, step S710). Thereafter, when the FP purge process terminates, the operation of the first pump 107 and the operation of the second pump 108 are stopped (step S716). The fuel cell system 100 is caused to shift to the start-up inhibiting mode (step S717). Although in the above described flow, the cathode purge process is performed, it may be omitted. Although in the above described flow, the cooling operation of the reformer 101 is continued until the temperature of the reformer 16 reaches a temperature which is not higher than the stand-by temperature, the present invention is not limited to this so long as the reformer 101 is cooled with a rate substantially equal to that in the normal shut-down process after the stop of the combustion in the combustor. Further, although the exhaust heat recovery operation of the fuel cell 101 continues until the FP purge completes, the present invention is not limited to this so long as the exhaust heat recovery amount is set larger than in the normal shut-down process In brief, the fuel cell system 100 of Embodiment 10 is different from the fuel cell system 100 of Embodiment 8 in that in the abnormal shut-down process executed after detecting the abnormality which is associated with the fuel cell and is other than the abnormality associated with the hydrogen generator, the combustion air supplier 117 is stopped and the cooling operation of the hydrogen generator 102 is stopped, when cooling rate of the reformer 16 becomes substantially equal to that in the normal shut-down process.

As described above, in the fuel cell system 100 of Embodiment 10, the shut-down process is performed in such a manner that the fuel cell 101 is cooled with a higher rate in the abnormal shut-down process than in the normal shut-down process. Therefore, the temperatures of the components within the fuel cell system 100 for which the maintenance operation is performed are more quickly lowered to temperatures at which the maintenance operator will not get burnt, etc., thereby enabling the maintenance operator to start the maintenance operation at an earlier time. On the other hand, the combustion air supplier 117 is controlled so that the reformer 16 of the hydrogen generator 102 is cooled with a rate substantially equal to that in the normal shut-down process, thus suppressing the cooling rate of the hydrogen generator 102 which does not require the maintenance operation. As a result, an energy consumed by the operation of the combustion air supplier 117 is lessened.

In the normal shut-down process which does not require the maintenance operation, the same advantages as those in the fuel cell system 100 of Embodiment 8 are achieved.

Embodiment 11

A fuel cell system according to Embodiment 11 of the present invention is an example in which the controller controls the combustion air supplier and the first flow control device so that the hydrogen generator and the fuel cell are cooled with a rate substantially equal to that in the normal shut-down process in the abnormal shut-down process executed when the abnormality detector detects the first abnormality which is associated with the hydrogen generator and does not require the maintenance operation, while the controller controls the combustion air supplier so that the reformer is cooled with a higher rate than in the normal shut-down process and the fuel cell is cooled with a rate substantially equal to that in the normal shut-down process in the abnormal shut-down process executed when the abnormality detector detects the second abnormality which is associated with the hydrogen generator and requires the maintenance operation.

As used herein, "first abnormality associated with the hydrogen generator" refers to an abnormality which does not require maintenance, among abnormalities associated with the components in the hydrogen generator. As the first abnormality, there is a burner misfire abnormality. As used herein, "second abnormality associated with the hydrogen generator" refers to an abnormality which requires maintenance, among abnormalities associated with the components in the hydrogen generator. For example, as the second abnormality, there are failures of components (e.g., failure of temperature detector, failure of CO sensor), gas leakage abnormalities, etc.

The fuel cell system 100 according to Embodiment 11 of the present invention has a configuration which is basically identical to that of the fuel cell system 100 of Embodiment 8 but is different from the same in that the abnormality is detected (i.e., abnormality associated with the hydrogen generator 102 is detected) based on the values detected by the detectors 140 to 145 and the following shut-down process.

The abnormality detected by the abnormality detector in the fuel cell system 100 of Embodiment 11 (abnormality which is associated with the hydrogen generator 102 and is followed by the shut-down of the operation of the fuel cell system 100) is shown in FIG. 4, like Embodiment 8.

In Embodiment 11, the abnormality which is followed by the shut-down of the operation of the fuel cell system 100 is defined to include a first abnormality which is associated with the hydrogen generator 102 (hereinafter in this embodiment, referred to as first abnormality) and a second abnormality which is associated with the hydrogen generator 102 (hereinafter in this embodiment, referred to as second abnormality). In other words, the abnormality which is followed by the shut-down of the operation of the fuel cell system 100 may be defined to include abnormalities other than the first abnormality and the second abnormality.

As used herein, the first abnormality refers to an abnormality in a case where a predetermined shut-down process corresponding to the abnormality detected by each of the detectors 140 to 145 is performed, and the fuel cell system shifts to the stand-by mode without maintenance operator's maintenance operation.

As used herein, the second abnormality refers to an abnormality in a case where a predetermined shut-down process corresponding to the abnormality determined by the abnormality determiner 110a based on the detected values of the detectors 140 to 145 is performed, and the fuel cell system cannot shift to the stand-by mode unless the maintenance operator performs the maintenance operation. In other words, the second abnormality refers to an abnormality occurring in a case where, even if the shut-down process completes after the abnormality is detected by each of the detectors 140 to 145, the start-up is not permitted, the controller 110 does not output a start-up command irrespective of generation of a start-up request, and therefore, the fuel cell system does not start the start-up process, unless the maintenance operator performs the maintenance operation.

Next, the abnormality detection in the fuel cell system 100 of Embodiment 11 and the following shut-down (abnormality detection/shut-down process) will be described with reference to FIG. 22.

Figure 22:
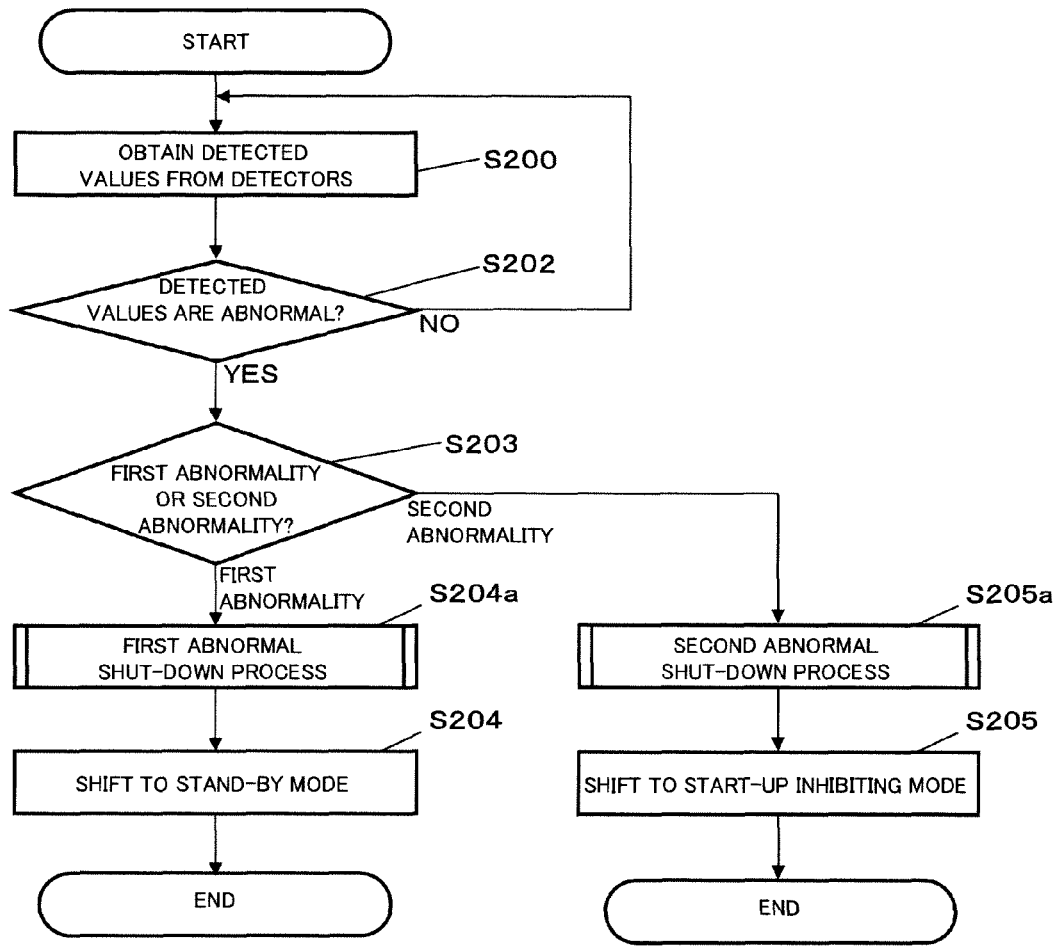
FIG. 22 is a flowchart schematically showing a content of an abnormality detection/shut-down process program stored in a memory section of a controller in the fuel cell system of FIG. 12.

FIG. 22 is a flowchart schematically showing a content of an abnormality detection/shut-down process program stored in a memory section of the controller 110 in the fuel cell system 100 of FIG. 12.

As shown in FIG. 22, initially, during the power generation operation of the fuel cell system 100, the calculation section of the controller 110 obtains the detected values from the detectors 140 to 145 (step S200) and determines whether or not the detected values obtained in step S200 are abnormal (step S201). If it is determined that the detected values are not abnormal, the process returns to step S200, and step S200 and step S201 are repeated to monitor the presence/absence of abnormality unless any abnormality is detected. On the other hand, if it is determined that any one of the detected values is abnormal, the process goes to step S203.

In step S203, if the abnormality determined by the abnormality determiner 110a is the first abnormality, the process goes to step S204a, whereas if the abnormality determined by the abnormality determiner 110a is the second abnormality, the process goes to step S205a.

In step S204a, the first abnormal shut-down process corresponding to each abnormality determined by the abnormality determiner 110a is carried out under control of the controller 110. When this shut-down process completes, the hydrogen generator 102 shifts to the stand-by mode (step S204) and the program ends. In the first abnormal shut-down process, the same shut-down process is not performed for each abnormality but a predetermined restoration process corresponding to each abnormality is carried out. It should be noted that the cooling operation common to the respective abnormalities (cooling operation of the hydrogen generator, exhaust heat recovery operation of the fuel cell, etc.,) is also carried out.

In step S205a, the second abnormal shut-down process corresponding to each abnormality determined by the abnormality determiner 110 is executed under control of the controller 110. When this shut-down process completes, the hydrogen generator 102 shifts to a start-up inhibiting mode in which the start-up is not permitted even if a start-up request is generated (step S205). In the second abnormal shut-down process, the same shut-down process is not performed for each abnormality but a predetermined restoration process corresponding to each abnormality is carried out. It should be noted that the cooling operation common to the respective abnormalities (cooling operation of the hydrogen generator, exhaust heat recovery operation of the fuel cell, etc.,) is also carried out.

Figure 23:
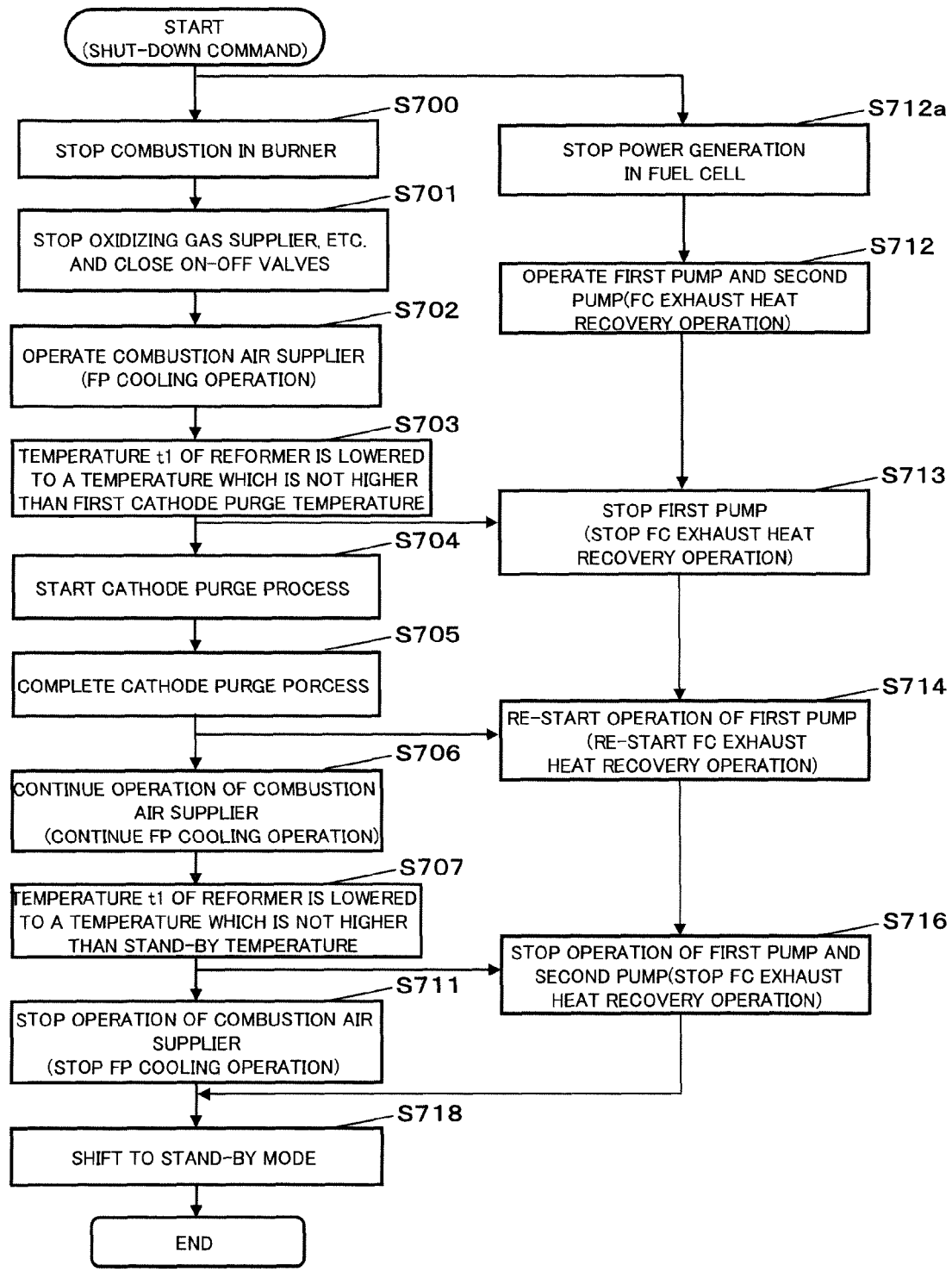
FIG. 23 is a flowchart showing in detail a first abnormal shut-down process in the flowchart of the abnormality detection/shut-down process program shown in FIG. 22

Now, the first abnormal shut-down process executed in the case of the misfire abnormality of the burner 102a which is an example of the first abnormality, will be described, with reference to FIG. 23. FIG. 23 is a flowchart showing in detail the first abnormal shut-down process in the flowchart of the abnormality detection/shut-down process program shown in FIG. 22.

As shown in FIG. 23, in a case where the abnormality determiner 110a determines that a misfire has occurred based on the detected value of the ignition detector 141 during the power generation operation of the fuel cell system 100, in the shut-down process of the fuel cell 101, the oxidizing gas supplier 103 and the like are stopped and the on-off valves are closed (step S700). In the shut-down operation of the hydrogen generator 102, the supply of the material gas and the supply of the water to the hydrogen generator 102 is stopped, and the sealing operation of the hydrogen generator 102 is performed, so that the combustion operation of the burner 102a is stopped (step S701). Thereby, in the burner 102a of the hydrogen generator 102, combustion between the fuel gas and the combustion air stops, while the power generation in the fuel cell 101 stops. Regarding the stop of combustion in the burner 102a, the gas remaining within the radiation tube 9 is purged to outside the housing 111 with the air supplied from the combustion air supplier 117 after the flame is extinguished. Thus, the burner 102a completes the combustion stop process.

Then, after the burner 102a stops the combustion, the combustion air supplier 117 supplies the combustion air to the burner 102a to execute the cooling operation of the hydrogen generator 102 under control of the controller 110 (step S702). When the temperature t3 detected by the temperature detector 143 attached to the reformer 16 of the hydrogen generator 102 reaches a temperature which is not higher than the cathode purge temperature by the above cooling operation (step S703), the cathode purge process in the shut-down process is executed (step S704).

When the cathode purge process in the shut-down process completes (step S705) and the combustion operation of the burner 102a completes, the combustion air supplier 117 is operated to execute the cooling operation of the hydrogen generator 102 (step S706). When the temperature t1 of the reformer 16 which is detected by the temperature detector 143 has decreased to the temperature which is not higher than the stand-by temperature (step S707), the operation of the combustion air supplier 117 is stopped, and the FP cooling operation is stopped (step S711). The fuel cell system 100 is caused to shift to the stand-by mode.

In the shut-down operation of the fuel cell 101, after the operation of the oxidizing gas supplier 103 is stopped and the power generation in the fuel cell 101 is stopped (step s712a), the first pump 107 and the second pump 108 are operated to execute the exhaust heat recovery operation of the heat remaining in the fuel cell (FC) 101 (step S712), as shown in FIG. 23. When the cathode purge process is executed, the operation of the first pump 107 is stopped and the exhaust heat recovery operation of the fuel cell 101 is stopped (step S713).

When the cathode purge process completes, the controller 110 resumes the operation of the first pump 107 and resumes the exhaust heat recovery operation of the fuel cell 101 (step S714). Then, when the temperature t1 of the reformer 16 which is detected by the temperature detector 143 has decreased to the temperature which is not higher than the stand-by temperature, the operation of the first pump 107 and the operation of the second pump 108 are stopped and the exhaust heat recovery operation of the fuel cell 101 is stopped (step S716).

Although in Embodiment 11, the shut-down operation similar to the normal shut-down process is carried out as the first abnormal shut-down process, an abnormality restoration process corresponding to the abnormality may be added depending on a content of the abnormality in an operation other than the shut-down operation (cooling operation of the reformer 106 and the exhaust heat recovery operation of the fuel cell 101) which is identical to that in the normal shut-down process.

Although in the above described flow, the cathode purge process is performed, it may be omitted. Although in the above described flow, the cooling operation of the reformer 101 and the exhaust heat recovery operation of the fuel cell are continued until the temperature of the reformer 16 reaches a temperature which is not higher than the stand-by temperature, the present invention is not limited to this so long as the reformer 101 is cooled with a rate substantially equal to that in the normal shut-down process and the rate of the exhaust heat recovery of the fuel cell is set substantially equal to that in the normal shut-down process.

The second abnormal shut-down process in the fuel cell system 100 of Embodiment 11 is similar to the abnormal shut-down process in the fuel cell system 100 of Embodiment 9. In the abnormal shut-down process executed after detecting the second abnormality associated with the hydrogen generator, the combustion air supplier 117 is controlled so that the reformer 16 is cooled with a higher rate than in the normal shut-down process, and the first pump and the second pump are stopped when the exhaust heat recovery amount of the fuel cell 101 becomes substantially equal to that in the normal shut-down process, thereby stopping the exhaust heat recovery operation.

Thus, in the fuel cell system 100 according to Embodiment 11, the second abnormal shut-down process is performed in such a manner that the hydrogen generator 102 (reformer 16) is cooled with a higher rate than in the normal shut-down process. Therefore, the temperatures of the components within the hydrogen generator 102 for which the maintenance operation is performed are more quickly lowered to temperatures at which the maintenance operator will not get burnt, etc., thereby enabling the maintenance operator to start the maintenance operation at an earlier time. In the fuel cell 101 of the fuel cell system 100, the first pump 107 and the second pump 108 are controlled to suppress cooling of the fuel cell 101 which does not require maintenance operation. This lessens an energy consumed in the operation of the first pump and the second pump.

In the normal shut-down process and the first abnormal shut-down process which do not require the maintenance operation, the advantages similar to those of the fuel cell system 100 of Embodiment 8 are achieved.

Embodiment 12

A fuel cell system according to Embodiment 12 of the present invention is an example in which the controller controls the combustion air supplier and the first flow control device so that the hydrogen generator and the fuel cell are cooled at rates substantially equal to those in the normal shut-down process in the abnormal shut-down process executed when the abnormality detector detects first abnormality which does not require maintenance operation, is associated with the fuel cell and is other than the abnormality associated with the hydrogen generator, while the controller controls the first control device so that the fuel cell is cooled with a higher rate than in the normal shut-down process and controls the combustion air supplier so that the reformer is cooled with a rate substantially equal to that in the normal shut-down process, when the abnormality detector detects second abnormality which requires the maintenance operation, is associated with the fuel cell and is other than the abnormality associated with the hydrogen generator.

As used herein, the phrase "first abnormality which does not require maintenance operation, is associated with the fuel cell and is other than the abnormality associated with the hydrogen generator" refers to an abnormality which does not require maintenance operation, among the abnormalities of the components associated with the power generation operation of the fuel cell, other than the hydrogen generator. For example, this abnormality is a temperature abnormality of the cooling water, etc. The phrase "second abnormality which requires the maintenance operation, is associated with the fuel cell and is other than the abnormality associated with the hydrogen generator" refers to an abnormality which requires the maintenance operation, among the abnormalities of the components which are associated with the power generation operation of the fuel cell, other than the hydrogen generator. For example, there are water level abnormalities of the cooling water tank and the condensed water tank, a failure of a cooling water temperature detector, an oxidizing gas leakage abnormality, etc.

The fuel cell system 100 according to Embodiment 12 of the present invention has a configuration which is basically identical to that of the fuel cell system 100 of Embodiment 8 but is different from the same in the shut-down process executed after the abnormality is detected (i.e., when the abnormality associated with the fuel cell system 100 which is other than the hydrogen generator 102) based on the values detected by the detectors 131 to 140.

The abnormality which is followed by the shut-down of the operation of the fuel cell system 100, is associated with the fuel cell system 100, and is other than the abnormality of the hydrogen generator 102, among the abnormalities which are detected by the abnormality detector in the fuel cell system 100 of Embodiment 12, is defined to include a first abnormality which is associated with the fuel cell system 100 and is other than the abnormality of the hydrogen generator 102 (hereinafter referred to as a first abnormality) and a second abnormality which is associated with the fuel cell system 100 and is other than the abnormality of the hydrogen generator 102 (hereinafter referred to as a second abnormality) (see FIG. 20).

In the fuel cell system 100 of Embodiment 12, like the fuel cell system 100 of Embodiment 11, the abnormality detection in the fuel cell system 100 and the following shut-down (abnormality detection/shut-down process) shown in FIG. 22 are performed. In this case, the second abnormal shut-down process (step S205a) in a case where the second abnormality is detected is different from that of the fuel cell system 100 of Embodiment 11. To be specific, in the second abnormal shut-down process, the first pump 107 is controlled so that the fuel cell 101 is cooled with a higher rate, while the combustion air supplier 117 is controlled so that the hydrogen generator 102 (reformer 16) is cooled with a rate substantially equal to that in the normal shut-down process. The first abnormal shut-down process (step S204a) is similar to that in the fuel cell system 100 of Embodiment 11 (see FIG. 23).

The second abnormal shut-down process (step S205a) in the fuel cell system 100 of Embodiment 12 is similar to the abnormal shut-down process in the fuel cell system 100 of Embodiment 10 (see FIG. 21).

In the fuel cell system 100 of Embodiment 12, the second abnormal shut-down process is performed such that the fuel cell 101 is cooled with a higher rate than in the normal shut-down process. Therefore, the temperatures of the components within the fuel cell system 100 are more quickly lowered to temperatures at which the maintenance operator will not get burnt, etc., thereby enabling the maintenance operator to start the maintenance operation at an earlier time. On the other hand, the combustion air supplier 117 is controlled so that the reformer 16 of the hydrogen generator 102 is cooled with a rate substantially equal to that in the normal shut-down process, thus suppressing the cooling rate of the hydrogen generator 102 which does not require the maintenance operation. As a result, an energy consumed by the operation of the combustion air supplier 117 is lessened.

In the normal shut-down process and the first abnormal shut-down process which do not require the maintenance operation, the same advantages as those in the fuel cell system 100 of Embodiment 8 are achieved.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

In the hydrogen generator and the fuel cell system including the hydrogen generator, of the present invention, since the hydrogen generator is cooled with a higher rate when an abnormality occurs during an operation, the temperature of the hydrogen generator is lowered more quickly, and shifting to a maintenance operation is facilitated. Therefore, the hydrogen generator and the fuel cell system are useful in technical fields of a fuel cell.

REFERENCE CITATION LISTS 1 container
2 outer tube
3 inner tube
4 heat insulating member
5 bottom plate
6 plate member
7 lid member
8 inner tube bottom plate
9 radiation tube
10 combustion exhaust gas passage
11 combustion exhaust gas outlet
12 material gas supply port
13 water supply port
14 reforming catalyst layer
15 preheating section
16 reformer
17 buffer space
18 space
19 hydrogen-containing gas passage
20 separating plate
21 separating plate
22 shift catalyst accommodating space
23 shift catalyst layer
24 shift converter
25 air mixing section
26 oxidization catalyst accommodating space
27 oxidization catalyst layer
28 purifier
29 outlet (through-hole)
30 air supply outlet
31 inlet (through-hole)
32 fuel gas outlet
41 material gas supply path
42 fuel gas supply path
42a first fuel gas supply path
42b second fuel gas supply path
43 off-fuel-gas path
44 fuel gas bypass path
45 first condensed water path
46 oxidizing gas supply path
47 oxidizing gas exhaust path
48 second condensed water path
49 purge gas supply path
50 cathode purge gas exhaust path
51 cooling water supply path
52 cooling water discharge path
53 water supply path
54 hot water supply path
55 hot water path
56 combustion air supply path
57 reforming water supply path
58 selective oxidization air supply path
59 combustion exhaust gas path
61 air inlet
62 air outlet
71 first on-off valve
72 second on-off valve
73 first switch
73a first port
73b second port
73c third port 74 third on-off valve
75 fourth on-off valve
76 fifth on-off valve
77 sixth on-off valve
78 seventh on-off valve
100 fuel cell system
101 fuel cell
101a fuel gas passage
101b oxidizing gas passage
101c cooling water passage
102 hydrogen generator
102a burner (combustor)
103 oxidizing gas supplier
104 cooling water tank
105 condensed water tank
106 heat exchanger (heat radiator)
107 first pump (first output device)
108 second pump (second output device)
109 hot water storage tank
110 controller
111 package
112 material gas supplier (raw material supplier)
112a booster pump
112b flow control valve
113 third pump
114 first condenser
114a primary passage
114b secondary passage
115 second condenser
115a primary passage
115b secondary passage
116 selective oxidization air supplier
117 combustion air supplier
118 inverter
119 ventilation fan
120 remote control device (operation device)
120a display section
120b key operation section
121 heat radiator (cooler)
122 pump
123 heat accumulator
140 combustible gas sensor
141 ignition detector
142 CO sensor
143 temperature detector
144 temperature detector
145 temperature detector
146 temperature detector
206 switch
207 bypass path

The invention claimed is:

1. A hydrogen generator comprising:
a reformer for generating a hydrogen-containing gas through a reforming reaction using a raw material;
a combustor for heating the reformer;
a combustion air supplier for supplying combustion air to the combustor; and
an abnormality detector for detecting an abnormality; and
a controller configured to control the combustion air supplier such that the reformer is cooled with a higher rate in an abnormal shut-down process executed after the abnormality detector detects abnormality which requires maintenance, than in a normal shut-down process.

2. The hydrogen generator according to claim 1,
wherein the controller is configured to control at least one of an operation time and an operation amount of the combustion air supplier such that the reformer is cooled with a higher rate in the abnormal shut-down process than in the normal shut-down process.

3. The hydrogen generator according to claim 1,
wherein the controller is configured to permit the hydrogen generator to start an operation under a higher-temperature condition of the reformer, in the normal shut-down process than in the abnormal shut-down process.

4. The hydrogen generator according to claim 1,
wherein the controller is configured to forcibly cause an operation amount of the combustion air supplier to be larger than an operation amount of the combustion air supplier during a rated operation of the hydrogen generator, in the abnormal shut-down process.

5. The hydrogen generator according to claim 1, further comprising:
a replacement gas supplier for supplying a replacement gas to the reformer;
wherein the controller is configured to control the replacement gas supplier to start a purge operation of the reformer with the replacement gas at an earlier time, in the abnormal shut-down process than in the normal shut-down process.

6. The hydrogen generator according to claim 1, further comprising:
a gas supplier for supplying a gas to the reformer;
wherein the hydrogen generator is configured to execute a pressure compensation operation for supplying the gas to the reformer using the gas supplier to compensate a pressure decrease in an interior of the reformer sealed after the hydrogen generator stops a hydrogen generation operation; and
the controller is configured to control the gas supplier such that a frequency with which the pressure compensation operation occurs is higher, in the abnormal shut-down process than in the normal shut-down process.

7. The hydrogen generator according to claim 1, further comprising:
a heat exchanger for recovering heat from a combustion exhaust gas exhausted from the combustor;
a heat medium path through which a heat medium which receives the heat recovered from the combustion exhaust gas in the heat exchanger flows;
a pump for flowing the heat medium in the heat medium path; and
a heat accumulator for storing the heat medium which has recovered the heat via the heat exchanger;
wherein the controller is configured operate the pump in a cooling step for cooling the reformer in which the combustion air supplier is operated in a state where a combustion operation of the combustor is in a stopped state, in the abnormal shut-down process.

8. The hydrogen generator according to claim 1,
wherein the controller is configured to control the combustion air supplier such that the reformer is cooled with a higher rate than in the normal shut-down process, when the abnormality detector detects a component failure or a gas leakage abnormality.

9. The hydrogen generator according to claim 1, wherein the controller is configured to control the combustion air supplier such that the reformer is cooled with a higher rate, in an abnormal shut-down process executed after the abnormality detector detects a second abnormality which requires maintenance, than in an abnormal shut-down process executed after the abnormality detector detects a first abnormality which does not require the maintenance.

10. The hydrogen generator according to claim 9, wherein the controller is configured to permit the hydrogen generator to start an operation under a higher-temperature condition of the reformer, in the abnormal shut-down process executed after the abnormality detector detects the first abnormality, than in the abnormal shut-down process executed after the abnormality detector detects the second abnormality.

11. The hydrogen generator according to claim 9, further comprising:
a replacement gas supplier for supplying a replacement gas to the reformer;
wherein the controller is configured to control the replacement gas supplier to start a purge operation of the reformer with the replacement gas at an earlier time, in the abnormal shut-down process executed after the abnormality detector detects the second abnormality, than in the abnormal shut-down process executed after the abnormality detector detects the first abnormality.

12. The hydrogen generator according to claim 9, further comprising:
a gas supplier for supplying a gas to the reformer;
wherein the hydrogen generator is configured to execute a pressure compensation operation for supplying the gas to the reformer using the gas supplier to compensate a pressure decrease in an interior of the reformer sealed after the hydrogen generator stops a hydrogen generation operation; and
the controller is configured to control the gas supplier such that a frequency with which the pressure compensation operation occurs is higher, in the abnormal shut-down process executed after the abnormality detector detects the second abnormality, than in the abnormal shut-down process executed after the abnormality detector detects the first abnormality.

13. The hydrogen generator according to claim 9, further comprising:
a heat exchanger for recovering heat from a combustion exhaust gas exhausted from the combustor;
a heat medium path through which a heat medium which receives the heat recovered from the combustion exhaust gas in the heat exchanger flows;
a pump for flowing the heat medium in the heat medium path; and
a heat accumulator for storing the heat medium which has recovered the heat via the heat exchanger;
wherein the controller is configured operate the pump in a cooling step for cooling the reformer in which the combustion air supplier is operated in a state where a combustion operation of the combustor is in a stopped state in the abnormal shut-down process executed after the abnormality detector detects the second abnormality.

14. The hydrogen generator according to claim 9, wherein the first abnormality is a misfire abnormality in at least one of a start-up stop process and a shut-down process.

15. The hydrogen generator according to claim 9, wherein the second abnormality is at least one of a component failure and a gas leakage abnormality.

16. A fuel cell system comprising:
the hydrogen generator according to claim 1; and
a fuel cell for generating electric power using the hydrogen-containing gas supplied from the hydrogen generator.

17. The fuel cell system according to claim 16, further comprising:
a first heat medium path through which a first heat medium for cooling the fuel cell flows; and
a first flow control device for controlling a flow rate of the first heat medium in the first heat medium path;
wherein the controller is configured to control the combustion air supplier such that the reformer is cooled with a higher rate than in the normal shut-down process and control the first flow control device such that the fuel cell is cooled with a rate substantially equal to a rate with which the fuel cell is cooled in the normal shut-down process, in an abnormal shut-down process executed after the abnormality detector detects an abnormality associated with the hydrogen generator.

18. The fuel cell system according to claim 17,
wherein the controller is configured to control the combustion air supplier and the first flow control device such that the hydrogen generator and the fuel cell are cooled with rates substantially equal to rates with which the hydrogen generator and the fuel cell are cooled in the normal shut-down process, in an abnormal shut-down process executed after the abnormality detector detects a first abnormality which does not require maintenance and is associated with the hydrogen generator;
and the controller is configured to control the combustion air supplier such that the reformer is cooled with a higher rate in an abnormal shut-down process executed after the abnormality detector detects a second abnormality which requires the maintenance and is associated with the hydrogen generator, than in the abnormal shut-down process executed after the abnormality detector detects the first abnormality which does not require the maintenance, and
control the first flow control device such that that the fuel cell is cooled with a rate substantially equal to a rate with which the fuel cell is cooled in a normal shut-down process executed after the abnormality detector detects the first abnormality, in the abnormal shut-down process executed after the abnormality detector detects the second abnormality which requires the maintenance and is associated with the hydrogen generator.

19. The fuel cell system according to claim 17,
a first heat medium path through which a first heat medium for cooling the fuel cell flows; and
a first flow control device for controlling a flow rate of the first heat medium flowing in the first heat medium path;
wherein the controller is configured to control the first flow control device such that the fuel cell is cooled with a higher rate than in the normal shut-down process and control the combustion air supplier such that the reformer is cooled with a rate substantially equal to a rate with which the reformer is cooled in the normal shut-down process, when the abnormality detector detects an abnormality which is associated with the fuel cell and is other than the abnormality associated with the hydrogen generator.

20. The fuel cell system according to claim 19,
wherein the controller is configured to control the combustion air supplier and the first flow control device such that the hydrogen generator and the fuel cell are cooled with rates substantially equal to rates with which the hydrogen generator and the fuel cell are cooled in the normal shut-down process, in an abnormal shut-down process executed after the abnormality detector detects a first abnormality which does not require maintenance, is associated with the fuel cell and is other than the abnormality associated with the hydrogen generator;
and the controller is configured to control the first flow control device such that the fuel cell is cooled with a higher rate in an abnormal shut-down process executed after the abnormality detector detects a second abnormality which requires maintenance, is associated with the fuel cell and is other than the abnormality associated with the hydrogen generator, than in the abnormal shut-down process executed after the abnormality detector detects the first abnormality which does not require the maintenance, and control the combustion air supplier such that the reformer is cooled with a rate substantially equal to a rate with which the reformer is cooled in a normal shut-down process executed after the abnormality detects the first abnormality, in the abnormal shut-down process executed after the abnormality detector detects the second abnormality which requires the maintenance, is associated with the fuel cell and is other than the abnormality associated with the hydrogen generator.

21. The fuel cell system according to claim 16, a first heat medium path through which a first heat medium for cooling the fuel cell flows; and a first flow control device for controlling a flow rate of the first heat medium flowing in the first heat medium path;

wherein the controller is configured to control the first flow control device such that the fuel cell is cooled with a higher rate than in the normal shut-down process and control the combustion air supplier such that the reformer is cooled with a rate substantially equal to a rate with which the reformer is cooled in the normal shut-down process, when the abnormality detector detects an abnormality which is associated with the fuel cell and is other than the abnormality associated with the hydrogen generator.

22. The fuel cell system according to claim 21, wherein the controller is configured to control the combustion air supplier and the first flow control device such that the hydrogen generator and the fuel cell are cooled with rates substantially equal to rates with which the hydrogen generator and the fuel cell are cooled in the normal shut-down process, in an abnormal shut-down process executed after the abnormality detector detects a first abnormality which does not require maintenance, is associated with the fuel cell and is other than the abnormality associated with the hydrogen generator;

and the controller is configured to control the first flow control device such that the fuel cell is cooled with a higher rate in an abnormal shut-down process executed after the abnormality detector detects a second abnormality which requires maintenance, is associated with the fuel cell and is other than the abnormality associated with the hydrogen generator, than in the abnormal shut-down process executed after the abnormality detector detects the first abnormality which does not require the maintenance, and control the combustion air supplier such that the reformer is cooled with a rate substantially equal to a rate with which the reformer is cooled in a normal shut-down process executed after the abnormality detects the first abnormality, in the abnormal shut-down process executed after the abnormality detector detects the second abnormality which requires the maintenance, is associated with the fuel cell and is other than the abnormality associated with the hydrogen generator.

* * * * *